United States Patent [19]
Olivier

[11] Patent Number: 6,024,226
[45] Date of Patent: Feb. 15, 2000

[54] SYSTEM AND PROCESS FOR SEPARATING AND RECOVERING/RECYCLING SOLID WASTES AND WASTE STREAMS

[76] Inventor: Paul A. Olivier, P.O. Box 68, Waxahachie, Tex. 75168

[21] Appl. No.: 08/869,706

[22] Filed: Jun. 5, 1997

[51] Int. Cl.$^7$ .................................................. B03B 5/60
[52] U.S. Cl. ........................................ 209/172.5; 209/173
[58] Field of Search ............................... 209/172, 172.5, 209/173

[56] References Cited

U.S. PATENT DOCUMENTS

| | | | |
|---|---|---|---|
| 4,018,567 | 4/1977 | La Point | 23/285 |
| 4,323,449 | 4/1982 | Pelletier | 209/17 |
| 4,588,559 | 5/1986 | Emmett | 209/172.5 X |
| 5,373,946 | 12/1994 | Olivier | 209/172.5 |
| 5,495,949 | 3/1996 | Olivier | 209/172.5 |
| 5,653,867 | 8/1997 | Jody et al. | 209/173 X |

FOREIGN PATENT DOCUMENTS

| | | |
|---|---|---|
| 0618010 | 10/1994 | European Pat. Off. . |
| 3539902 | 5/1987 | Germany . |
| 9414541 | 7/1994 | WIPO . |

OTHER PUBLICATIONS

Burt, Operational HMS Suspensions, *Gravity Concentration Technology*, Elsevier (1984), pp. 68–72.

Burt, Heavy Medium Separation, *Gravity Concentration Technology*, Elsevier (1984), pp. 139–156.

*Primary Examiner*—David H. Bollinger
*Attorney, Agent, or Firm*—Jones, Day, Reavis & Pogue

[57] ABSTRACT

A system and process for continuously separating and recovering materials from a heterogeneous mixture of particulate solids, from a solid waste or waste stream source, which uses a plurality of liquid media of different specific gravity to effect the separations, the solids having a plurality of different specific gravities and the recovered fractions each having a different specific gravity, wherein a first separation vessel receives the heterogeneous mixture, contacts the material with a first liquid medium having a first specific gravity of about 1.0, thereby causing a first part of the mixture to rise in the liquid medium as float particles, the remaining part to settle as sink particles, removing the separated float particles and sink particles without intermixture, then providing a second separation vessel, which receives the sink part from the first separation vessel contacts the material with a second liquid medium having a second specific gravity different from that of the first liquid medium, thereby causing a first particle of the material to rise in the liquid medium as float particles, the remaining part to settle as sink particles, and removing the separated float particles as a substantially organic particulate mixture, and the separated sink particles as a substantially inorganic particulate mixture, without intermixture between the product streams.

93 Claims, 35 Drawing Sheets

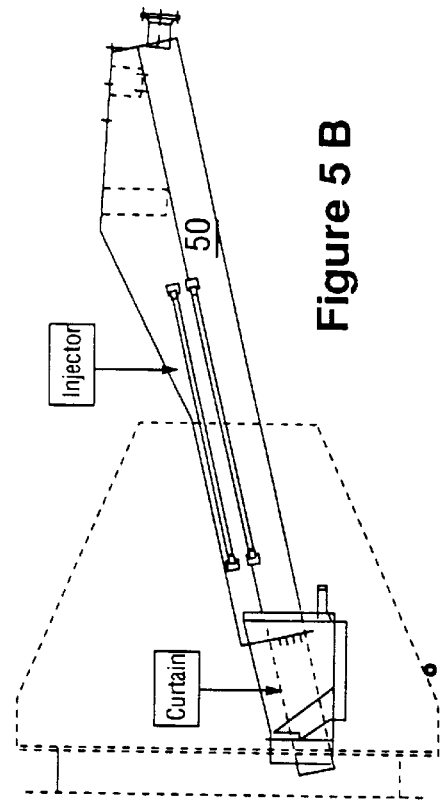
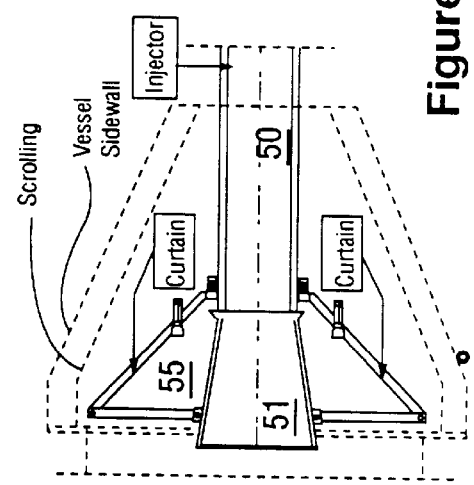
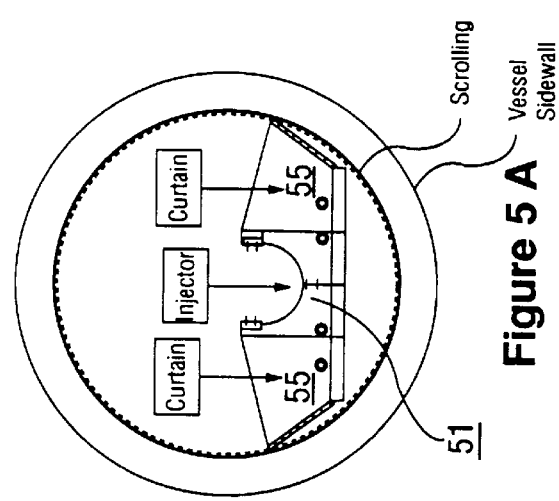
Figure 5 A
Figure 5 B
Figure 5 C
Injector + Curtain

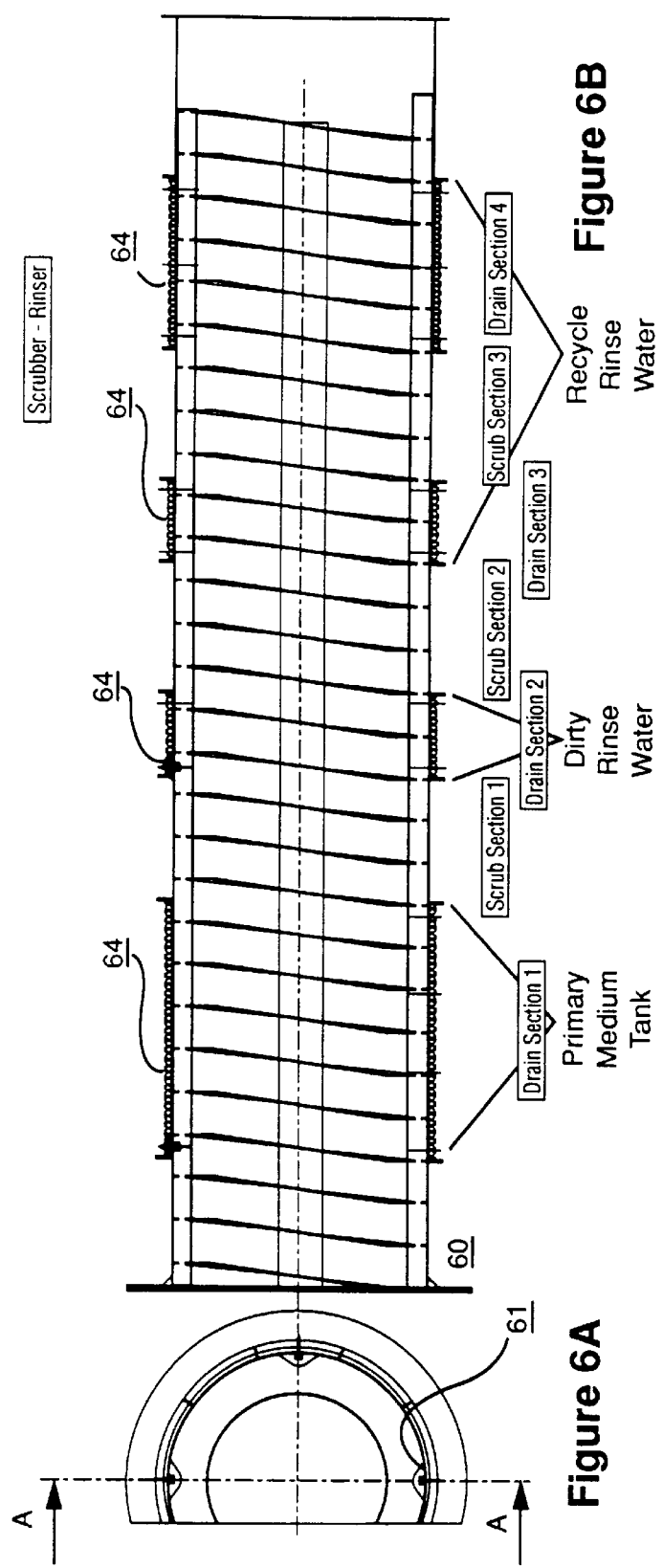

Scrubber-Rinser

Figure 9 — Bi-Directional Dense Medium Separation, Side View Scrolled Barrel

A Shallow Bath Depth

Long Separation Zone
No Error on the Float Side
Top View

Side View of Sinks Evacuation
No Error on the Sink Side
Sinks

SPREADSHEET : THERMOLYSIS

FIGURE 19

| | A | B | C | D | E | F | G | H | I | J | K |
|---|---|---|---|---|---|---|---|---|---|---|---|
| 1 | | Material Type | | Available Gas | | | Available Carbon | | | Economics | |
| 2 | | | % | Kcal | $US | % | Kcal | $US | Rev | Exp | Profit |
| 3 | | natural gas | | 9,300 | $150.00 | | | | | | |
| 4 | | coal | | | | | 6,100 | $45.00 | | | |
| 5 | 12 | polypropylene | 94.08% | 10,715 | $172.82 | 2.00% | 7,000 | $51.64 | $163.62 | $33.00 | $130.62 |
| 6 | 8 | polyethylene | 93.60% | 10,721 | $172.92 | 2.50% | 4,200 | $30.98 | $162.63 | $33.00 | $129.63 |
| 7 | 31 | lubricating oil | 94.09% | 10,329 | $166.59 | 3.00% | 4,667 | $34.43 | $157.78 | $33.00 | $124.78 |
| 8 | 24 | fats | 91.18% | 9,589 | $154.67 | 6.00% | 3,500 | $25.82 | $142.58 | $33.00 | $109.58 |
| 9 | 9 | polystyrene | 93.10% | 9,395 | $151.54 | 2.00% | 3,500 | $25.82 | $141.60 | $33.00 | $108.60 |
| 10 | 13 | polyamide | 93.10% | 9,060 | $146.14 | 2.00% | 3,500 | $25.82 | $136.57 | $33.00 | $103.57 |
| 11 | 15 | polyethylene terephtalate | 93.10% | 8,034 | $129.57 | 2.00% | 5,250 | $38.73 | $121.41 | $33.00 | $88.41 |
| 12 | 14 | polyester | 87.40% | 8,244 | $132.96 | 8.00% | 6,125 | $45.18 | $119.82 | $33.00 | $86.82 |
| 13 | 7 | mixed plastics | 75.20% | 9,288 | $149.81 | 20.00% | 2,500 | $18.44 | $116.35 | $33.00 | $83.35 |
| 14 | 32 | latex | 66.50% | 9,069 | $146.27 | 30.00% | 5,833 | $43.03 | $110.18 | $33.00 | $77.18 |
| 15 | 27 | meat wastes | 73.43% | 8,332 | $134.39 | 11.00% | 3,545 | $26.15 | $101.55 | $33.00 | $68.55 |
| 16 | 30 | heavy organic (auto) | 56.40% | 8,572 | $138.26 | 40.00% | 4,875 | $35.96 | $92.36 | $33.00 | $59.36 |
| 17 | 6 | waxed cartons | 64.68% | 7,830 | $126.29 | 26.50% | 3,302 | $24.36 | $88.14 | $33.00 | $55.14 |
| 18 | 28 | tires | 56.88% | 7,551 | $121.80 | 37.50% | 6,413 | $47.31 | $87.01 | $33.00 | $54.01 |
| 19 | 10 | polyurethane | 76.54% | 6,634 | $107.00 | 14.00% | 4,500 | $33.20 | $86.55 | $33.00 | $53.55 |
| 20 | 17 | rubber | 52.20% | 8,072 | $130.20 | 40.00% | 3,438 | $25.36 | $78.11 | $33.00 | $45.11 |
| 21 | 11 | polyvinyl chloride | 73.95% | 5,766 | $93.01 | 13.00% | 3,846 | $28.37 | $72.47 | $33.00 | $39.47 |
| 22 | 4 | newsprint | 57.75% | 5,282 | $85.19 | 23.00% | 3,272 | $24.14 | $54.75 | $33.00 | $21.75 |
| 23 | 19 | hardwood | 50.25% | 5,818 | $93.83 | 33.00% | 3,030 | $22.35 | $54.53 | $33.00 | $21.53 |
| 24 | 29 | light organic (auto) | 49.28% | 5,691 | $91.79 | 44.00% | 2,727 | $20.12 | $54.09 | $33.00 | $21.09 |
| 25 | 16 | textiles | 37.80% | 6,942 | $111.96 | 46.00% | 3,196 | $23.57 | $53.17 | $33.00 | $20.17 |
| 26 | 18 | leather | 36.00% | 7,533 | $121.50 | 50.00% | 2,508 | $18.50 | $52.99 | $33.00 | $19.99 |
| 27 | 20 | mixed wood | 44.22% | 6,006 | $96.86 | 34.00% | 3,235 | $23.87 | $50.95 | $33.00 | $17.95 |
| 28 | 2 | cardboard | 53.28% | 4,693 | $75.70 | 26.00% | 2,827 | $20.85 | $45.75 | $33.00 | $12.75 |
| 29 | 5 | mixed paper | 37.52% | 6,257 | $100.91 | 44.00% | 2,267 | $16.72 | $45.22 | $33.00 | $12.22 |
| 30 | 3 | magazines | 35.70% | 4,242 | $68.41 | 39.50% | 1,506 | $11.11 | $28.81 | $33.00 | -$4.19 |
| 31 | 22 | yard wastes | 16.00% | 7,045 | $113.63 | 20.00% | 2,500 | $18.44 | $21.87 | $33.00 | -$11.13 |
| 32 | 23 | office sweepings | 9.60% | 8,304 | $133.93 | 76.00% | 553 | $4.08 | $15.96 | $33.00 | -$17.04 |
| 33 | 21 | green wood | 0.00% | 3,291 | $53.08 | 18.00% | 2,778 | $20.49 | $3.69 | $33.00 | -$29.31 |
| 34 | 25 | mixed food wastes | 0.00% | 6,455 | $104.11 | 9.00% | 2,000 | $14.75 | $1.33 | $33.00 | -$31.67 |
| 35 | 26 | fruit wastes | 0.00% | 10,566 | $170.42 | 8.00% | 2,250 | $16.60 | $1.33 | $33.00 | -$31.67 |

FIGURE 21

SPREADSHEET 2: AUTOMOBILE RECYCLING

| | A | B | C | D | E | F | G | H | I | J | K | L | M | N | O | P | Q | R | S |
|---|---|---|---|---|---|---|---|---|---|---|---|---|---|---|---|---|---|---|---|
| 1 | | Material Type | | | | Tons per Year | | | | Unit Prices in $US per Ton | | | | | | Totals In $US | | | |
| 2 | | Description | Input | Gas | Steam | Carbon | Granite | Other | Gas | Stm | Car | Gr | Other | Gas | Steam | Carbon | Granite | Other | All |
| 3 | 29 | light organic | 733,425 | 366,713 | 2,339,362 | 322,707 | 146,685 | | 91.79 | 14.00 | 20.12 | 200 | | 33,661,132 | 32,751,068 | 6,492,615 | 29,337,000 | | 102,241,815 |
| 4 | 30 | heavy organic | 452,120 | 266,751 | 1,701,678 | 180,848 | 45,212 | | 138.26 | 14.00 | 35.96 | 200 | | 36,881,251 | 23,823,495 | 6,503,857 | 9,042,400 | | 76,251,004 |
| 5 | | ferrous | 4,704,715 | | | | | 4,704,715 | | | | | 130 | | | | | 611,612,950 | 611,612,950 |
| 6 | | magnesium | 6,350 | | | | | 6,350 | | | | | 2,500 | | | | | 15,875,000 | 15,875,000 |
| 7 | | aluminum | 188,595 | | | | | 188,595 | | | | | 1,200 | | | | | 226,314,000 | 226,314,000 |
| 8 | | heavy metals | 119,380 | | | | | 119,380 | | | | | 900 | | | | | 107,442,000 | 107,442,000 |
| 9 | | glass, stones, sand | 145,415 | | | | 159,957 | | | | | 200 | | | | | 31,991,300 | | 31,991,300 |
| 10 | | tonnage/revenue | 6,350,000 | 633,463 | 4,041,040 | 503,555 | 351,854 | 5,019,040 | | | | | | 70,542,383 | 12,996,472 | 6,503,857 | 70,370,700 | 961,243,950 | 1,171,728,069 |
| 11 | 1 | shredding | 6,350,000 | | | | | | | | | | -33.00 | | | | | | (209,550,000) |
| 12 | 2 | air seperation | 733,425 | | | | | | | | | | -3.00 | | | | | | (2,200,275) |
| 13 | 3 | full separation | 911,860 | | | | | | | | | | -13.00 | | | | | | (11,854,180) |
| 14 | 4 | thermolysis | 1,185,545 | | | | | | | | | | -33.00 | | | | | | (39,122,985) |
| 15 | 4 | gas needed for thermolysis | 295,770 | | | | | | | | | | -111.36 | | | | | | (32,936,888) |
| 16 | 5 | heat recovery | 316,732 | | | | | | | | | | -25.00 | | | | | | (7,918,291) |
| 17 | 6 | gas to boiler | 337,693 | | | | | | | | | | -111.36 | | | | | | (37,605,495) |
| 18 | 7 | carbon vitrification | 503,555 | | | | | | | | | | -35.80 | | | | | | (18,027,269) |
| 19 | 7 | carbon vitrified | 503,555 | | | | | | | | | | -25.81 | | | | | | (12,996,472) |
| 20 | 7 | gas | 10,071 | | | | | | | | | | -111.36 | | | | | | (1,121,516) |
| 21 | 8 | vitrification | 290,830 | | | | | | | | | | -35.80 | | | | | | (10,411,714) |
| 22 | 8 | coal | 145,415 | | | | | | | | | | -45.00 | | | | | | (6,543,675) |
| 23 | 8 | gas | 5,817 | | | | | | | | | | -111.36 | | | | | | (647,736) |
| 24 | | expenditures | | | | | | | | | | | | | | | | | (390,936,497) |
| 25 | | profit | | | | | | | | | | | | | | | | | 780,791,572 |
| 26 | | revenue/ton | 184.52 | 111.36 | | 25.81 | | | | | | | | | | | | | |
| 27 | | expenditure/ton | -61.56 | | | | | | | | | | | | | | | | | |
| 28 | | profit/ton | 122.96 | | | | | | | | | | | | | | | | | |
| 29 | | average Kcal/Kg | | 6,904 | | 3,499 | | | | | | | | | | | | | |

FIGURE 22

SPREADSHEET 3: RESIDENTIAL WASTE - USA

| | | | | Tons per Year | | | | $US per Ton | | | | | Totals in $US | | | |
|---|---|---|---|---|---|---|---|---|---|---|---|---|---|---|---|---|---|
| | Material Type | | | | | | | | | | | | | | | | |
| | Description | Input | Gas | Steam | Carbon | Granite | Other | Gas | Stm | Carb | Gr | Other | Gas | Steam | Carbon | Granite | Other | All |
| 25 | mixed food wastes | 168,000 | | | | | 50,400 | | | | | 100 | | | | | 5,040,000 | 5,040,000 |
| 5 | mixed paper | 712,000 | 398,720 | 1,405,541 | 313,280 | 110,360 | | 73.45 | 14.00 | 16.72 | 200 | | 29,286,633 | 19,677,580 | 5,239,328 | 22,072,000 | | 76,275,542 |
| 2 | cardboard | 128,000 | 94,720 | 333,901 | 33,280 | 6,400 | | 61.62 | 14.00 | 20.85 | 200 | | 5,836,792 | 4,674,610 | 694,033 | 1,280,000 | | 12,485,434 |
| 7 | mixed plastics | 138,000 | 110,400 | 389,175 | 27,600 | 13,800 | | 147.02 | 14.00 | 18.44 | 200 | | 16,230,540 | 5,448,447 | 509,016 | 2,760,000 | | 24,948,004 |
| 16 | textiles | 36,000 | 19,440 | 68,529 | 16,560 | 1,440 | | 82.37 | 14.00 | 23.57 | 200 | | 1,601,292 | 959,400 | 390,393 | 288,000 | | 3,239,086 |
| 17 | rubber | 8,000 | 4,800 | 16,921 | 3,200 | 1,200 | | 123.07 | 14.00 | 25.36 | 200 | | 590,754 | 236,889 | 81,148 | 240,000 | | 1,148,791 |
| 18 | leather | 8,000 | 4,000 | 14,101 | 4,000 | 1,720 | | 88.63 | 14.00 | 18.50 | 200 | | 354,514 | 197,408 | 74,007 | 344,000 | | 969,929 |
| 22 | yard wastes | 344,000 | 275,200 | 970,117 | 68,800 | 34,400 | 68,800 | 7.03 | 14.00 | 18.44 | 200 | 100 | 1,934,273 | 13,581,637 | 1,268,852 | 6,880,000 | 6,880,000 | 30,544,762 |
| 20 | mixed wood | 36,000 | 23,760 | 83,757 | 12,240 | 4,320 | | 55.19 | 14.00 | 23.87 | 200 | | 1,311,272 | 1,172,601 | 292,131 | 864,000 | | 3,640,004 |
| 12 | glass | 180,000 | | | | | 180,000 | | | | | 3 | | | | | 540,000 | 540,000 |
| 13 | tin cans | 116,000 | | | | | 116,000 | | | | | 130 | | | | | 15,080,000 | 15,080,000 |
| 14 | aluminum | 12,000 | | | | | 12,000 | | | | | 1,200 | | | | | 14,400,000 | 14,400,000 |
| 15 | other ferous | 54,000 | | | | | 54,000 | | | | | 130 | | | | | 7,020,000 | 7,020,000 |
| 16 | other non-ferous | 6,000 | | | | | 6,000 | | | | | 900 | | | | | 5,400,000 | 5,400,000 |
| 17 | dirt, ash, etc. | 54,000 | | | | 59,400 | | | | | 200 | | | | | 11,880,000 | | 11,880,000 |
| 18 | tonnage/revenue | 2,000,000 | 931,040 | 3,282,041 | 478,960 | 233,040 | 487,200 | | | | | | 57,146,070 | 45,948,572 | 8,548,908 | 46,608,000 | 54,360,000 | 212,611,550 |
| 1 | food shredding | 168,000 | | | | | | | | | | -1.00 | | | | | | (168,000) |
| 2 | food drying | 168,000 | | | | | | | | | | -8.50 | | | | | | (1,428,000) |
| 3 | MSW shredding | 1,832,000 | | | | | | | | | | -5.00 | | | | | | (9,160,000) |
| 4 | air separation | 876,000 | | | | | | | | | | -3.00 | | | | | | (2,628,000) |
| 5 | full separation | 956,000 | | | | | | | | | | 13.00 | | | | | | (12,428,000) |
| 6 | thermolysis | 1,410,000 | | | | | | | | | | 33.00 | | | | | | (46,530,000) |
| 6 | gas needed for thermolysis | 638,213 | | | | | | | | | | 61.38 | | | | | | (39,172,712) |
| 7 | heat recovery | 465,520 | | | | | | | | | | 25.00 | | | | | | (11,638,000) |
| 8 | gas to boiler | 292,827 | | | | | | | | | | 61.38 | | | | | | (17,973,358) |
| 9 | carbon vitrification | 478,960 | | | | | | | | | | 35.80 | | | | | | (17,146,768) |
| 9 | carbon vitrified | 478,960 | | | | | | | | | | 17.85 | | | | | | (8,548,908) |
| 9 | gas needed for vitrification | 9,579 | | | | | | | | | | 61.38 | | | | | | (587,959) |
| 10 | inert vitrification | 108,000 | | | | | | | | | | 35.80 | | | | | | (3,866,400) |
| 10 | coal needed for vitrification | 54,000 | | | | | | | | | | 45.00 | | | | | | (2,430,000) |
| 10 | gas needed for vitrification | 2,160 | | | | | | | | | | 61.38 | | | | | | (132,578) |
| | expenditure | | | | | | | | | | | | | | | | | (173,838,684) |
| | profit | | | | | | | | | | | | | | | | | 38,772,866 |
| | revenue/ton | 106.31 | 61.38 | 17.85 | | | | | | | | | | | | | | |
| | expenditure/ton | -86.92 | | | | | | | | | | | | | | | | |
| | profit/ton | 19.39 | | | | | | | | | | | | | | | | |
| | average kcal/kg | | 3,805 | 2,420 | | | | | | | | | | | | | | |
| | average kcal/kg | | 3,335 | | | | | | | | | | | | | | | |

THERMOLYSIS OVEN WITH THERMAL REDUCER
ELECTRIC HEATING METHOD

THERMOLYSIS OVEN
ELECTRIC HEATING METHOD

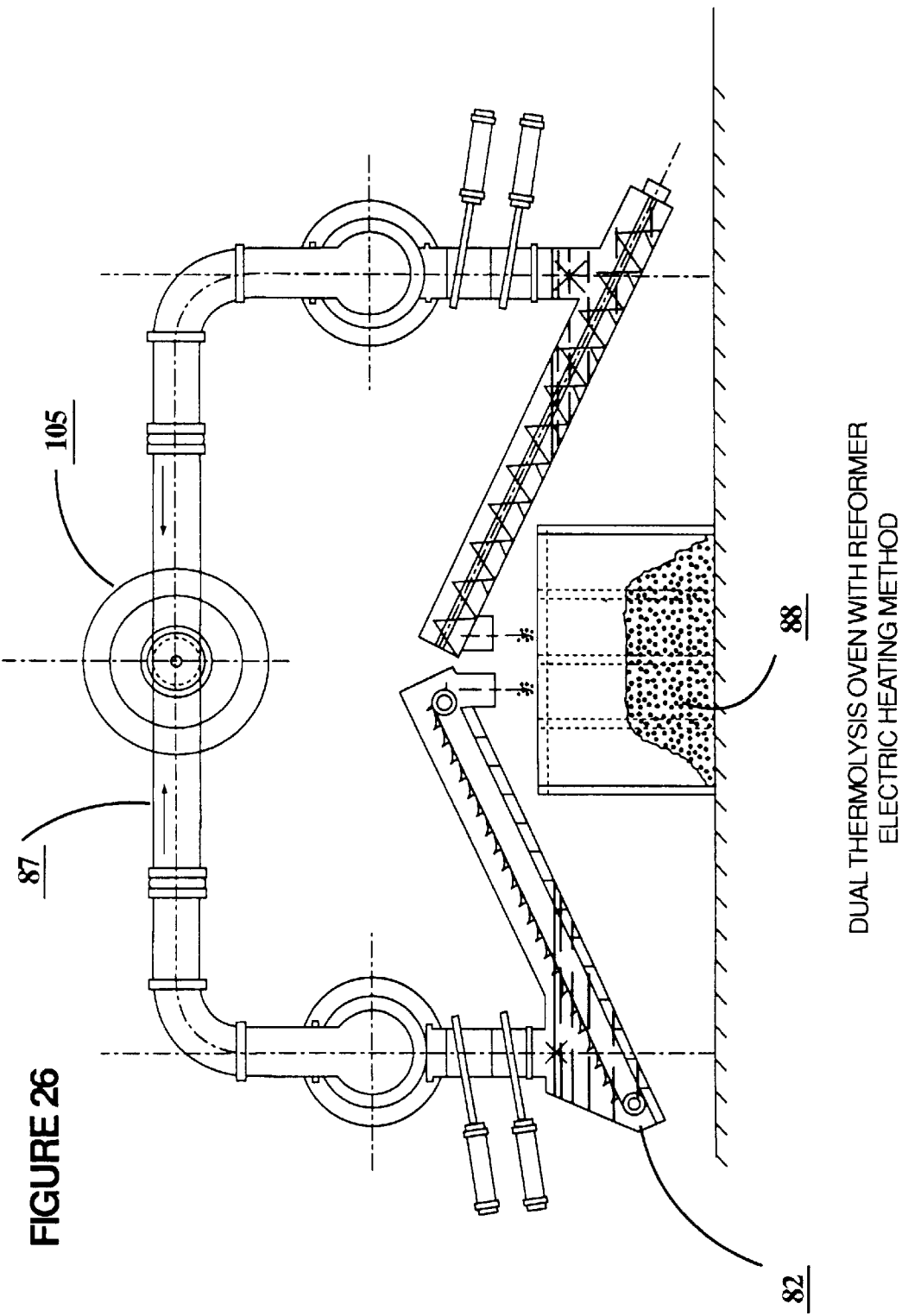

SYSTEM AND PROCESS FOR SEPARATING AND RECOVERING/RECYCLING SOLID WASTES AND WASTE STREAMS

FIELD OF THE INVENTION

The present invention relates to the separation and recovery of materials from solid wastes and waste streams, and particularly a system and process for continuously separating a heterogeneous mixture of particulate solids having a plurality of different specific gravities, through use of a plurality of liquid media of different specific gravities, into a plurality of fractions each of different specific gravity, to recover materials from the solid waste.

BACKGROUND OF THE INVENTION

The treatment and recovery/recycling of automobile, industrial, commercial, construction, demolition, agricultural and municipal solid wastes and waste streams presents a substantial problem in most of the world's countries, developed, industrialized and underdeveloped alike. The vast diversity of the particular components of solid wastes and waste streams; the variability of quantity of each particular component with time and/or geographic location; the technical challenge to processes, apparatus and techniques to successfully divide these components into recoverable, substantially separate, non-intermixed (product) fractions; the variability in equipment and utilities costs, together with variability in value of any recovered products due to market conditions, transportation costs, and other factors, all combine to make solid waste treatment extraordinarily complex in conception and execution. The viable proposed solutions are many and diverse, and all are subject to shortcomings of different and varying degree. So complex are the problems presented, that attempts to treat and recover/recycle may not even be contemplated. Other solutions to handling solid wastes and waste streams may seem the only possible choice, particularly the "burn and/or bury" approach of incineration followed by landfill, or direct landfill.

Landfill has traditionally been a technique used to dispose of many types of solid wastes and waste streams. But the world is running out of places to dig convenient, cost-effective and environmentally-acceptable holes, especially in Europe, where several countries are planning to or will ban landfills within the next five (5) years. Incineration has been another traditional technique that has been severely curtailed due to high capital costs and environmental (air pollution, water pollution) concerns. Both procedures often suffer from poor economics as well: it is difficult to extract maximum value from these waste streams, when burying and burning makes many potentially recoverable components inaccessible, or consumes them only for heat values.

Separation and recovery/recycling of solid waste and waste-stream components has a long history, with a myriad of techniques, processes and devices having been assayed and applied, with widely divergent "success" and, often, partial or total failure to present a reasonable solution to the problem. Costs and complexity of separation, particularly the inability to provide clean/perfect separation of recoverable fractions, are the usual drawbacks, delivering a body blow to many recycling processes where the process costs more than the resulting recovered/recoverable materials are capable of generating in the market. The key to recycling of solid wastes and waste streams lies in discovering and recovering that within the waste that assures the economics and efficiency of its own recovery and recycling.

The quantity of waste to be treated has a direct effect on the ability to use known processes for separation and recovery of components, and/or the cost-effectiveness of those processes. Only processes that offer the ability to operate continuously to process very high volumes/through-puts, often appear viable when compared to the "bury or burn" alternatives, if available.

Known waste recovery and recycling techniques use a vast array of unit operations and devices for solid waste processing and separation:

size reduction, by means of grinders, shredders, pulverisers and fragmentisers;

classification, by means of cyclones (single or multiple), trommelscreens and accordion screens;

concentration, by means of eddy currents and air separators;

separation, by means of magnets, cyclones, vibratory screen bins and heavy liquid medium separation vessels;

dewatering, by means of sieve beds, vibratory screens and trommelscreens;

rinsing, by means of vibratory screens, rinsers and scrubber-rinsers;

decantation, by means of clarifiers and deep cones;

pressing, by means of screw presses, hydraulic presses and filter belt presses;

thermal decomposition of organic residues by means of thermolysis ovens;

vitrification of inorganic residues, by means of liquid metal reactors and vitrification ovens; and the generation of compost or equivalent bio materials.

Depending upon specific application to automobile, industrial, commercial, construction, demolition, agricultural and/or municipal solid wastes and waste streams, a separation and recovery/recycling process may generate a variety of products (comprising fractions or components of the heterogeneous waste stream feed) and by-products of differing potential value:

ferrous metals, recycled as bars, ingots, profiles and plates;

light organics, such as paper, cardboard and wood, recycled as cellulose building blocks;

light organics, such as textiles and foam rubber, recycled as gas and carbon;

heavy organics, such as rubber, wood and plastic, recycled as gas and carbon;

heavy organics, such as rubber, wood and plastic, directly fed to cement kilns;

light and heavy organics recycled as carpeting and insulation;

glass recycled as glass;

glass and other inorganic residues vitrified and subsequently incorporated into cement;

glass and other fine inorganic residues vitrified and recycled as artificial granite;

magnesium recycled as powder and ingots;

aluminum recycled as ingots and castings;

heavy metals isolated as a group of heavy metals for further separation and processing;

garden waste recycled as activated carbon and solid fuel;

forestry waste recycled as activated carbon and solid fuel;

food and agricultural waste recycled by means of compost and bio material.

Ideally, a separation and recovery/recycling system and process would present the capability and flexibility to handle substantial daily through-puts, in the tens to hundreds of tons per hour range, which may vary from day to day as to both total quantity and identity and nature of components present, coming from a variety of solid wastes and waste stream sources, including automobile, industrial, commercial, construction, demolition, agricultural and municipal solid wastes. The separation and recovery of separation products would generally provide materials falling within a group of broad categories if the solid wastes or waste stream originated from those noted sources:

| | |
|---|---|
| Category 1 | ferrous material |
| Category 2 | light, porous, water-absorbent, non-putrescent organic material such as paper, cardboard, foam rubber and textiles |
| Category 3 | heavy, non-porous, non-water-absorbent, non-putrescent organic material such as rubber, plastic and wood |
| Category 4 | magnesium |
| Category 5 | aluminum |
| Category 6 | an assortment of heavy metals such as zinc, zamac, lead, copper, nickel, bronze and stainless steel |
| Category 7 | non-metallic inorganic material such as glass, sand, stones, bricks, concrete, porcelain and ceramics |
| Category 8 | putrescent organic material of a relatively high moisture content such as food waste, garden waste, agricultural waste and sewage |

Of the various unit operations that may be assembled into a separation and recovery process for solid wastes and waste streams, none has any mandatory application or universal recognition when cost (both capital and operating), variation of feeds, and degree of separation possible without intermixing, among other factors, are considered.

Known separation devices such as eddy current concentrators, for example, have very poor ability to separate components and minimize separation product intermixing, when used in solid waste or waste stream environments. For example, eddy current concentrators often put 5% to 15% non-ferrous metals in an organics product stream, and as much as 20% to 30% organics in the non-ferrous metals. This poor separation then necessitates further, time-consuming and expensive processing to secure product streams of the necessary "cleanliness" and/or "purity," with minimal (if any) intermixing of other waste components.

Separation by density (or specific gravity/relative density), applied to solid wastes and waste streams, has some credence in the prior art These unit operations broadly involve the use of separation vessels with liquid media of a selected specific gravity.

European Patent Application EP 0 618 010 A1, published Oct. 5, 1994, describes a method and installation for separating materials, including solid wastes and waste streams, such as ferrous and non-ferrous scrap (col. 1, ll. 3–16). The application discloses a system that introduces a waste stream into a dose-measuring device 6, then in sequence to a magnetic separator 3, a mechanical sifting device 4, an aerodynamic separation device 5, and a single heavy liquid medium separation vessel 2 (Abstract; FIGS. 1–8), to recover a variety of streams from the waste (see FIG. 1, products 16, 24, 29, 46, 91 and 102; only products 91 and 102 result from the heavy liquid medium separation vessel 2 (FIG. 7)). While adjustment of the liquid medium's average density is disclosed (col. 7, ll. 41–57), and the separation of materials having an average density of between 1.0 and 1.7, up to 3.5, is addressed (see also col. 1, ll. 30–41), there is no disclosure of the use of multiple heavy liquid medium separation vessels, or subjecting the materials to be separated to more than one such separation stage. Use of the particular system disclosed is described as one of the key advantages offered by the invention: "The precise sequence of steps, with the intervention of other steps or not, allows an optimal separation of scrap with a minimal number of machines" (col. 1, ll. 28–30).

Plainly, there is no suggestion or teaching that additional capital expenditure be undertaken to carry out multiple heavy liquid medium separation stages, nor any suggestion that additional or other desired fractions/components could be recovered from the heterogenous solid waste or waste stream residue after the processing through the system and vessel 2 is completed.

Many conventional devices exist to effect density separations. These devices may be classified into two major groups: those employing a dynamic effect, and those employing only a small or essentially no dynamic effect. The former devices cannot be used to make a precise separation involving materials having very close specific gravities, for example materials differing in specific gravity by only one or two points to the third decimal place, since the dynamic effect can never be controlled uniformly over and against particles of varying sizes and shapes and/or densities. The latter classification, generally known as heavy liquid media separation processes, minimizes considerably the difficulties posed by particle size and shape.

A heavy liquid medium separation process, in its simplest form, involves a relatively quiescent liquid bath into which the materials to be separated are introduced. The liquid medium has an average specific gravity approximately intermediate that of the specific gravities of the fractions of feed whose separation and recovery is sought. The liquid medium usually has two principal components: the liquid, often water, and a suspension-creating, solid particulate material whose quantity and concentration is controlled to provide, taken with the liquid, the required specific gravity for the medium. Those materials with a density higher than the density of the bath liquid, sink, creating sink particles or "sinks", whereas materials with a density lower than the density of this separating suspending medium, float, creating float particles of "floats."

The most commonly used liquid media on a commercial scale are comprised of colloidal or semi-colloidal solids in suspension in water. Solutions are not viable commercially due to their high cost and their inability to be recycled or disposed of in an environmentally safe manner. Cost effectiveness and process viability of real-world systems require that the suspension-creating solid particulate media be inexpensive, readily available, and easily recoverable from the medium's liquid and/or from the separated and recovered fractions of the processed waste.

By properly selecting these colloidal solids, liquid media suspensions with a specific gravity of 3.2 can be generated which have sufficient liquidity/low viscosity to effect reasonably good separations, usually through the use of expensive media such as magnetite, ferrosilicon or mixtures of the two materials. Use of magnetite and ferrosilicon as the solid particulate suspension media to generate liquid medium suspensions for various suspension densities for coal beneficiation, metallic ore concentration and specialized ore beneficiation/diamond recovery, was known in the art Also known was the difficulty in controlling viscosity of the liquid media, dependent upon the type of suspension agent and upon the average specific gravity to be reached/attained: the presence of clay in such media was often suggested but could cause Theological problems requiring expensive reagent additions to control. See Burt, "Operational HMS Suspensions," Gravity Concentration Technology, Elsevier (1984), pp. 68–72 (discussion of density classes of suspension for types of separation, use of magnetite, ferrosilicon, mixes, with ferrosilicon use being necessary for denser liquid media).

Heavy liquid media separation vessels may be categorized generally into three classes according to the basic geometry of a cube, a cylinder, or a cone; that is, rectangular baths, horizontal rotating drums, and separator cones. Within these broad descriptions, a wide variety of separation vessels are known to the art, displaying different levels of operability and ability to separate and recover desired fractions from the feed with clean differentiation/purity of each fraction, with minimal or no intermixture. All three of those heavy-media device types are generally considered to be surface separation devices, for they involve a separation at or just below the surface of the separating medium.

All surface separation devices require a dynamic effect to carry the float particles across the surface of the vessel to some point of overflow or discharge. This dynamic effect can be generated by the forward or outward movement of the separating medium itself as it flows to some point of overflow or discharge. In every case, however, this dynamic effect disturbs the surface of the bath, and, since separation takes place in close proximity to the surface, the accuracy of separation to produce fractions with clean differentiation/purity is severely undermined. This problem is further compounded by the violent entry of the feed material into the separating zone of the vessel. In most cases the feed material is introduced at or just below the surface of the liquid medium, at only a single point of entry into the separating zone, thereby creating a relatively violent introduction of the feed material and undesirable turbulence.

Of the three general classes of heavy liquid media separation vessels, the separator cone, owing to its large surface area available for separation, is the most accurate in handling slow-settling, small sized, and near-gravity particles. A cone, however, imposes severe constructional limitations since it demands a significant height in order to enlarge the area of the separating zone and to provide sufficient angle needed for the gravity fall of the sinks. It is also undesirable as a separator because the vessel rise rates and vessel settling rates are at no point the same. Without substantially uniform vessel rise rates and settling rates, all possibility of an accurate separation is forfeited.

Overall the most common vessel shape within heavy media separation is that of a horizontal scrolled barrel. Known scrolled barrels were mono- or bidirectional. Monodirectional barrels were constructed in such a manner that both the floats and the sinks moved in the same direction and exit on the same end of the barrel. Bi-directional barrels had floats and sinks moving in opposite directions relative to one another, and consequently the floats and sinks each exited at opposite ends of the barrel (In a bi-directional barrel the floats at the surface of the bath stream across the length of the barrel mid-section until they reach their point of overflow at the floats discharge end of the vessel, whereas the sinks at the bottom of the bath are screwed in the opposite direction by means of scrolls until they reach the sinks discharge end of the vessel.)

Burt, "Heavy Medium Separation," Gravity Concentration Technology Elsevier, 1984, pp. 139 et seq., discusses the basic parameters and characteristics of that operation. In an introduction, he states that:

Heavy Medium Separation (HMS), alternatively known as Dense-Medium Separation, sink-float separation, or sink and float, is essentially the simplest and one of the most widely applied gravity concentration processes both in minerals treatment and in coal preparation. It is a process applied to the separation of minerals in a liquid or a fairly stable suspension of a predetermined density, chosen such that the density is higher than the lighter constituents and lower than the heavier constituents. In this respect it differs from all other gravity concentration processes, where the medium (generally water) is of a density lower than all the constituents in the ore.

There are two major areas of application for heavy medium separation. It can be used to produce a commercially saleable end product, such as in coal preparation—where it is one of the two primary means of cleaning coal from the shale—and in some industrial minerals applications. Alternatively it can be used to produce an economically acceptable waste product which does not warrant the cost of further treatment: in this case it is a preconcentration device and as such is of major importance in the preconcentration of diamonds, sulphides and metal oxides.

The size range of applicability of the process is large.

The upper size limit is related to the liberation of the constituents in the ore to be separated, although separations coarser than 300 mm are not common. The lower size limit of the process is generally accepted to be 0.5 mm (for dynamic heavy medium); however, even this bottom size is more a function of effective classification and medium recovery than of the process itself.

Page 139

No indication of the potential usefulness of this operation in a system or process for separating and recovering/recycling solid wastes or waste stream fractions/components appears, the prior art recognition of utility being limited to coal and industrial mineral applications, for end product or waste product production.

Commenting that "In principle, heavy medium separation is the simplest of all gravity concentration processes," Burt described the differences between static heavy medium separation, and dynamic heavy medium separation, which was defined as "heavy medium separation carried out at elevated gravitational force normally in a cyclonic separator" (p. 140):

In a static separator HMS vessel, the essential separating force is gravitational and the essential counter force is the resistance to viscous shear. If a range of particles of different specific gravity and size are placed in a fully static vessel filled with a true liquid of a density between the highest and lowest specific gravities of the particles, then those particles with a specific gravity exactly equal to the liquid density will hover. All other particles will, given sufficient time, either sink or float (unless they are so small that Brownian movement becomes significant).

Commercially, suspensions are generally employed, which, although comparatively stable, do have a low rate of settlement.

In dynamic separation, the forces tending to separate heavies and lights are much greater. With a typical cyclone the centrifugal force on a particle at the inlet is up to 20 times the gravitational force in a static bath (Sokaski and others 1968); it is an order of magnitude higher again at the apex. This increased force acts not only on the ore to be separated but on the medium as well and the density of the medium flowing through the apex (heavies) is significantly higher than at the inlet: conversely the density of the medium at the vortex (lights) is significantly lower than at the inlet.

Heavy medium separation, suitably controlled, has the ability of sharp separations at any density within the limits of the medium chosen, and, at very high efficiency, even in the presence of a large proportion of near density materials. The density of separation can be closely controlled, under normal conditions, almost indefinitely within 0.005 e.g. units, but conversely can be rapidly changed if required to meet new operating requirements.

Page 141

Burt considered heavy medium separation not to properly be identified as a unit operation, but rather to constitute a complex "system" with a series of interconnected phases: (a) feed preparation; (b) feed and medium presentation; (c) separation of heavies and lights in a suitable vessel; (d) product recovery; and (e) medium recovery. Describing general operation of a heavy medium separation circuit, Burt reported that:

In operation, the feed must be screened to remove fine ore and slimes prior to it being fed, with reconstituted medium into the separator vessel. Floats and sinks are withdrawn separately and drained, on static or vibratory screens, of the majority of the medium which returns either direct to the system or is cleaned prior to return. Next, the floats and sinks are washed, on vibratory screens to remove essentially all the remaining adhering heavy medium.

The undersize products from the washing screens, consisting of medium, wash water, and fines, are too dilute and contaminated to be returned directly as medium to the separator vessel. They are treated individually, or together, by magnetic separation, to separate the magnetic ferrosilicon, or magnetite, from the non-magnetic fines. Reclaimed, cleaned medium is thickened to the required density by a suitable classifier, which continuously returns it to the HMS circuit The densified medium discharge passes through a demagnetizing coil to assure a non-flocculated, uniform suspension in the separator vessel (Wills 1981, Gochin and Smith 1983).

The circuit must be regarded as a whole for both design and operational purposes. Equipment for each stage must be matched with the rest of the circuit, both in terms of capacity and performance.

Page 142

Plainly, Burt reflects a narrow prior art view of the process and system details that must be used with heavy medium separation, comprehending little or no flexibility.

Burt also extensively discussed the then-known separation vessels for heavy medium separation, breaking them into two main classes of static and dynamic vessels:

Vessels fall into two broad classifications: static and dynamic. There are several differences between them, although the basic principles remain the same: light particles float and heavies sink. In stationary vessels, the separation, generally of particles coarser than 3 mm, is carried out at normal gravity; whilst in dynamic systems finer particles (down to 0.5 mm) are separated at an elevated gravity. Static vessels contain significantly more medium than dynamic vessels. Consequently, the residence time in static vessels is considerably longer than in dynamic vessels.

Static vessels can be subdivided into cone, drum, trough and combination types. The feed is generally introduced at, or near the top of the separator vessel. Light particles float on the surface and are removed over a weir, with a portion of the medium, with or without the assistance of paddles. Removal of the sinks varies from type to type. In cone separators sinks are removed by an internal or external airlift, by pump, or a chain elevator; the sinks from drum separators are normally removed from the medium by lifters mounted inside the drum; in trough separators the sink is removed by chain conveyor or skimmer bar; whilst in combination baths the heavies, having settled through a comparatively shallow, static bath are elevated by a device outside the main bath.

Cone separators are ideally suited to the treatment of coarser coals, in the size range of 100 to 3 mm, especially in the U.S.A., as they handle large quantities of lights, but are less amenable to handling large quantities of sinks. Drum and trough separators, on the other hand, are capable of handling large quantities of sinks which makes them popular in the mineral field where the proportion of heavies can reach 80% (Wills 1981) and in European Coal Preparation plants where often over 50% of the feed will be heavies. The size range of material suitable for these shallow bath separators is 1 m to 6 mm.

Page 149

The teaching of use of cone separators where large quantities of floats are expected, and drum separators where large quantities of sinks are expected, teaches away—actually, lacks any teaching—of vessel choice where one or more vessels in series may be needed and the quantity of floats to sinks varies from approximately the same to one and then the other present in a major quantity.

An extensive review of cone (pages 100–152) and trough separators (pages 156 et seq.) brackets Burt's description of drum separators, which focuses upon the Wemco drum as typical of drum separators. Noting, first, that:

Drum separators are popular heavy medium separation units both in the mineral and coal preparation fields, for separation of feed materials in the range of 5–250 mm.

Drum separators, as their name implies, consist essentially of a rotating cylindrical drum, fitted with lifters on the inside of the drum to elevate the heavies out of the medium bath.

Page 153

The Wemco drum in its one or two compartment configuration is discussed, together with its possible use for two or three product separations:

The Wemco Drum (Fig. 9.6. and 9.7.) is typical of the drum separator type, and it can be used for two or three product separations. The single compartment drum (Fig. 9.6a) is used for single gravity, two product separations, whilst in the two compartment drum, a radial partition divides the drum into two, each compartment operating independently, either:

(a) on dual-gravity operation: new feed material is fed to the first compartment for low gravity separation. The sink product from this compartment is elevated by the lifters and feeds into the second compartment for high gravity separation. (FIG. 9.6b).

(b) on single-gravity operation, either the same feed or a different sized feed is fed into each compartment operating at the same density (Wilson 1978b).

Longitudinal partitions within the drum segregate the lights, on the surface of the medium, from the revolving heavies lifters. The comparatively shallow pool depth in the drum compared with the cone separator minimizes settling out of the medium particles giving a uniform gravity throughout the drum.

Page 153

No particulars are given as to feed introduction or floats/sinks removal, nor is there any recognition or teaching that such may effect through-put and/or perfection/cleanliness of possible separation.

Among the other drum separators described was a "counter current separator":

The Hardinge Counter Current Separator is a rotating drum with a length approximately twice its diameter. To the inside of the drum are fixed spiral flights increasing in height from the feed end to the discharge end. The whole unit is set at a slope of approximately 5 degrees, with the last row of spiral flights exposed above the pool level.

The spiral flights move heavies in the opposite direction to the lights, and they are elevated by lifters to the heavies discharge chute.

Page 155

No controlling preference for any specific vessel was expressed by Burt, but a statement of basic requirements was made:

Whatever type of vessel used, there are certain basic requirements for efficient operation: it should have a high unit capacity related to area; it must allow for efficient feed presentation and product removal; it should require the minimum of circulating medium; hydraulic currents within the vessel should be minimized (difficult in dynamic systems) and it should be capable of accepting particles of widely differing size, shape and specific gravity, but separating them on the basis of specific gravity alone.

Pages 149–150

Prior art rotating drum separation vessels of various configuration used to effect separation of various materials were known. Pelletier, U.S. Pat. No. 4,323,449, Method and Apparatus for Beneficiating Coal, issued Apr. 6, 1982, disclosed the use of a rotating, sloping barrel separation vessel (FIG. 1) having internal spiral/helical flights and frustoconical, foraminous (screen-like) end sections, which function as built-in trommelscreens, into which vessel a mixture of the coal and ash to be separated, and a denser material/liquid medium, were deposited. The coal, which floats, travelled downwardly in the vessel, while the ash material, which sinks, was screwed spirally upwardly. Separation was carried out using the heavy liquid medium concept (col. 1, l. 53—col. 2, l. 4). The system and continuous process disclosed (FIGS. 4A, 4B), used only one separation vessel; the liquid medium had a specific gravity of about 1.2 to about 1.65 (col. 6, ll. 1–5), the specific gravity used being selected "depend[ing] upon the specific content of the ore material being separated." Control of speed of rotation, angle of the slope of axis of the barrel, and the location of deposit of the ore material and the medium into the vessel in combination with the density of the medium, enabled separation of varying coal mixtures, especially where substantial amounts of coal fines were present (col. 3, ll. 8–14).

Pelletier's system was capable of processing only a feed mixture that had one desired product to be recovered - coal, in various sized particles, including fines, from gob piles, and other coal pits and discard locations (see col. 2, ll. 846), with no further separation and recovery of other materials described, or contemplated, from a heterogeneous feed such as presented by solid wastes and waste streams (see col. 1, ll. 9–29; col. 2, ll. 30–46).

Pelletier focuses on an "on the fly" variation in the specific gravity of the liquid medium in the single vessel, to avoid problems presented by variations in gob pile materials and quantities of particular materials (col. 2, ll. 15–19), so as to only need one vessel in his system to extract the desired coal: "The density of the medium added to the barrel 12 is adjusted in accordance with the content of the ore material being treated. The medium is adjusted while it is stored in the tank 150 through selective adjustment of the valve 182 controlling make-up water flow to the medium tank 150" (col. 8, ll. 47–53; cf. col. 2, ll. 24–29). This continuous variation and adjustment of the specific gravity of the liquid medium in one vessel would adversely affect both vessel through-put and a vessel's capability to consistently produce clean/perfect separations of fractions/components on the basis of specific gravity difference, where a heterogeneous feed with multiple desired fraction/component streams was processed.

In fact, where a particular feed combination of coal and ash constitutes a "difficult to separate mixture" (col. 6, l. 20 et seq.), Pelletier teaches adjustment of the barrel angle to increase residence (dwell) time, which concomitantly cuts back on vessel through-put, an adverse result in a continuous process (see col. 6, ll. 14–27). The necessary variation of angle and rotation speed, when confronted with a change in feed characteristics, also requires more complicated control approaches and apparatus.

La Point, U.S. Pat. No. 4,018,567, Apparatus for Separating the Constituents of Lead-Acid Storage Batteries, issued Apr. 19, 1977, disclosed a system and process for treatment of whole or shredded lead-acid batteries, which does not require draining of the acid as an initial step before treatment. It combined physical separation of lead-acid battery components with simultaneous chemical treatment of lead sulfate and neutralization of the electrolyte in the batteries, to facilitate recovery of the lead values therein (col. 1, ll. 20–25).

The reaction and separation device comprised a rotatable drum having first and second ends (FIGS. 1–2), the first end having a combined feed and discharge opening, the second end having a separate discharge opening. First and second trommelscreens were affixed externally to the ends of the drum, fitting over the openings. A charge of grinding balls was placed in the drum before operation, which balls were necessary to further fracture and break down battery components and batteries fed to the device (col. 3, l. 59—col. 4, l. 12).

Means were provided to feed whole or shredded batteries to the drum, through the opening in the first end, together with sodium carbonate and water. The process separated constituents fed in, into three distinct and substantially uncontaminated streams of antimonial lead, active material and organic material (col. 3, ll. 3–8), combining a hydromechanical separation of the battery constituents with chemical treatment to eliminate lead sulfate and battery acid in the same processing vessel (col. 3, ll. 9–13, 25–37; col. 6, ll. 26–40). (The active material consisted of lead, lead oxide and lead sulfate; the organic material consisted of the battery case and separators (col. 3, ll. 18–25)). The suspension density of the bath was preferably maintained at from 1.4 to 2.0 (col. 7, ll. 55–57). A helical scroll on the internal drum surface, aided by longitudinal lifter bars, advanced sinkable battery fragments toward the second end of the drum until obstructed by a transverse baffle plate which restricted further passage to all material larger than a predetermined size, which had the effect of concentrating larger fragments for efficient break-up by the grinding balls. Means were also provided to lift up smaller fragments and deflect them through the second end and out of the vessel (col. 4, ll. 3–13).

La Point emphasized that use of multiple units of equipment to process waste batteries necessarily degraded the efficiency of the method, while presenting undesired space requirements (col. 1, l. 67—col. 2, l. 10). Further, he stated that "obviously, it is desirable in this highly competitive field to devise a method and apparatus for recovering lead values from storage batteries which reduce the initial capital outlay and operating costs to a minimum, Clearly, therefore, an important characteristic of such method and apparatus ought to be the maximum simplicity in processing consistent with the production of lead values of high purity." (col. 2, ll. 3–10). As a consequence, La Point taught away from any use of more than one separation vessel performing a single hydromechanical separation (simultaneously with the chemical transposition of lead sulfate particles into lead carbonate (col. 3, ll. 26–37)). The stated general object of the invention confirm this "one vessel only," one stage only teaching:

> It is a general object of the invention to provide a completely self-contained, nonpolluting, hydromechanical apparatus for lead-acid battery constituent separation which performs simultaneously several important steps in such separation, heretofore performed successively, by combining a multiplicity of separate processing stations into a single, all-purpose processing stage.

(col. 2, l. 67–col. 3, l. 2)

Both Pelletier and La Point, then, affirmatively directed one of ordinary skill in the art away from any system or process using more than one separation vessel and/or more than one separation stage to, inter alia, effect a heavy liquid medium separation.

Much work has recently been done by the inventor in researching the specific, key characteristics of separation vessels comprising a bidirectional heavy liquid medium separator (which work does not constitute prior art to this invention). Cf. Olivier, U.S. Pat. No. 5,373,946, System for Media Separation of Solid Particles, issued Dec. 20, 1994 (the "'946 patent"); Olivier, U.S. Pat. No. 5,495,949, System for Treating Solid Particles in a Medium, issued Mar. 5, 1996 (the "'949 patent"), each of which is incorporated herein by reference. The bi-directional heavy liquid medium separation vessels disclosed in the '946 and '949 patents, when constructed have a number of features and characteristics that favor a near perfect heavy liquid medium separation having a clean differentiation/purity of fractions by satisfying a number of requirements:

1) The proper introduction of the feed material into the bath is the first requirement in making a good dense medium separation. In a '946/'949 bidirectional separation vessel, the feed material drops into an injector filled with a fast-moving stream of liquid medium. The medium plus solids enter the separation zone where they are well distributed over a broad three-dimensional front, thus preventing floats from being entrapped with sinks.

2) A stable and uniform density throughout the bath is the second requirement. In a '946/'949 bi-directional separation vessel a stable medium is assured by the bi-directionality of the drum and by operating the vessel to maintain a shallow depth of the bath (40–50 cm). Bi-directionality creates a gentle counter-current flow dynamic which maintains a stable and uniform density throughout the bath.

3) No error on the float side of the barrel is the third requirement. A '946/'949 bi-directional separation vessel may be built to have a very long separation zone, 4 to 5 meters in length, which assures a very long residence time of the feed material in the separation zone. A long separation zone free of turbulence allows for an extremely accurate separation. Also, there are no paddles moving floats along, as in the known Drewboy separator; there is no lifting of sinks in the separation zone, also as in most mono-directional barrels; there are no curs in the separation zone, as in most mono-directional barrels; and there is no sinks evacuation chute in the separation zone, as in most mono-directional barrels. Without all of these devices in the separation zone, the full surface of the bath is available for separation, and, most importantly, all unnecessary turbulence is eliminated. A 2.4 meter diameter '946/'949 bi-directional drum can handle more than 100 TPH of floats, and a 3-meter diameter bidirectional drum can handle more than 200 TPH of floats.

4) No error on the sink side is the fourth requirement. In bi-directional separation vessel, a curtain may be provided to prevent floats from crossing over with sinks, which is situated completely outside the separation zone. Sinks are lifted up preferably by means of a scrolled cone, but only when completely outside of the separation zone. Since the drum can be rotated as much as 20 rpm, in current design, this provides substantial sinks evacuation capacity, with little danger of floats reporting with sinks. A 2.4-meter diameter '946/'949 bi-directional drum with a curtain can evacuate more than 50 TPH of sinks, and a 3-meter diameter barrel can handle more than 100 TPH of sinks.

Bi-directionally offers other advantages. De-watering and/or rinsing devices can be situated on both sides of the barrel easily handling a situation of almost 100% floats or 100% sinks. This translates into very large input tonnages; 6 ft-, 8 ft- and 10-ft diameter barrels can handle 75, 150, and 300 TPH of input respectively.

The bi-directional heavy liquid medium separation vessel however, while it may hold out the potential of substantially perfect separations of feed particulates at a given specific gravity of the liquid media, is not itself a solution to the problem of separation and recovery/recycling of a series of components of automobile, industrial commercial construction, demolition, agricultural and municipal solid wastes and waste streams. Separation and recovery/recycling of only a part of a solid wastes and waste stream leaves a residue of material that still must be disposed of. Disposition of the entire waste solids and waste stream in one system and process is the problem that the art has as yet failed to resolve.

An overall system and process, to solve that problem, must be capable of a series of separations, including sequential separations on a first separated stream or fraction, to recover a variety of fractions and product materials from the heterogeneous feed mixture of particulate solids. The separations and recovery of the fractions must be such as to be as close to perfect/clean as is practicable, with minimal or no intermixture of product streams. The overall system and process must have the flexibility to handle varied quantity of components and nature of components in the feed solid wastes and waste streams, without substantial diminution in separation efficiency or perfection/cleanliness of separation. An overall system and process must have maximum cost effectiveness, including effective recovery and recycle of the heavy liquid medium densifying or suspension creating material, which is a particulate solid. In high through-put solid wastes and waste streams systems and processes, the cost economics of the treatment system often defeat the system and process efficacy, because the volumes at issue magnify small cost negatives, viewed on a unit basis, into a substantial impediment to the system. For example, the need for expensive components needed to carry out a separation, if those components cannot be separated, recovered and recycled, teaches away from use of any particular unit operation in a waste treatment system. If a sequence of such operations would be necessary to accomplish necessary separations and recoveries, one of skill in the art is strongly motivated to avoidance of that operation and that sequence in repeated separation stages, as the negative economics increase in direct proportion to each repeated use.

The sequence of separations, the apparatus used to carry out each separation, the apparatus used to remove, recover and recycle the suspension creating material, and the specific gravity of liquid medium selected in each separation, all present substantial variation and difficulty even if one somehow was led to pick-out a density separation technique from the myriad known in the art to provide general basis for an overall system and process that disposes of an entire solid waste and waste stream.

In fact, conventional wisdom and knowledge in the art teaches away from the use of a heavy liquid medium separation-based system and process in a number of situations, particularly where solid wastes and waste streams include light, porous materials, such as foam rubber and textiles. The prior art understands that light porous materials should not be allowed to enter a heavy liquid medium separation vessel for three (3) reasons:

1) Because of its large surface area relative to its mass, porous material responds poorly to the float/sink dynamic of a Newtonian liquid;

2) Because porous material absorbs the suspension media used in creating the liquid medium, problems are presented in that these suspension media cannot be recycled economically; and 3) Because porous material absorbs water, it would exit a dense medium bath at a relatively high moisture content, and the economics of its later disposal would be placed in jeopardy.

Instead, air separation is the prior art recognized and accepted unit operation for separating light porous materials from solid wastes and waste streams, the method being recognized to have a number of advantages favoring isolation of light porous materials.

There remains, then, the need for a system and process capable of separating for complete recovery/recycling a heterogeneous mixture of particulate solids from solid wastes and waste streams, those solids having a plurality of different specific gravities, effectuating in that system and process a plurality of clean/pure separations on the broad range of materials found in such solid wastes and waste streams, which differ only slightly in specific gravity and which must be separated in a high through-put, cost-effective way on an industrial and commercial scale.

SUMMARY OF THE INVENTION

The present invention provides a system and process for continuously separating a heterogeneous mixture of particulate solids, said solids having a plurality of different specific gravities, using a plurality of liquid media of different specific gravity, said heterogeneous mixture being separated into a plurality of fractions, each of different specific gravity.

The process generally comprises:

(a) a first separation stage, further comprising introducing said heterogeneous mixture into a first separation vessel, containing a first liquid medium having a first specific gravity of about 1.0, such that said heterogeneous mixture contacts said first liquid medium, a first part of said mixture rising in the liquid medium as float particles, the remaining part settling in the liquid medium as sink particles, whereby porous materials present in said heterogeneous mixture having a specific gravity of less than about 1.0 are substantially separated as said float particles; (b) removing said float particles from said first vessel, to recover a porous product material; (c) removing said sink particles from said first vessel; (d) a second separation stage, further comprising introducing said sink particles from said first separation stage into a second separation vessel, containing a second liquid medium having a second specific gravity, different from the specific gravity of said first liquid medium, said liquid medium including a waste-derived particulate suspension media component present in a quantity sufficient to attain said second specific gravity, such that said sink particles contact said second liquid medium, a first part of said particles rising in the liquid to form float particles, the remaining part settling in the liquid medium as sink particles, whereby organic materials present in said sink particles from said first separation stage are substantially separated as float particles; (e) removing said organic float particles from said second vessel as a substantially organic particulate mixture; and (f) removing said sink particles from said second vessel as a substantially inorganic particulate mixture.

The process also comprises classifying a portion of said sink particles from the first separation stage, preferably that portion of the inorganic solid particles entering said first separator vessel having an average particle size of less than about 1 mm, to isolate a waste-derived solid particulate media fraction containing substantially no organic material or clay. In that variation on the process of the invention, the second separation stage may further comprise introducing the portion of said particles removed from said first separation stage and not classified, into said second separation stage, and continuing the process as described above.

In a preferred embodiment of the invention, the process comprises (a) a first separation stage, further comprising introducing said heterogeneous mixture into a first separation vessel, containing a first liquid medium having a first specific gravity of about 1.0, such that said heterogeneous mixture contacts said first liquid medium, a first part of said mixture rising in the liquid medium as float particles, the remaining part settling in the liquid medium as sink particles, whereby porous materials present in said heterogeneous mixture having a specific gravity of less than about 1.0 are substantially separated as said float particles; (b) removing said float particles from said first vessel, to recover a porous product material; (c) removing said sink particles from said first vessel; (d) a second separation stage, further comprising introducing the said sink particles from said first separation stage into a second separation vessel, containing a second liquid medium having a second specific gravity, different from the specific gravity of said first liquid medium, said liquid medium including a waste-derived particulate suspension media component present in a quantity sufficient to attain said second specific gravity, such that said sink particles contact said second liquid medium, a first part of said particles rising in the liquid to form float particles, the remaining part settling in the liquid medium as sink particles, whereby organic materials present in said sink particles from said first separation stage are substantially separated as float particles; (e) removing said organic float particles from said second vessel as a substantially organic particulate mixture; (f) removing said sink particles from said second vessel as a substantially inorganic particulate mixture; (g) recovering and recycling said waste-derived particulate suspension media component into said second separation stage; (h) performing at least one additional separation upon said substantially organic particulate mixture, comprising a third separation stage using a third separation vessel containing a third liquid medium having a third specific gravity, different from the specific gravity of each of said first and second liquid mediums, said liquid medium including a waste-derived particulate suspension media component present in a quantity sufficient to attain said third specific gravity, to obtain at least one organic product material; and (i) performing at least one additional separation upon said substantially inorganic particulate mixture, comprising a fourth separation stage using a fourth separation vessel containing a fourth liquid medium having a fourth specific gravity, different from the specific gravity of each of said first, second and third liquid mediums, said liquid medium including a non waste-derived particulate suspension media component present in a quantity sufficient to attain said fourth specific gravity, to obtain at least one inorganic product material.

The preferred embodiment also comprises classifying a portion of said sink particles from the first separation stage, preferably that portion of the inorganic solid particles entering said first separator vessel having an average particle size of less than about 1 mm, to isolate a waste-derived solid particulate media fraction containing substantially no organic material or clay. In that variation on the preferred process of the invention, the second separation stage may further comprise introducing the portion of said particles removed from first separation stage and not classified, into said second separation stage, and continuing the preferred process as described above.

A more preferred embodiment of the invention having a fourth separation stage which includes contact of said substantially inorganic particulate mixture with said fourth liquid medium, a first part of said inorganic particulate mixture rising in the liquid to form float particles, the remaining part settling in the liquid medium as sink particles, whereby a first inorganic materials fraction present in said inorganic particulate mixture from said fourth separation stage is substantially separated as float particles from said particulate mixture, is also provided, comprising the further steps of (k) removing said first inorganic materials fraction from said fourth vessel as a substantially inorganic particulate mixture; (l) removing as a second inorganic materials fraction said sink particles from said fourth vessel, as a substantially inorganic particulate mixture; and (m) performing at least one additional separation upon said first inorganic materials particulate mixture fraction, comprising a fifth separation stage using a fifth separation vessel containing a fifth liquid medium having a fifth specific gravity, different from the specific gravity of each of said first, second, third and fourth liquid mediums, said liquid medium including a non waste-derived particulate suspension media component present in a quantity sufficient to attain said specific gravity, to obtain at least one further inorganic product material.

The more preferred embodiment also comprises classifying a portion of said sink particles from the first separation stage, preferably that portion of the inorganic solid particles entering said first separator vessel having an average particle size of less than about 1 mm, to isolate a waste-derived solid particulate media fraction containing substantially no organic material or clay. In that variation on the more preferred process of the invention, the second separation stage may further comprise introducing the portion of said particles removed from first separation stage and not classified, into said second separation stage, and continuing the preferred process as described above.

The present invention also provides a system for continuously separating a heterogeneous mixture of particulate solids having a plurality of different specific gravities, into a plurality of fractions, each of a different specific gravity, using a plurality of liquid media of different specific gravity. The system generally comprises:

(a) a first separation vessel for receiving said heterogeneous mixture, containing a first liquid medium having a first specific gravity of about 1.0, which medium contacts said heterogeneous mixture, for causing a first part of said mixture to rise in the liquid medium as float particles, and the remaining part to settle in the liquid medium as sink particles, said vessel including means to remove said separated float particles without intermixture with said sink particles and means to remove said separated sink particles without intermixture with said float particles; and (b) a second separation vessel for receiving said sink particles from said first separation vessel containing a second liquid medium having a second specific gravity different from the specific gravity of said first liquid medium, said second liquid medium including a waste-derived particulate suspension media component present in a quantity sufficient to attain said second specific gravity, which second medium contacts said sink material, for causing a first part of said material to rise in the liquid medium as float particles, and the remaining part to settle in the liquid medium as sink particles, said vessel including means to remove said separated float particles without intermixture with said sink particles, as a substantially organic particulate mixture, and means to remove said separated sink particles without intermixture with said float particles, as a substantially inorganic particulate mixture.

Each of said first and second separation vessels in such system may also include curtain means for preventing float particles from becoming internally intermixed with sink particles, said curtain means preferably being located outside the separation zone in each of said vessels.

The system may also include a classifier for separation of waste-derived particulate suspension media from a portion of the sink particles removed from said first separation vessel, preferably that portion of the inorganic solid particles entering said first separator vessel having an average particle size of less than about 1 mm, said media containing substantially no organic material or clay. Where such a classifier is part of the system, the portion of said sink particles from said first separation vessel not processed through said classifier is then received by said second separation vessel.

A preferred embodiment of the system of the invention further comprises (c) a third separation vessel for receiving said substantially organic particulate mixture from said second separation vessel containing a third liquid medium having a specific gravity different from the specific gravity of each of said first and second liquid mediums, said third liquid medium including a waste-derived particulate suspension media component present in a quantity sufficient to attain said third specific gravity, which third medium contacts said substantially organic particulate mixture, for causing a first part of said mixture to rise in the liquid medium as float particles, and the remaining part to settle in the liquid medium as sink particles, said vessel including means to remove said separated float particles without intermixture with said sink particles, as first organic materials, and means to remove said separated sink particles without intermixture with said float particles, as second organic materials, and (d) a fourth separation vessel for receiving said substantially inorganic particulate mixture from said second separation vessel, containing a fourth liquid medium having a specific gravity different from the specific gravity of each of said first, second and third liquid mediums, said fourth liquid medium including a non waste-derived particulate suspension media component present in a quantity sufficient to attain said fourth specific gravity, which fourth medium contacts said substantially inorganic particulate mixture, for causing a first part of said mixture to rise in the liquid medium as float particles, and the remaining part to settle in the liquid medium as sink particles, said vessel including means to remove said separated float particles without intermixture with said sink particles, as first inorganic materials, and means to remove said separated sink particles without intermixture with said float particles, as second inorganic materials.

Each of said first, second, third and/or fourth separation vessels in said preferred embodiment may also include curtain means for preventing float particles from becoming internally intermixed with sink particles, said curtain means preferably being located outside the separation zone in each of said vessels.

A more preferred embodiment of the system of the invention further comprises (e) a fifth separation vessel for receiving said first inorganic materials from said fourth separation vessel, containing a fifth liquid medium having a specific gravity different from the specific gravity of each of the first, second, third and fourth mediums, said fifth liquid medium including a non waste-derived particulate suspension media component present in a quantity sufficient to attain said fifth specific gravity, which fifth medium contacts said first inorganic materials from said fourth separation vessel, for causing a first part of said materials to rise in the liquid medium as float particles, and the remaining part to settle in the liquid medium as sink particles, said vessel including means to remove said separated float particles without intermixture with said sink particles, as a third inorganic materials, and means to remove said separated sink particles without intermixture with said float particles, as a fourth inorganic materials.

Each of said first, second, third, fourth and/or fifth separation vessels in said more preferred embodiment may also include curtain means for preventing float particles from becoming internally intermixed with sink particles, said curtain means preferably being located outside the separation zone in each of said vessels.

The preferred processes and systems of the invention will also effect and enable recovery and recycling in each separation stage of waste-derived particulate suspension media component and non waste derived particulate suspension media component present in the liquid medium in each vessel in each said stage.

Where the more preferred system and process of the invention is used, the specific gravities used in the respective liquid mediums of each of the five separation vessels are preferably arrayed in a particular order, which neither ascends nor descends in any uniform arithmetic or other mathematical progression. The sequence instead is arranged to optimize efficiency and perfection/cleanliness of separation and recovery, as follows:

| Separation Vessel | | Specific Gravity |
|---|---|---|
| First | (Separate porous materials) | 1.0 |
| Second | (Separate organic/inorganic materials) | 1.6 |
| Third | (Separate high chlorine/low chlorine organics) | 1.25 |
| Fourth | (Separate heavy metals) | 3.2 |
| Fifth | (Separate aluminum/magnesium) | 2.2 |

A particularly preferred embodiment of the system further includes rinsers for each separated stream exiting from each of the second, third, fourth, and fifth separator vessels. If the system embodiment includes only two, three, or four separation vessels, then that system would, in a particularly preferred embodiment, include rinsers for each separated stream exiting from each of the second, third and fourth separation vessels. An especially preferred rinser device, a scrubber-rinser, which provides a combined scrubbing and rinsing action to removed particulates in a separated stream exiting from a separating vessel, is provided, in additional embodiments, for each separated stream exiting from each of the second, third and fourth separation vessels; or for each separated stream exiting from each of the second, third, fourth and fifth separation vessels, if a fifth vessel is provided. For each separation vessel, then, a pair of scrubber-rinsers is provided, one for the floats product stream, the other for the sinks product stream, in such embodiments.

The system and process of the invention presents an approach to solid waste or waste stream management which eliminates the need for incineration and/or use of landfill to dispose of these materials, while further providing a means by which every component or fraction of the heterogeneous waste material generates, on average, a financial return exceeding cost of recovery of the waste material.

The system according to the invention is ideally suited for separating particles with a size from 1 mm up to 300 mm or even more. These particles cover a broad range of materials such as non-ferrous metals and plastics. The specific gravity of the medium may be as low as 1.0 and as high as 3.5. The actual medium is usually water-based with very fine colloidal particles in suspension. The maximum quantity of particles that may be used in the liquid medium approximates 40% vol, as any greater quantity results in a medium too viscous to carry out the necessary separations.

The 1.0 specific gravity separation vessel, because there is no added suspension media component present in the liquid medium—the liquid medium is water—is not, most rigorously, conducting a classical heavy liquid medium separation, although the preferred device for this step is certainly a heavy liquid medium separation vessel in its manner of general operation. The explicit, actual specific gravity in the 1.0 specific gravity separation vessel, dependant upon the specific make-up of the heterogeneous material being input, may vary somewhat dependant on the presence of fine particulates. As with the other specified specific gravities for the liquid mediums, it is the average specific gravity of the liquid medium which controls which materials will float and which will sink in the vessel. The liquid medium comprises water as a component and one or more finely divided, solid particulates, as a second component, the presence of the solids serving to increase the specific gravity/density of the overall liquid medium. If "fine-enough" particulate is present also in the feed stream to the vessel that may also go into suspension in the liquid and cause the specific gravity to change. The amount of change and the direction of change (most usually to increase the specific gravity) will depend upon the quantity of fine-enough particulate supplied, and its density in contrast to the deliberately-supplied solid component. By application of monitoring and control equipment of the type well-known in the art, the liquid medium specific gravity may be maintained at a constant value despite such adventitious introductions of other fines through feed streams. Use can be made of a metal cylinder which is constantly floated in the medium, whose behavior/motion is converted by means of a computer to a value indicating the specific gravity of the liquid medium. Adjusting may then be done by adding or separating off water (although, adjusting could also be done by adding or separating out the solid particulate media, as well).

As alternatives to the production and use of waste-derived suspension media, as described as an alternate part of the invention herein, one skilled in the art, advised by the teachings of the invention, could select and use a fine sand, of the necessary particle size and range, without organics or clay, as a substitute. Another alternative for attaining specific gravities of 1.25 or 1.6, for liquid media based upon water, would also be magnetite. Use of magnetite for these specific gravities is not preferred, however, because of cost, and cost-related potential separation and recovery/recycling difficulty, in the context of the overall system and process.

With certain solid wastes and waste streams, the separation economics strongly point to the use of waste-derived particulate suspension media. Because of the small quantity of non-ferrous metal usually present in municipal waste, recovery of magnetite, ferrosilicon or mixtures thereof is essentially impossible from a cost effectiveness standpoint If the amount of magnetite, ferrosilicon or mixtures thereof, which would be necessary to attain the necessary quantities of 1.25 and 1.6 specific gravity liquid media, could not be recovered, the economics of the entire system and process of the invention would be seriously biased to the point where effective commercial use of the invention might not prove feasible.

The various streams recovered from each separation stage as product materials may, in turn, be subjected to further processes as are known to those of ordinary skill in the art to be applicable to recycle streams and products from solid wastes and waste streams. Thermolysis, chemolysis and other decomposing/degradative/reforming type unit operations may be carried out to produce more basic, constituent streams from direct separation products.

The preferred processes of the invention will separate and recover/recycle substantially all materials present in the usual ASR solid wastes and waste stream as it will for the usual heterogeneous materials found in industrial, commercial, construction, demolition, agricultural and municipal solid wastes and waste streams. The process demonstrates flexibility in its ability to carry out as many separation stages using heavy liquid medium separation as are necessary to dispose of the entirety of the original solid waste feed stream, obviating the problem of dealing with separation residue that might otherwise require landfill or incineration. By proper selection of the liquid media specific gravities used in each separation vessel, the operator will be able to produce clean/pure separations continuously, unaffected by change in relative quantities of components or fractions within the solid wastes and waste streams, or by change in through-put of the waste stream being treated (as long as maximum design capacity for the system or any individual vessel is not exceeded).

In the invention, the fully continuous process and system/apparatus removes and avoids the prior art problems of failure to provide for and continuously treat all components in a waste stream, to separate and recover all such material in fractions either directly usable or readily processed further to usable products or materials. The use of multiple separation vessels maintains and maximizes through-put and minimizes residence time lost to equipment adjustment. The fully continuous process and system/apparatus of the invention provides for fill separation and recovery of all viable fractions, components or streams present in the overall heterogeneous solid wastes and waste streams. This maximizes cost recovery from the treated wastes, which provides a "pay as you go" system that also will assist in recovery of initial capital expenditure for the equipment.

It is the combination of truly continuous operation; complete separation and recovery/recycling of all constituents to the heterogeneous feed, through a series of heavy liquid medium separatoins; production and use of water-derived particulate suspension media; and recovery and recycle of all otherwise consumable, expensive materials essential to the unit separation operations, viz. the solid particulate suspensin media, especially the magnetite and ferrosilicon, at the substantial, industrial/commercial through-puts of which the system and process is capable, among other things, that diferentiates this invention over the prior art, and leads to the soluiton of the major problems that are neither addressed nor solved.

Thus, it is a general object of the present invention to provide a system and process for continuous separation and recovery/recycling of all materials from solid wastes and waste streams, which continuously separates all of a heterogeneous feed mixture of particulate solids having a plurality of different specific gravities, through the use of a plurality of liquid media of different specific gravities, into a plurality of fractions each of a different specific gravity.

It is a further object of this invention to provide a system and process for continuous separation and recovery/recycling of all materials from solid wastes and waste streams, which self-generates a waste-derived solid particulate suspension media fraction, and uses that fraction, with optional use of a non-waste derived solid particulate suspension media component such as magnetite and/or ferrosilicon, to provide the various specific gravity liquid media that and as may be necessary to each separation stage, while recovering and recycling each of said suspension media, whereby a low cost, commercially practical waste treatment operation may be achieved.

It is another object of this invention to provide a system and process for continuous separation and recovery/recycling of all materials from solid waste and waste streams which uses bidirectional heavy liquid medium separation vessels to perform all necessary separations, including the initial separation of porous materials using a liquid medium of a specific gravity of about 1.0.

It is also an object of this invention to provide a system and process for continuous separation and recovery/recycling of all materials from solid waste and waste streams which use rinsers on each floats particles and each sinks particles output stream from each separator whose liquid media includes either a waste-derived or a non-waste derived solid particulate suspension media component, to maximize recovery and recycling of each suspension media component, it being a further object of this invention to use a specific rinser configuration and operation, that of a scrubber-rinser, to provide that function to the system and process of the invention.

BRIEF DESCRIPTION OF THE DRAWINGS

These and other advantages and objects of the present invention will be more fully understood in conjunction with the accompanying drawings, in which like numerals represent like elements, and in which:

FIG. 19 is a spreadsheet identified as Spreadsheet 1, relating to an illustration of the economics of thermolysis of the invention;

FIG. 21 is a spreadsheet identified as Spreadsheet 2 relating to an illustration of the economics of recycling of automobiles;

FIG. 22 is a spreadsheet identified as Spreadsheet 3 relating to an illustration of the economics of recycling U.S. residential waste.

FIG. 26 is an end cross sectional view of one embodiment of the thermolysis oven diagrammatically illustrated in FIG. 18;

DETAILED DESCRIPTION OF INVENTION AND PREFERRED EMBODIMENTS

System and Process Overview

Figure 1:
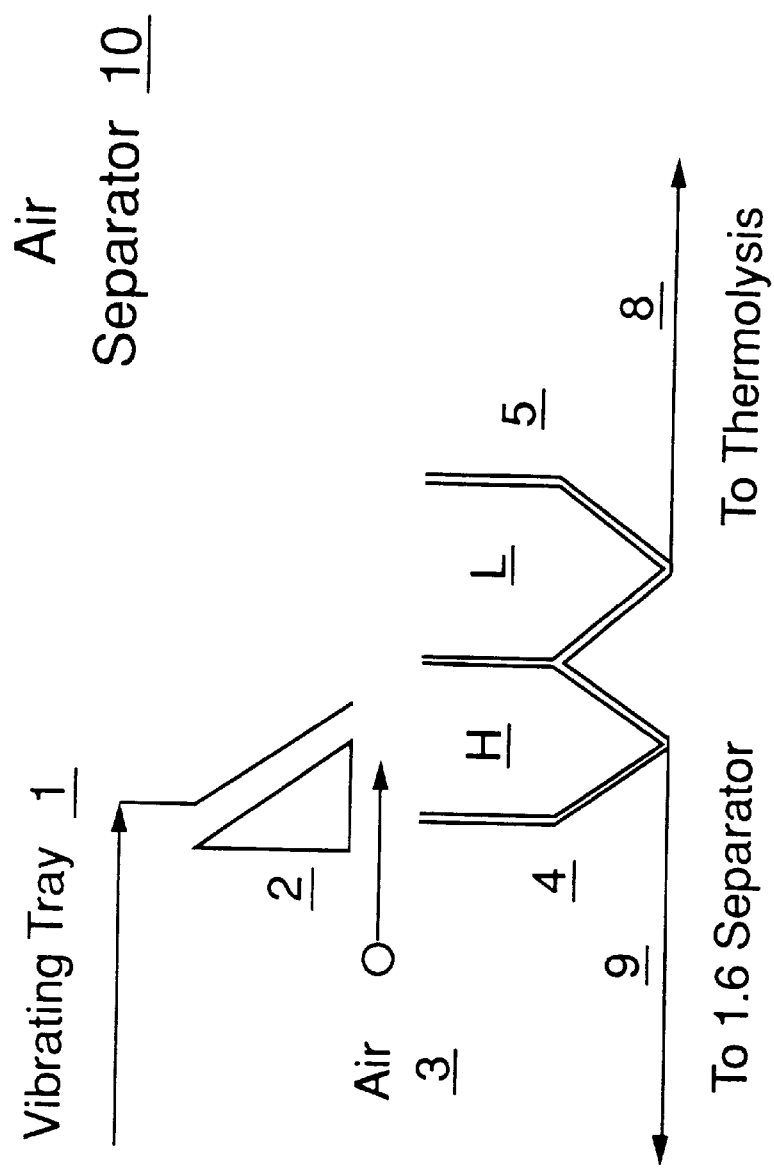
FIG. 1 is a diagrammatic/block representation of an air separator configured to relate to portions of the system of the invention.

The preferred embodiments of the system and process of the invention broadly include apparatus and process steps to carry out the following unit operations:

Size Reduction and Size Classification

Dense Liquid Medium Separation—1.00 specific gravity

Dense Liquid Medium Separation—1.60 specific gravity

Dense Liquid Medium Separation—1.25 specific gravity

Dense Liquid Medium Separation—3.20 specific gravity

Dense Liquid Medium Separation—2.20 specific gravity

The solid wastes and waste streams presented for treatment by the preferred system and process involve, in the usual case, one or more of ferrous metals; light organics, such as paper, cardboard, wood textiles and foamed materials, both flexible e.g., "foam rubber") and rigid (foamed polystyrene, e.g. Styrofoam brand rigid foamed materials); glass; non-ferrous metals, such as aluminum and magnesium; heavy metals; non-metallic inorganics; garden wastes; forestry wastes; and food and agricultural waste.

Size Reduction

The solid wastes and waste stream materials must initially be converted into a particulate and fragmentized form, if not already in that form or otherwise reduced in size and put into a particulate form. This unit operation can be carried out in a variety of ways, with various devices, all as is well-known in the art.

Fragmentization may be carried out by means of a high speed impact device called a hammermill. A hammermill consists of a number of hammers loosely or flexibly fastened to an inner shaft which rotates at speeds from 700 to 1200 rpm. As these fast-moving hammers hit the waste, they fragmentize and break it into a multitude of smaller pieces.

Because a hammermill is an impact device, it works best on brittle materials such as glass and metals. A hammermill will usually adequately size reduce/fragmentize non-brittle materials such as plastic, cardboard and paper. Certain rubber and textiles do not fragmentize very well, and they may pass through the hammermill without undergoing any significant reduction in size. However, those objects which do not fragmentize very well do not necessarily require reduction or re-shredding by further treatment: Because they consist primarily of organic materials from categories 2 and 3, in most cases they have only to be size classified and removed from the process flow. Oversize objects still containing significant amounts of unliberated inorganic material may be routed to a shear shredder, and the product of the shear shredder can be routed back to the hammermill so as to assure adequate fragmentization.

A shear shredder may also be used to shred or size reduce the solid wastes and waste streams, to cause size reduction, fragmentization and particulate formation. A shear shredder uses two opposing counterrotating blades to cut the materials with a scissors-like action. Shear shredders are well-known in the art, including shredders used in reducing scrap automobiles to a heterogeneous mixture in the course of using them as a source of feed steel for minimal steel manufacturing processes.

The system and process of the invention is particularly useful in separating and recovery/recycling of automotive shredder residue, referred to by the art as "ASR". ASR is the resulting material after the extraction from used automobiles, trucks, etc. of the ferrous materials (essentially steel, and steel-containing components) used as source material for mini mill steelmaking. The industrial scale shredders that are fed a used automobile have the capability of rendering the vehicle into a collection of heterogeneous particulate materials having a usual size ranging between dust and 160 mm. This shredder residue feed is substantially non-ferrous in its most preferred form, when treated in the system and process of the invention.

In one of the preferred embodiments of the invention, a steel conveyor belt feeder with a partially enclosed feed hopper, is loaded with ASR. The conveyor moves this feed material to an oversize trommelscreen through which the feed material is processed to separate and remove particles greater than 150 mm in average size. The oversize >150 mm material drops into oversize storage bin It is later recycled for reshredding and reintroduction into the process. The remaining material proceeds to the next processing step as the feed material.

Size Classification

After the solid wastes and waste stream materials have been size reduced/fragmentized, the next step involves size classification. Where the 1.0 specific gravity heavy liquid medium separation vessel is used in the first separation stage, size classification is preferably carried out to remove feed particles smaller than 13 mm (½ inch) and larger than 160 mm (6 inch).

Bi-Directional Heavy Liquid Medium Separation

Figure 9:
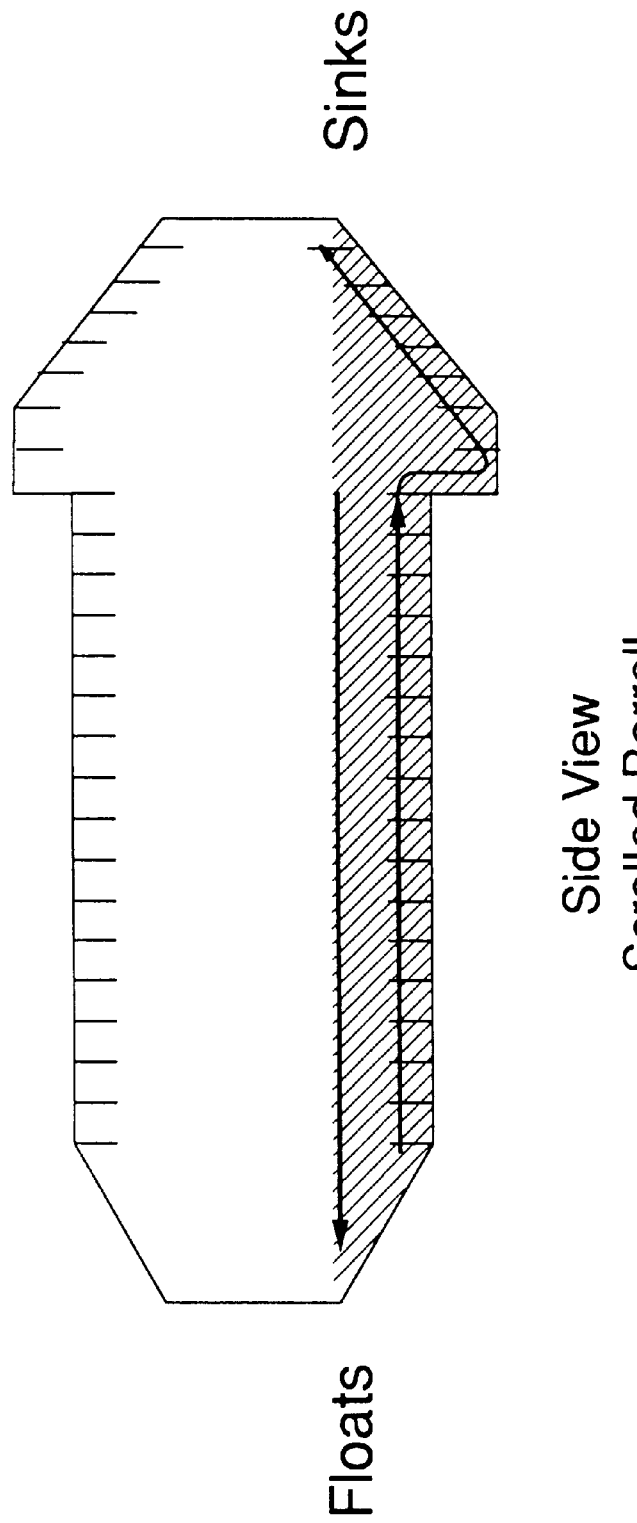
FIG. 9 is a diagrammatic side view cross section of a bi-directional heavy liquid medium separation vessel used in one embodiment of a process and a system of the invention.
Figure 10:
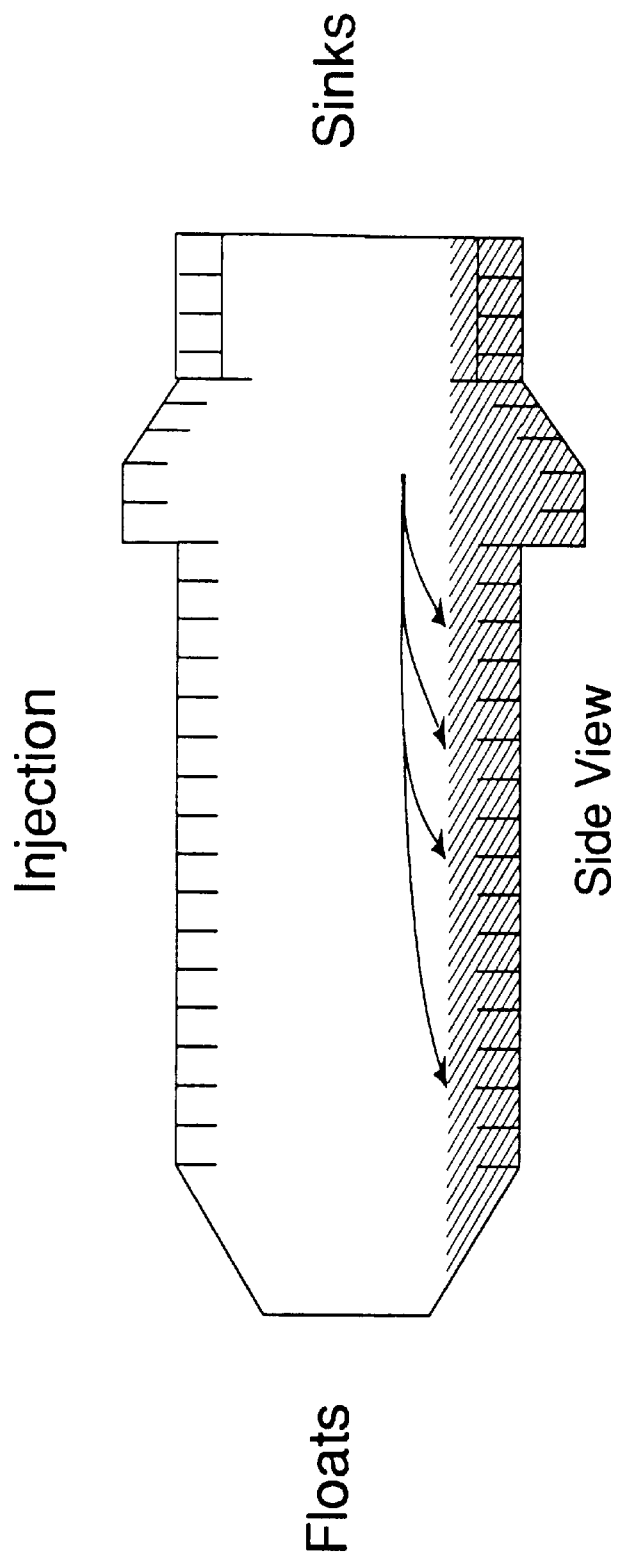
FIG. 10 is a diagrammatic side view cross section of particulate feed injection into a bi-directional heavy liquid medium separation vessel used in one embodiment of a process and a system of the invention.

The bidirectional heavy medium liquid separation vessels of the particularly preferred processes of the invention (see FIG. 9) make five separations: the first at 1.0 specific gravity, the second at 1.6 specific gravity, the third at 1.25 specific gravity, the fourth at 3.2 specific gravity and the fifth at 2.2 specific gravity. The preferred heavy liquid medium separation vessels of this invention have several unique features:

1) Each use a three-dimensional medium injection (see side view, FIG. 10). The heterogeneous solid waste and waste stream particles to be separated are injected into the separation zone in a fast-moving stream of medium. The more massive particles, as well as those particles of a density far from the density of separation, separate out very rapidly, while the least massive particles as well as those particles closest to the density of separation require a much greater time and space to separate correctly. This injection over a broad three-dimensional space assures minimal particle interference, and it minimizes the probability of floats being entrapped within sinks.

Figure 11:
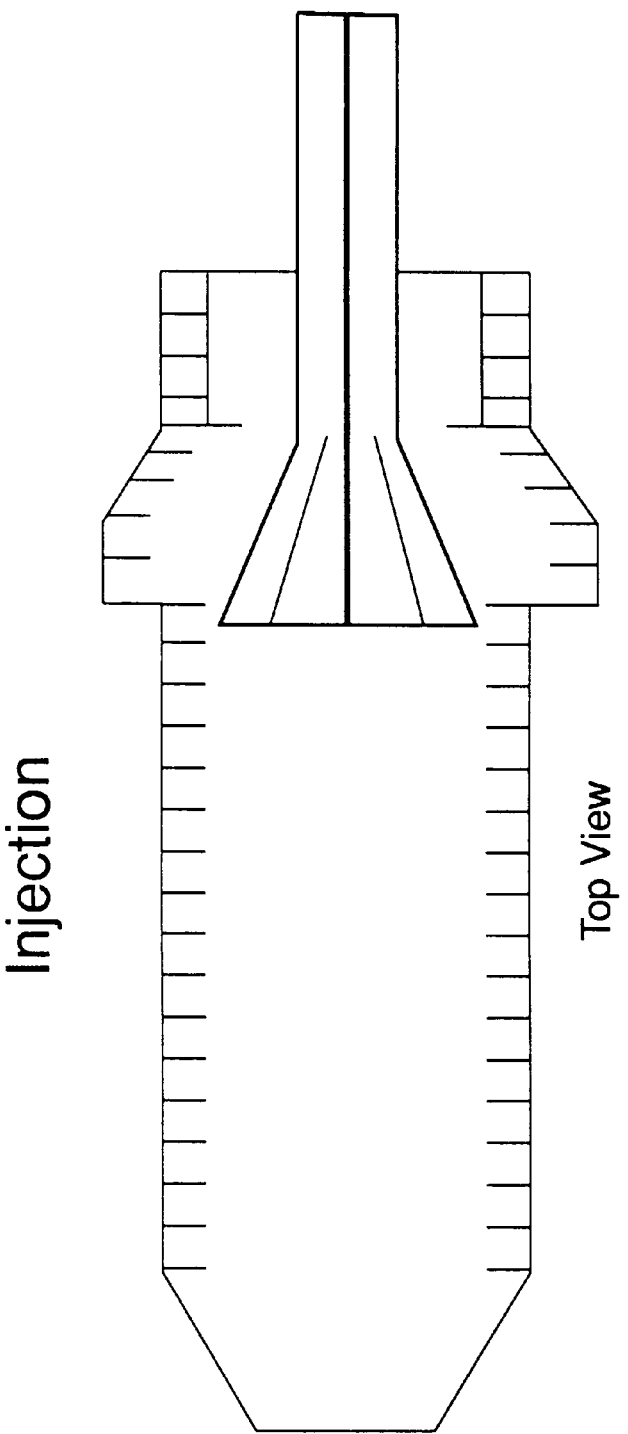
FIG. 11 is a diagrammatic top view cross section of multiple particulate feed injection patterns into a bidirectional heavy liquid medium separation vessel used in one embodiment of a process and a system of the invention.

2) The preferred three-dimensional injection is also a multi-point injection, taking place in multiples of two (see top view, FIG. 11). A 1.8 m (6 ft) diameter barrel, for example, would have two points of entry into the separation zone, whereas a 2.4 m (8 ft) diameter barrel would have four points of entry. This multiple injection also assures minimal particle interference and further minimizes the probability of floats being entrapped within sinks.

Figure 12:
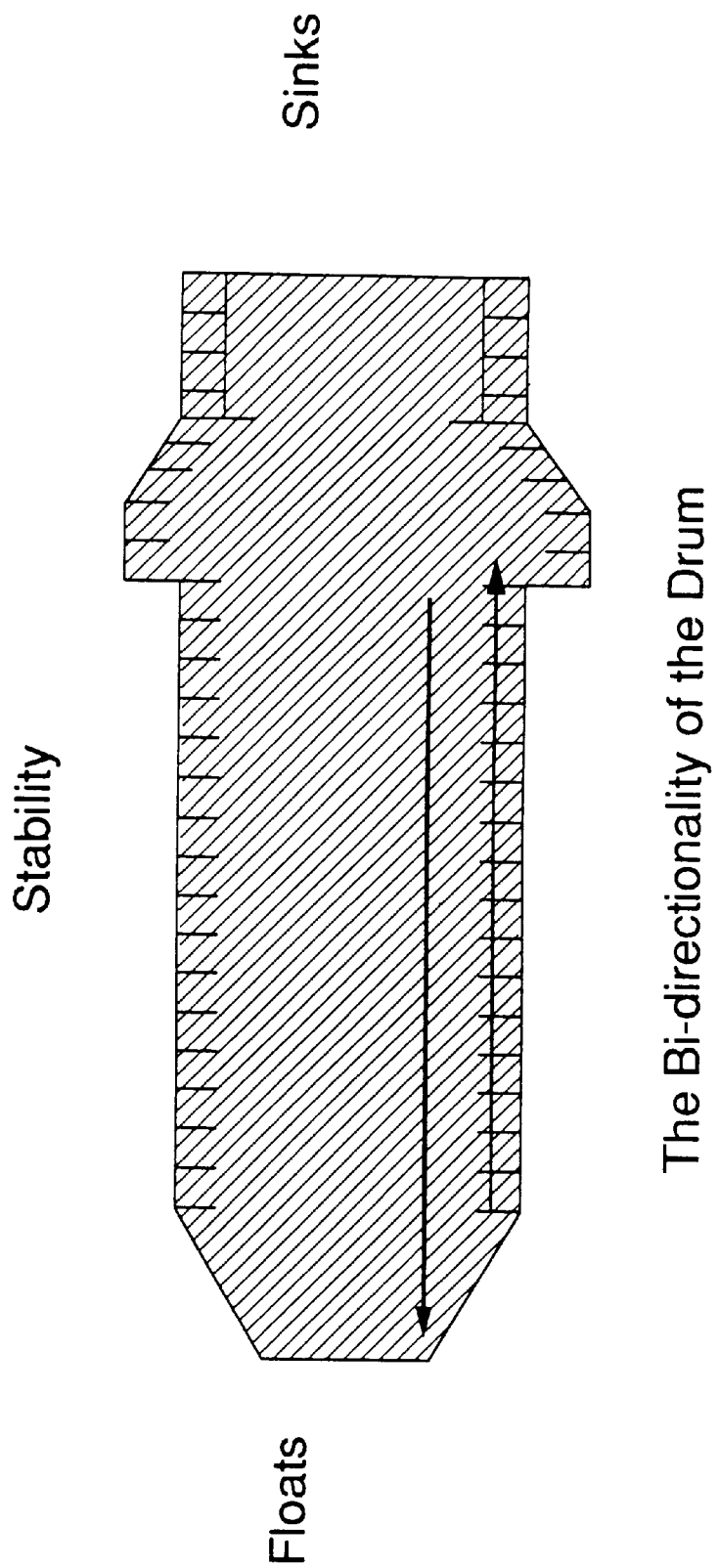
FIG. 12 is a diagrammatic side view cross section of the bi-directional, opposing direction flows of float particles and sink particles in a bidirectional heavy liquid medium separation vessel used in one embodiment of a process and a system of the invention.

3) The heavy liquid medium separation is bi-directional (see side view, FIG. 12). Floats move in one direction, while sinks move in the opposite direction. This gentle counter-current bi-directional motion imparts a high degree of stability to the suspension medium.

Figure 13:
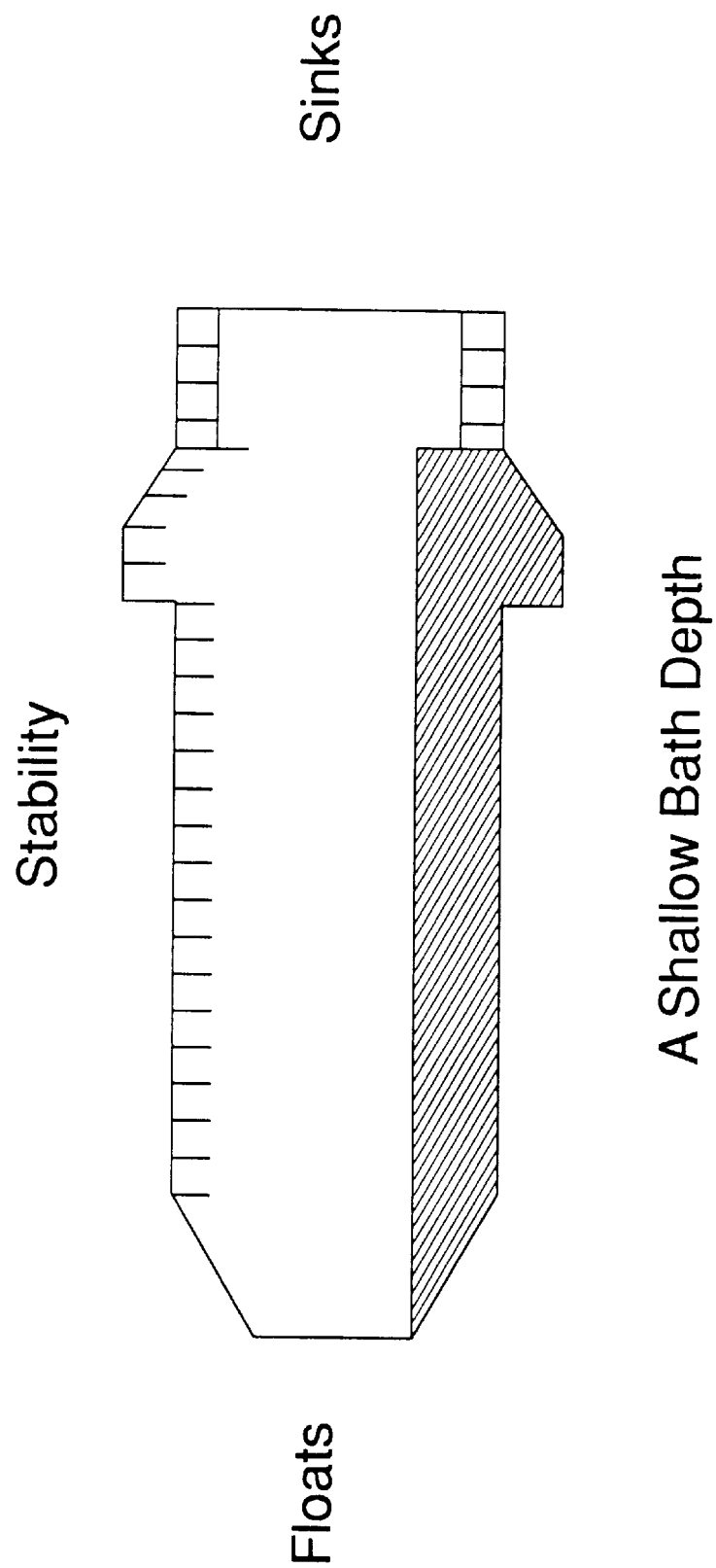
FIG. 13 is a diagrammatic side view cross section of the shallow bath depth in a bidirectional heavy liquid medium separation vessel used in one embodiment of a process and a system of the invention.

4) The liquid medium at any given point in the separation zone is never more than approximately 40–50 cm in depth (see side view, FIG. 13). This shallow bath depth also imparts a high degree of stability to the suspension medium.

Figure 14:
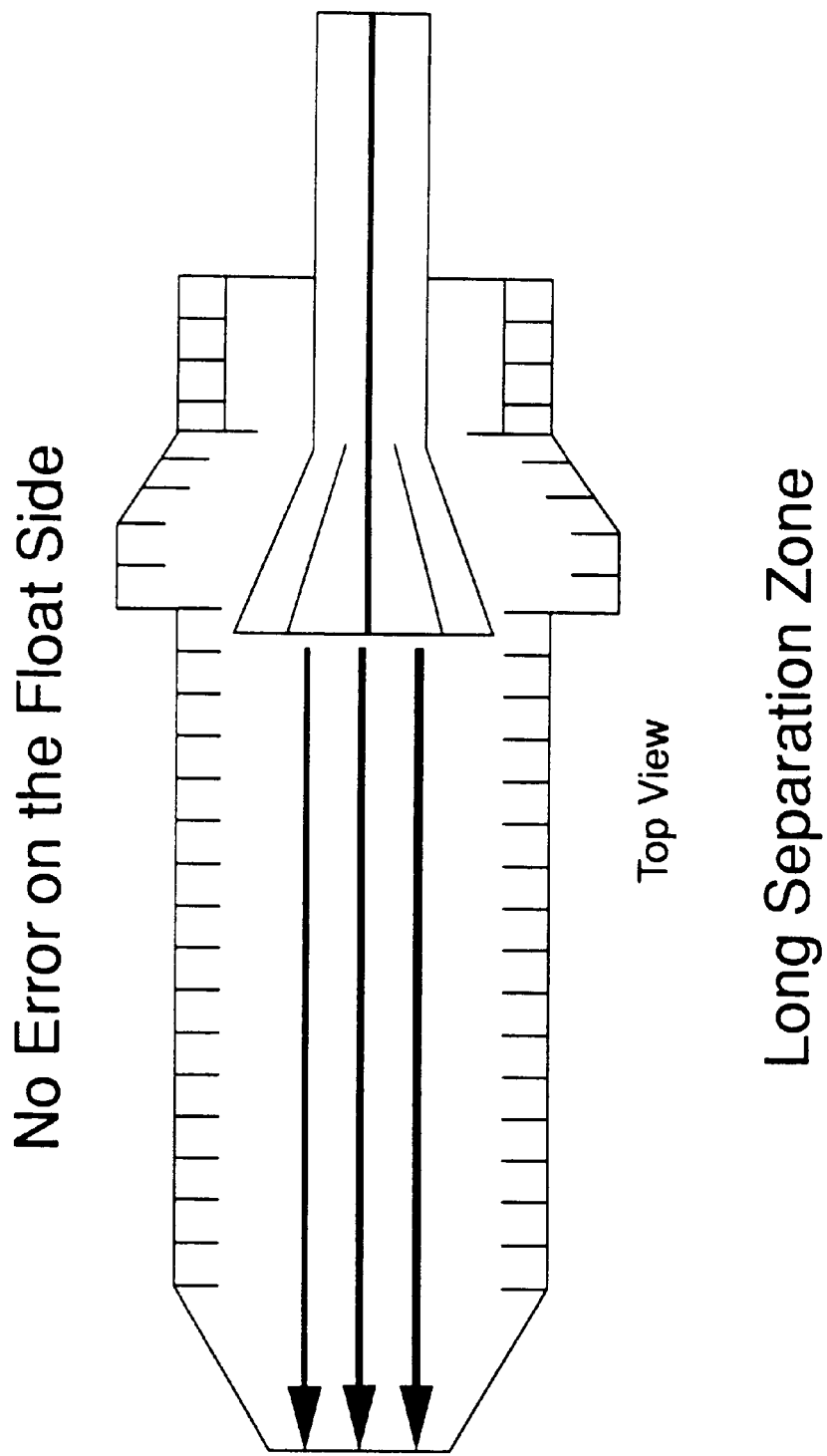
FIG. 14 is a diagrammatic top view cross section of the long separation zone minimizing float side separation error in a bi-directional heavy liquid medium separation vessel used in one embodiment of a process and a system of the invention.

5) The length of the separation zone is approximately 4.5 m (see top view, FIG. 14). This translates into a very long retention time within the separation zone, contributing to a very sharp and accurate separation.

Figure 15:
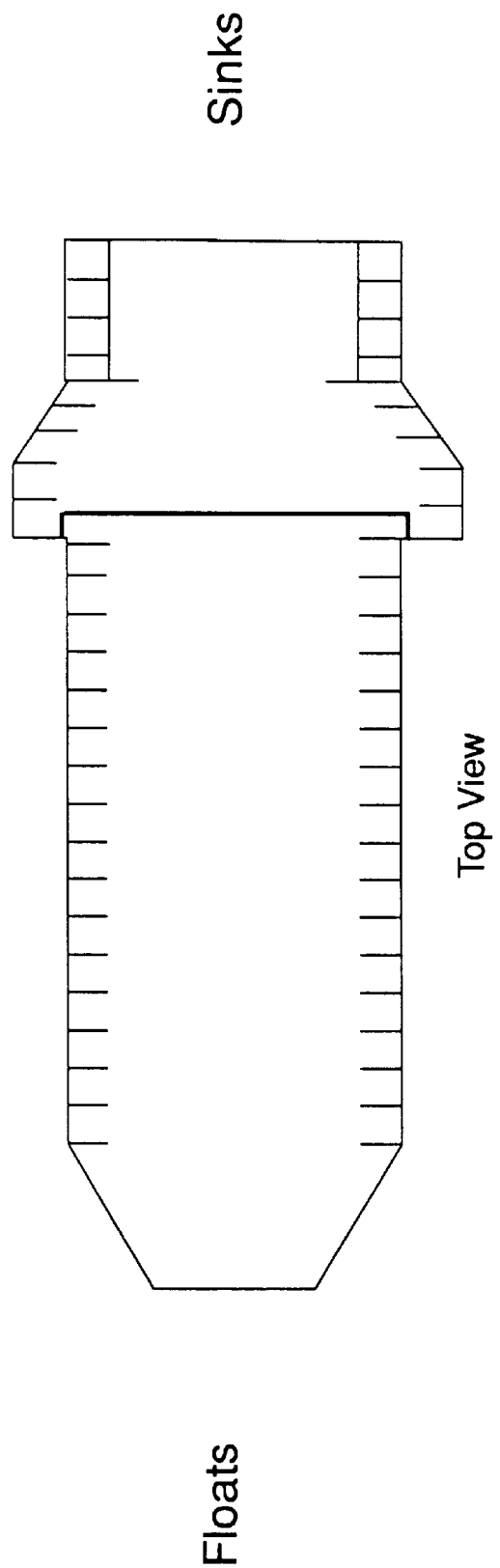
FIG. 15 is a diagrammatic top view cross section of the curtain location outside of the vessel separation zone minimizing sink side separation error in a bidirectional heavy liquid medium separation vessel used in one embodiment of a process and a system of the invention.

6) A special curtain situated completely outside of the separation zone preferably may be used, which prevents any floats from crossing over with sinks (see top view, FIG. 15). The conventional mono-directional drum, by contrast, has curtains well within the separation zone so that, when a drum is rotated at speeds even as low as 2 rev/min., much turbulence is created in the vicinity of these curtains. When near-vessel specific gravity float particles get caught up in such turbulence, they have a tendency to surface on the wrong side of the curtain and hence report to sinks. The only way to minimize this undesirable turbulent effect within such a mono-directional barrel lies in restricting its speed of rotation but, since the capacity of the barrel to evacuate sinks is linked to its speed of rotation, a conventional device cannot evacuate large tonnages of sinks without contaminating these sinks with floats, even with known curtain placement.

A second problem arises when curtains are situated within the separation zone: these curtains restrict the area available for separation. In order to minimize turbulence, the curtains are situated as far as possible from the sides of the vessel, and therefore it is not uncommon to find a conventional 2.4 m (8 ft) diameter mono-directional vessel with nothing more than a 0.6 m (2 ft) wide corridor available for separation, which results in a serious loss in capacity.

Because the curtain within this preferred separation vessel lies completely outside the separation zone, the bi-directional barrel may be turned at 14, 16 or even 18 rev/min without any risk of generating misplaced material.

A particularly preferred separation vessel injector and curtain structure of the invention is shown in FIGS. 5A–D. The preferred structure combination insures that the liquid medium plus feed solids enter the separation zone well-distributed over a broad three-dimensional front, minimizing any entrapment of float particles with sink particles. The injector 50 is fan-shaped at the downstream end 51, which, in concert with the tendency of the stream to gravity flatten, increases the onset of specific gravity driven vertical separation of the floats and sinks, while effecting horizontal spread and maximal use of the separation capacity of the liquid bath in the separation vessel. The curtain 55, is configured to enhance the creation and advance of a fan shaped, three dimensional feed front.

In another particularly preferred embodiment of the invention, the curtain 55 may be used along with or replaced by a series of medium-providing pipes or a bank of medium-providing spray nozzles, which would provide a front or flow of medium that would create a dynamic, flow equivalent of the static, mechanical curtain structure 55, or would assist in the introduction of particulate feed into the vessel. Any non-mechanical, dynamic medium flow embodiment of the curtain must be positioned to insure that the flow structure lies outside of the separation zone.

Figure 16:
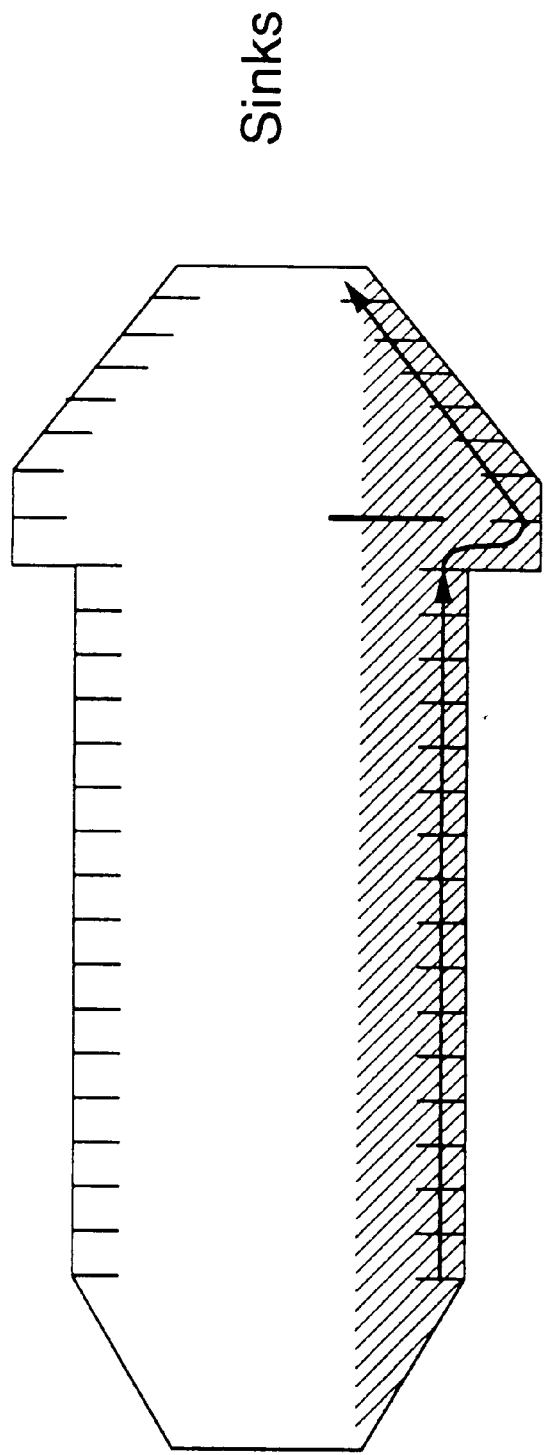
FIG. 16 is a diagrammatic side view cross section of the sinks removal pathway in a bidirectional heavy liquid medium separation vessel used in one embodiment of a process and a system of the invention.

7) Sinks evacuation takes place completely outside of the separation zone (see side view, FIG. 16). The preferred bi-directional separation vessel evacuates/removes sinks only when they are completely outside of the separation zone. Evacuating sinks within the separation zone creates much unnecessary turbulence, which turbulence has a tendency to destroy the tranquility of the bath, which is critical to effecting a good separation. As noted, one could minimize this turbulence by restricting the speed of rotation of the barrel, but since the capacity of a separation vessel to evacuate sinks is also linked to its speed of rotation, a mono-directional barrel cannot evacuate large tonnages of sinks without contaminating these sinks with floats.

Many prior art mono-directional barrels within the non-ferrous metal recycling industry combine both serious faults: curtains are situated within the separation zone and sinks are evacuated within the separation zone. This reduces the capacity of the separator to very small tonnages, calling into question the cost-effectiveness of the overall recycling efforts.

8) The capacity of most prior art mono-directional separators is also limited by the fact that all floats and sinks must exit on the same end of the separation vessel through a single drain and rinse screen. A bi-directional separation vessel of the preferred embodiment, however, allows one to situate drain and rinse devices on both the float and sink sides of the separator. In a particularly preferred structure, as many as four devices may be situated around a single bidirectional dense medium barrel a vibratory screen and a rinser in sequence on the float side and the same on the sink side, or a rinser on each side, or a scrubber-rinser on each side.

The particularly preferred separation vessels for use in this system and process are those developed by the inventor and disclosed and claimed in U.S. Pat. Nos. 5,373,946 and 5,495,949. Generally, in its broader aspects, the preferred separation vessel comprises:

a) a first scrolled barrel in which the separation takes place, said barrel stretching between two open ends;

b) a means for feeding into said barrel the solid particles to be separated and the medium;

c) a means associated with said first barrel for evacuating the sink fraction through an opening, said means being located at a first open end of said first barrel;

d) a point of discharge associated with said first barrel for evacuating the float fraction as well as medium said point of discharge being located at the other open end of said first barrel; and e) a means associated with said first barrel for turning it rotatively along a longitudinal axis, such rotative movement serving to scroll the sink fraction towards the first open end of said first barrel.

The means for evacuating the sink fraction in this vessel is comprised of a second scrolled barrel attached to and communicating with said first barrel, said second barrel having at its end adjacent to said first barrel an inner diameter greater than the inner diameter of that end of first barrel adjacent to said second barrel.

The particularly preferred vessel comprises:

1. a scrolled barrel consisting of a central mid-section in which the separation takes place;

2. a means associated with said barrel for driving it rotatively along its longitudinal center line;

3. means for feeding or injecting into the barrel both the solid particles to be separated as well as the medium effecting this separation;

4. a means for removing the sink fraction from said central mid-section, this means consisting preferably of a scrolled cone, the lower end of said scrolled cone is attached to the central mid-section and has a diameter somewhat larger than the diameter of said central mid-section, while the higher end has a relatively smaller diameter through which the sinks are discharged;

5. a means for removing the float fraction from the central mid-section, this means consisting preferably of a cone, the lower end of said cone is attached to the central mid-section, while the higher discharge end serves as the point of overflow for the medium and float particles; and 6. a means to prevent the float particles from crossing over into the sinks cone and thus reporting with the sink particles.

The vessel, as noted, may also provide a means to prevent float particles from crossing into that part of said second barrel located between said means and the opening for removing the sink fraction. Advantageously, the means to prevent float particles from crossing into said second barrel is a barrier whose upper edge is at a level higher than the point of discharge of the first barrel and whose lower edge permits the passage of the sink particles into the second barrel. Preferably, that means consists of a curtain having an upper edge, a lower edge and lateral edges, the upper edge being at a level higher than the point of discharge of the first barrel and the lower edge permitting the passage of the sink particles into the second barrel while the lateral edges encloses a section of the outer edge of the first barrel, such enclosure preventing float particles in the first barrel from crossing into the second barrel.

In yet another variation of the vessel, the first barrel at its end opposite to the end adjacent to the second barrel, is provided with a further third barrel having an inner space which bears the shape of a truncated cone stretching between two ends, the diameter of the end adjacent to the first barrel being greater than the diameter at the other end. Said other end acts as a discharge for evacuating the float fraction and a part of the medium.

With the curtain means, then, a particularly preferred embodiment of the separation vessels comprises:

a) a first scrolled barrel in which the separation takes place, said barrel stretching between two open ends;

b) means for feeding into said barrel the solid particles to be separated and the medium;

c) means associated with said first barrel for evacuating the sink fraction through an opening, said means being located at a first open end of said first barrel;

d) a means associated with said first barrel for discharging or evacuating the float fraction as well as medium, said point of discharge being located at the other open end of said first barrel;

e) means associated with said first barrel for turning it rotatively along a longitudinal axis, such rotative movement serving a scroll the sink fraction towards the first open end of said first barrel;

in which:

the means for evacuating the sink fraction is comprised of a second scrolled barrel attached to and communicating with said first barrel, said second barrel having at its end adjacent to said first barrel an inner diameter greater than the inner diameter of that end of the first barrel adjacent to said second barrel, the system is provided with a means to prevent float particles from crossing into the part of said second barrel located between said means and the opening for removing the sink fraction, said means consisting of a curtain having an upper edge, a lower edge and lateral edges, the upper edge being at the level higher than the point of discharge of the barrel and the lower edge being at a level permitting the passage of the sink fraction while the lateral edges of the curtain have an end which is adjacent to a part of a surface adjacent to the junction of the first barrel with the second barrel, and in which the first barrel is cylindrical while the second comprises a part with an inner space, the shape of which is a truncated cone, stretching between two ends, the diameter of the end adjacent to the first barrel being greater than the diameter at the other end and in which the central axis of said first and second barrels forms an angle less than ten degrees with the horizontal.

Yet another particular preferred embodiment of the separation vessels comprises:

a) a first scrolled barrel in which the separation takes place, said barrel stretching between two open ends;

b) means for feeding into said barrel the solid particles to be separated and the medium;

c) means associated with said first barrel for evacuating the sink fraction through an opening, said means being located at a first open end of said first barrel, said means being comprised of a second scrolled barrel attached to and communicating with said first barrel, said second barrel having at its end adjacent to said first barrel an inner diameter greater than the inner diameter of that end of the first barrel adjacent to said second barrel;

d) a means associated with said first barrel for discharging or evacuating the float fraction as well as medium, said point of discharge being located at the other open end of said first barrel;

e) means associated with said first barrel for turning it rotatively along a longitudinal axis, such rotative movement serving to scroll the sink fraction towards the first open end of said first barrel;

f) means to prevent float particles from crossing into the part of said second barrel located between said means and the opening for removing the sink fraction, which may consist of a curtain having an upper edge, a lower edge and lateral edges, the upper edge being at the level higher than the point of discharge of the first barrel and the lower edge being at a level permitting the passage of the sink fraction while the lateral edges of the curtain have an end which is adjacent to a part of a surface adjacent to the junction of the first barrel with the second barrel, in which the first barrel is provided at its end opposite to the end adjacent to the second barrel with a third barrel with an inner space having the shape of a truncated cone stretching between two ends, the diameter of the end adjacent to the first barrel being greater than the diameter at the other end, said other end acting as a discharge for evacuating the float fraction and a part of the medium.

The general flow of solid particles fed to the particularly preferred separation vessel is that the particles to be separated as well as medium are fed into the scrolled barrel wherein said particles are separated into a float fraction and a sink fraction. The float fraction as well as medium flow towards one end of the scrolled barrel, while at the same time the scrolled barrel is rotated so as to move the sink fraction towards the opposite end of the scrolled barrel and, furthermore, so as to bring said sink fraction into a second scrolled barrel attached to and communicating with the first barrel. A curtain is positioned at or near the junction of the two barrels; that is, between that end of the first barrel nearest to the second barrel and that end of the second barrel nearest to the first barrel. The curtain serves to prevent the passage of the float fraction into that part of the second barrel located between said curtain and the end opposite to the end adjacent to the first barrel. The float fraction as well as medium is evacuated at the end of the first barrel opposite to the end adjacent to the second barrel, while, as a result of the rotation of the second barrel, the sink fraction is evacuated at the end of the second barrel opposite to the end adjacent to the first barrel.

In other preferred embodiments of the vessel, containing a curtain as described, to ensure that float particles near the curtain will move away from the curtain towards the floats exit opening, the curtain may be provided with pipes (see pipes 38, '946 patent, FIGS. 2–3, 5) for supplying medium in the neighborhood of the curtain flowing in that floats exit direction. Also, to ensure a good separation so that only sink particles pass under any such curtain, medium may also be supplied (see pipes 129, '946 patent, FIGS. 1–3, 5) to flow underneath the curtain from the sink side to the float side.

When a curtain is used in the separation vessel to prevent a small percentage of floats from working their way to the sinks side of the barrel and eventually reporting with the sinks when separated and recovered, its use substantially assures that the percentage of floats in sinks will not be greater than the percentage of sinks in floats, and that, under normal operating conditions, it becomes feasible to obtain a sink fraction containing less than 0.01% by weight of particles having a specific gravity lower than the specific gravity of the medium and at the same time to obtain a float fraction containing less than 0.01% by weight of particles having a specific gravity higher than the specific gravity of the medium.

In summary, the key features of the particularly preferred bi-directional heavy liquid medium separation vessels of the invention are:

The medium plus solids enter the separation zone, where they are well distributed over a broad three-dimensional plane; this prevents floats from being entrapped with sinks.

Bi-directional counter-current floats and sinks conveyance and flow in bath.

No error in the floats: a very long separation zone, no turbulence in separation zone.

No error in the sinks: curtain located outside the separation zone, sinks are lifted by means of a scrolled cone, but only when completely outside of separation zone;

Separate sinks and floats evacuation/removal paths and related devices;

Dewatering and rinsing devices may be provided on both sides of each separation vessel;

High capacity: 6, 8, 10 ft diameter=100, 200 & 300 TPH.

The 1.0 Separation Vessel

The initial separation vessel encountered by the heterogenous waste stream in the particularly preferred system and process effects a separation of porous materials through use of a liquid medium at about 1.0 specific gravity. This medium is preferably water, with no particulate separation media component added.

The 1.0 separator isolates the porous fraction, consisting of foam rubber, wood and textiles. These product floats are pressed by means of a hydraulic press to a moisture content <10% before further processing or use.

Modified Air Separators

As an alternate to use of the 1.0 separation vessel as the device to carry out the first separator stage of the system and process of the invention, modified air separators configured to relate to the remaining portion of the system and process may be used to remove porous materials, as the next unit operation after size reduction and screening.

Figure 2:
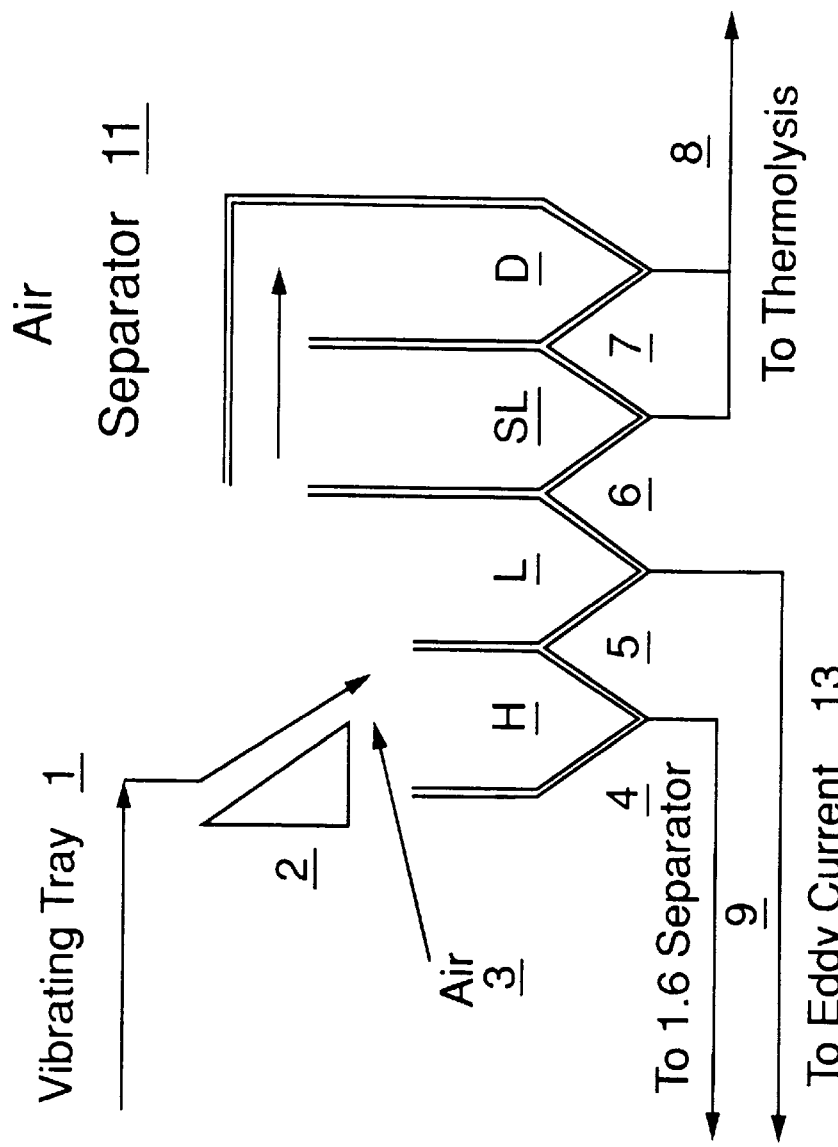
FIG. 2 is a diagrammatic/block representation of another air separator configured to relate to portions of the system of the invention.
Figure 3:
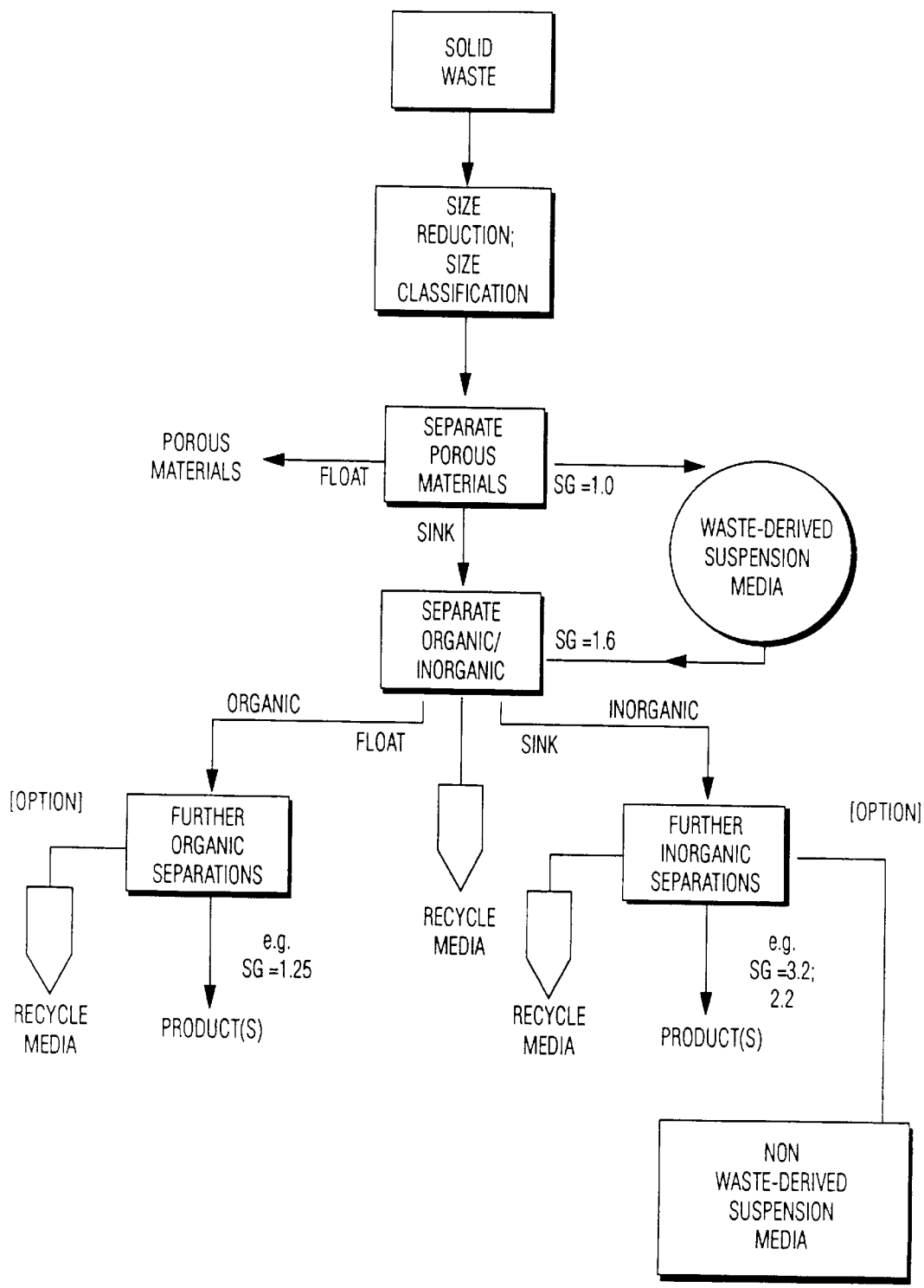
FIG. 3 is a flow diagram of one embodiment of a general process and system of the invention.
Figure 4A:
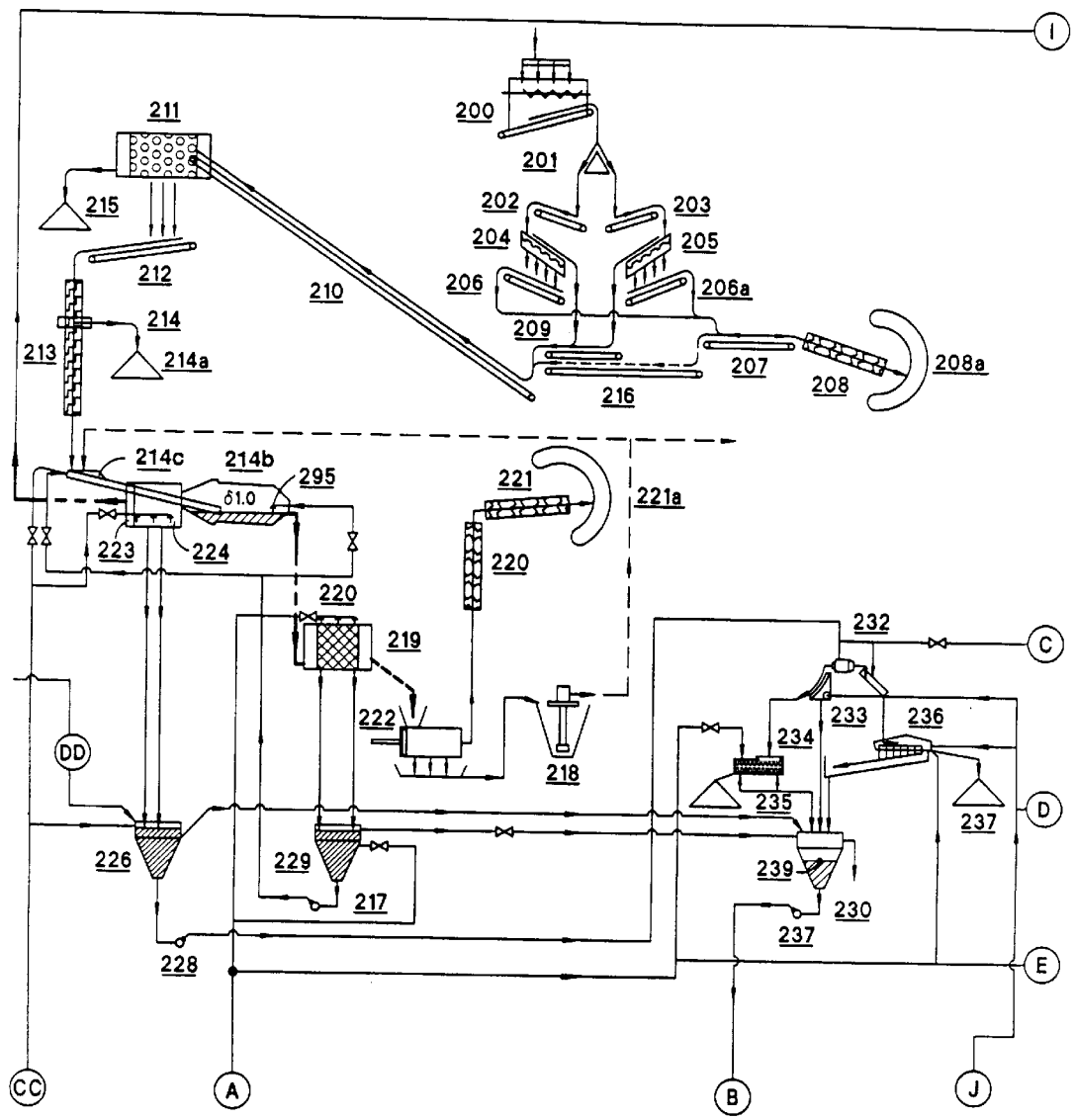
FIGS. 4A–F is a flow diagram of one embodiment of a process and a system of the invention.
Figure 4B:
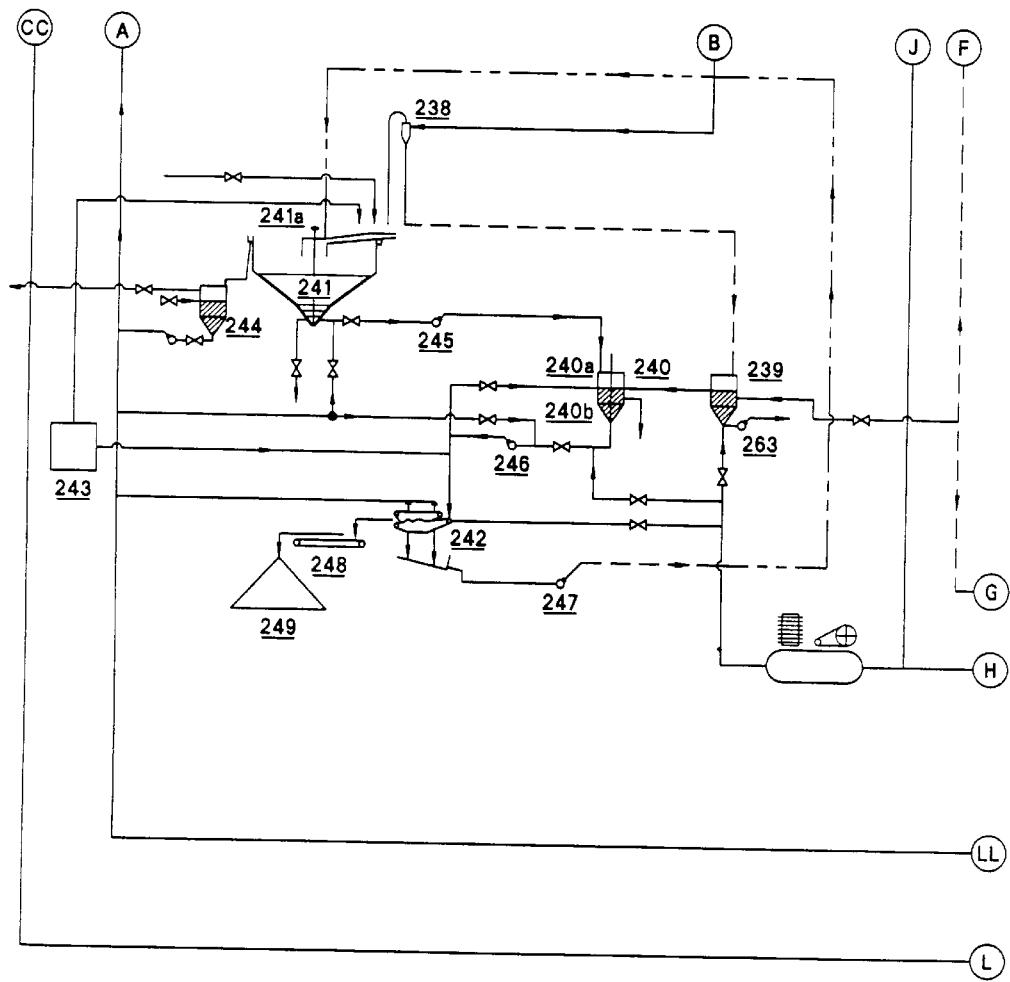
Figure 4C:
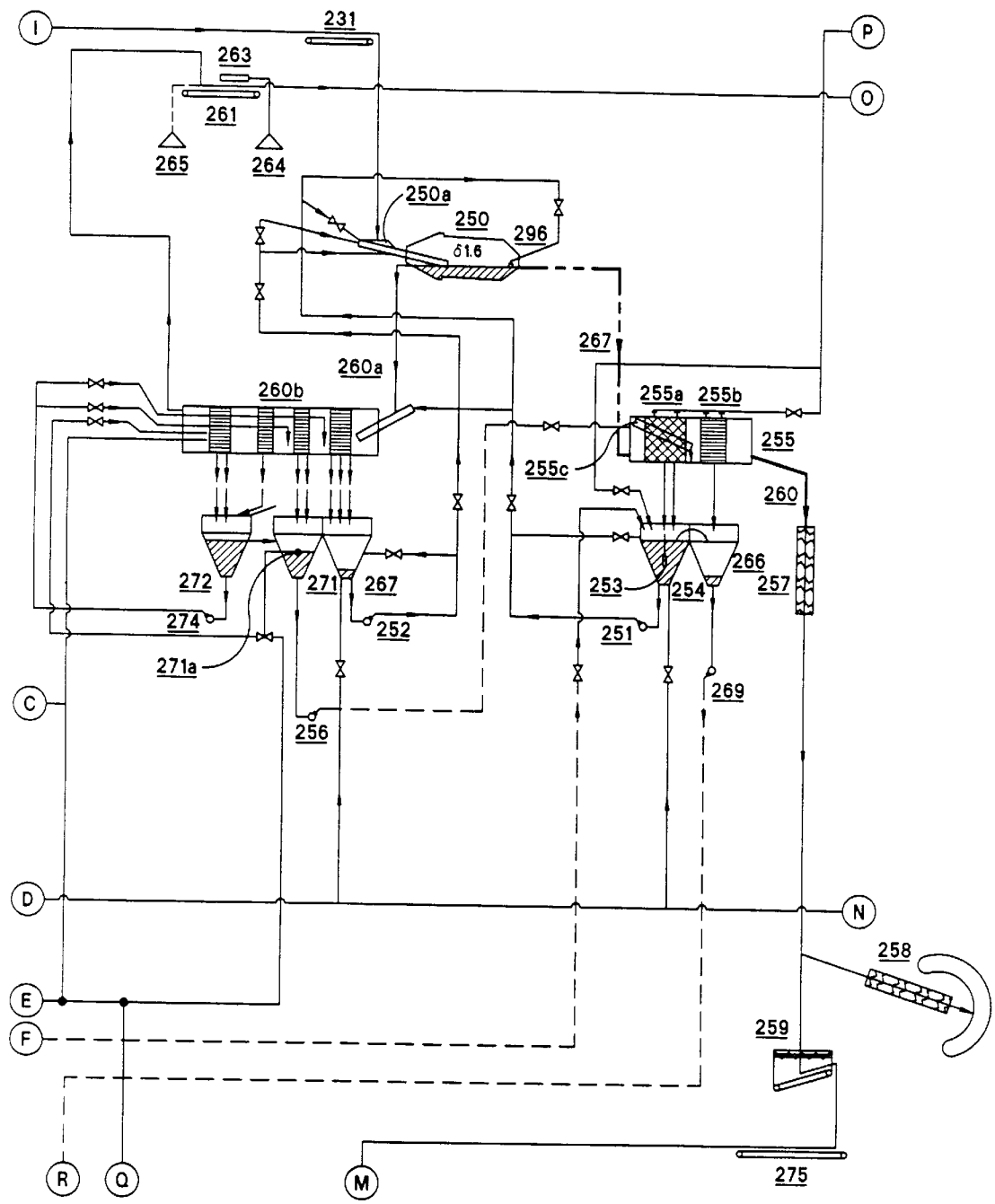
Figure 4D:
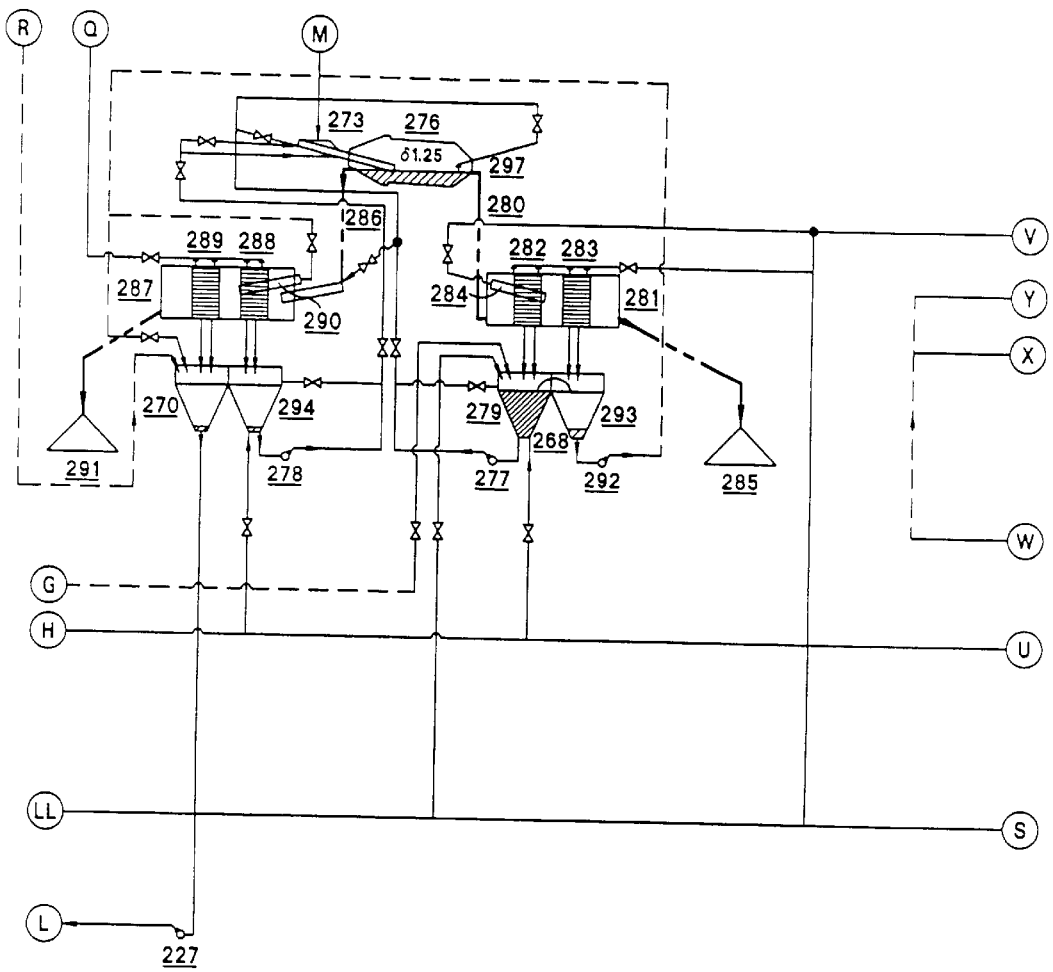
Figure 4E:
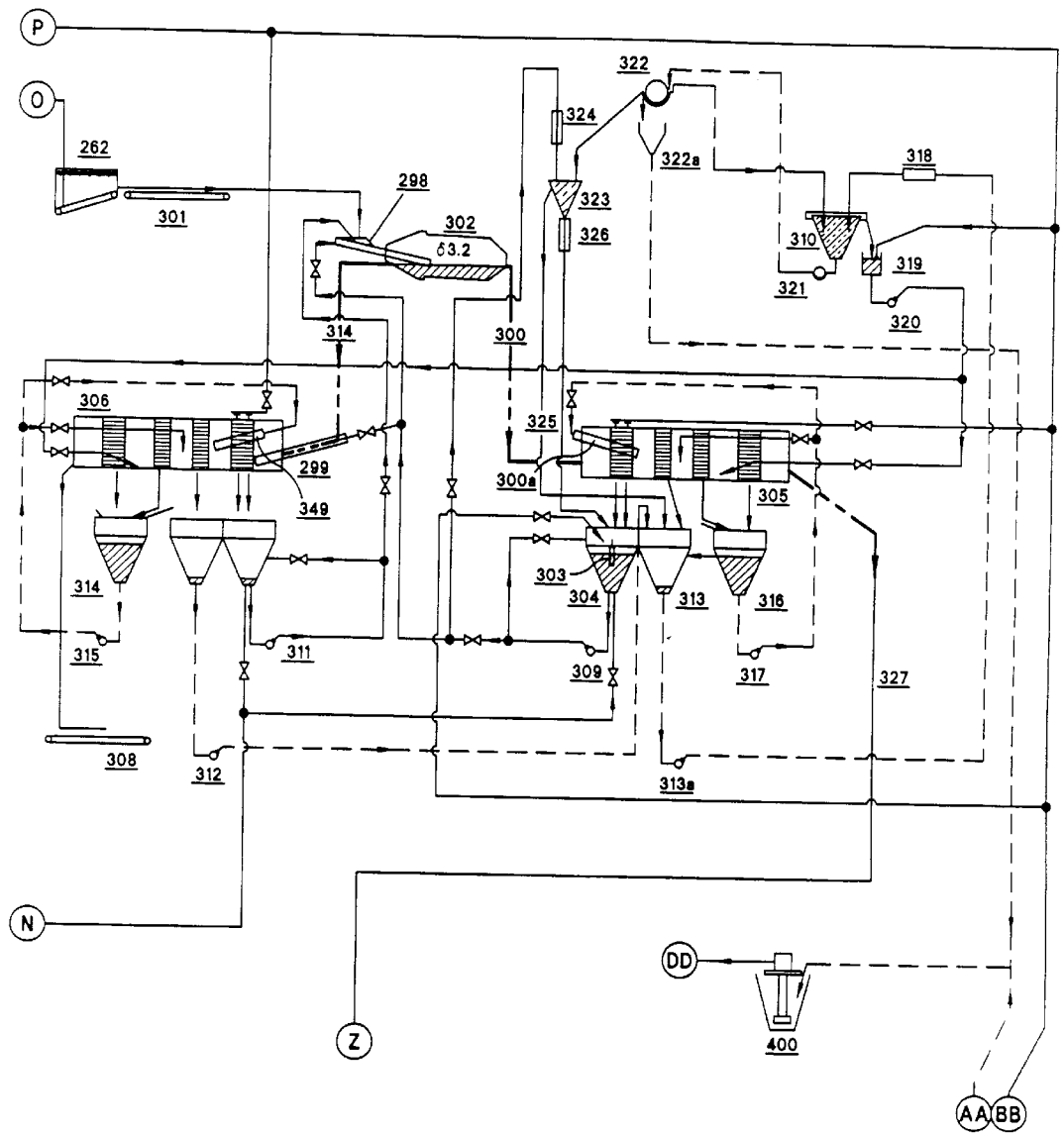
Figure 4F:
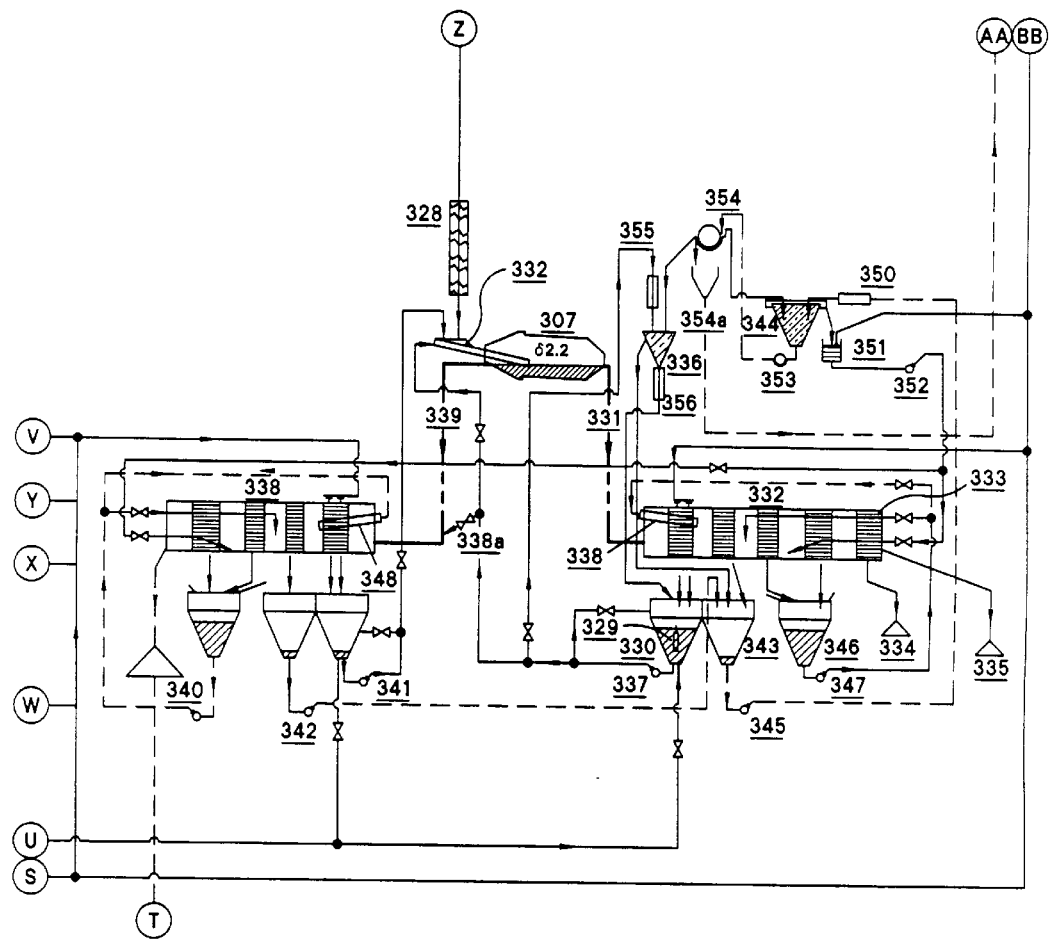
Figure 5:
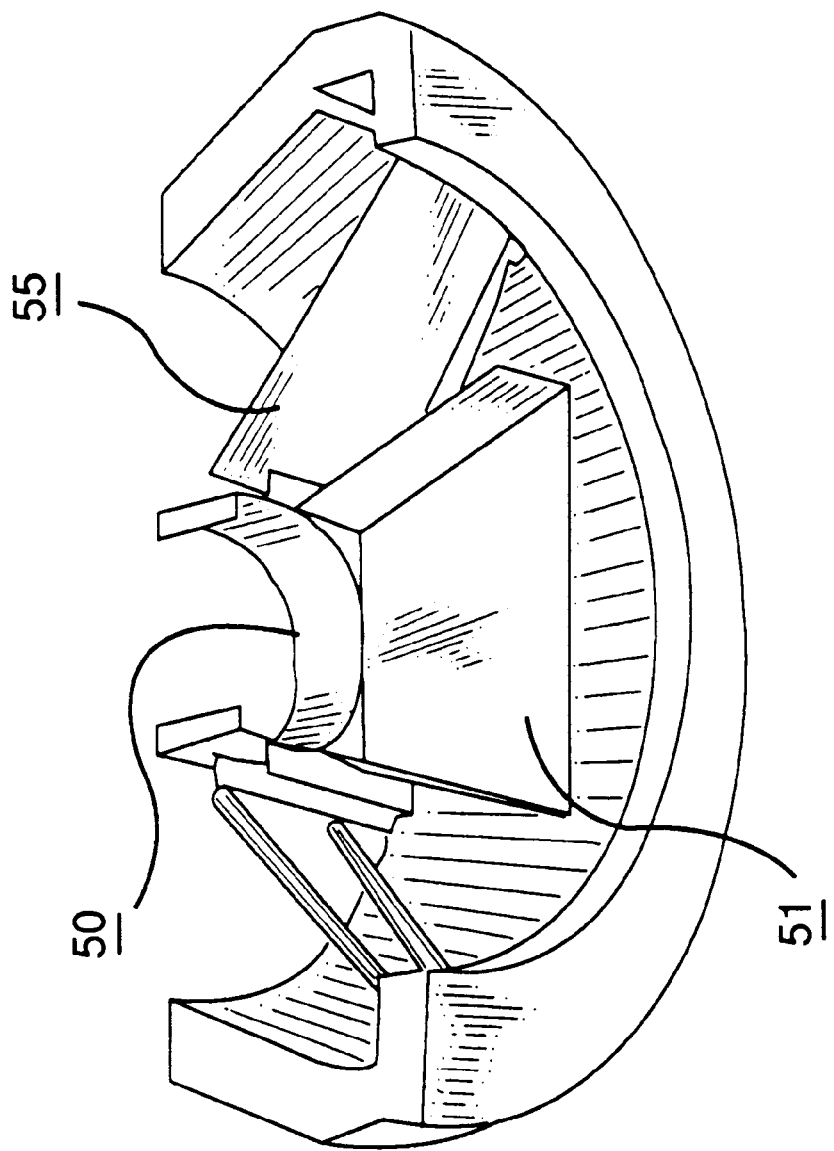
FIGS. 5A–C are end, side and top views of an injector and certain structure for a separation vessel used in one embodiment of a process and a system of the invention.
FIG 5D is a schematic, isomeric representation of the injector and curtain structure of FIGS. 5A–C.

FIG. 1 is a diagrammatic/block representation of an air separator system 10, its various components and their arrangement configured to relate to portions of the system of the invention. FIG. 2 is a diagrammatic/block representation of another air separation system 11, its various components and their arrangement configured to relate to a portion of the system of the invention.

The modified air separators of FIGS. 1 and 2 are configured to provide four (4) principal attributes:

1. Distribution

A good distribution over a broad two-dimensional plane assures minimal particle interference. A low-frequency, high-amplitude vibrating tray 1 causes a good distribution of the classified particles. Vibrating tray 1 brings with it another very important benefit: it tends to segregate the light porous organic material from the remaining heavier material. The lighter organics tend to migrate to the surface of the vibrating bed, while the heavier material tends to migrate to the bottom of the bed. An accordion screen, since it does not easily block up even on the smaller particle sizes, is ideal for the distribution and segregation of the particles 15 mm, and may be substituted for vibrating tray 1.

2. Slide Dynamics

The initial segregation on vibrating tray 1 (or accordion screen) is enhanced through the dynamics of a slide 2. The high-density particles falling from the vibrating tray 1 accelerate quickly and remain in constant contact with the 60° inclined surface of the slide 2, whereas the low-density particles accelerate more slowly and only intermittently come in contact with the surface of the slide 2. The former line up on a narrow plane on the "inside", while the latter line up on much broader plane on the "outside". This effect is exaggerated even further by the tendency of rubber and foam rubber to bounce upon impact with the slide.

3. Deflection

Once the particles have been classified, distributed and segregated by tray 1 and slide 2, they are then deflected by means of a uniform air stream 3, impacting at a 45° angle. This deflection, which is both upward and lateral, takes place at the bottom of the slide 2 along its entire width, and requires only a fraction of the energy consumed by conventional zig-zag air separators. Deflection, dependent upon the volume of air flow, may be controlled to produce a heavy fraction, H, and a light fraction, L, in bins 4 and 5 (FIG. 1), or a heavy fraction, H; a light fraction, L; a super-light fraction, SL; and a dust fraction, D, in bins 4, 5, 6 and 7 (FIG. 2).

4. Immediate Evacuation of Light Fraction

Once the lighter particles are deflected from the stream of heavier particles, they are removed via means 8 so as not to effect any further particle interference. The stream of heavy particles H, from bin 4, is then supplied to the 1.0 separator vessel as a feed stream, via means 9.

Optional Eddy Current Back-up

The deflected light fraction in the FIG. 2 separator 11, as noted, divides into a light, super-light and a dust fraction. The light fraction L may still contain small quantities of non-ferrous metals. Means 13 are provided to enable the light material L to be routed to an eddy current separator for further separation. (The super-light and dust fractions contain no metals of a recoverable particle size.)

While the prior art conventional air separation systems devices and processes are well known to those skilled in the art, it is also well known that such devices are limited in regard to through-put. Also, if particulate suspension media are present in the feed to an air separator, it is difficult to recover such a fine material from the separator as a clean/perfectly separated product. Further, there is no teaching to the art, known to the inventor, of or using an air separator system, device or process to recover a waste-derived particulate suspension media directly form solid wastes and waste streams, in an initial separation stage for use as a component of a heavy liquid medium separation stage, to provide the desired specific gravity of the liquid contacted with a feed for further separation.

Production of Waste-Derived Particulate Suspension Media

Figure 8:
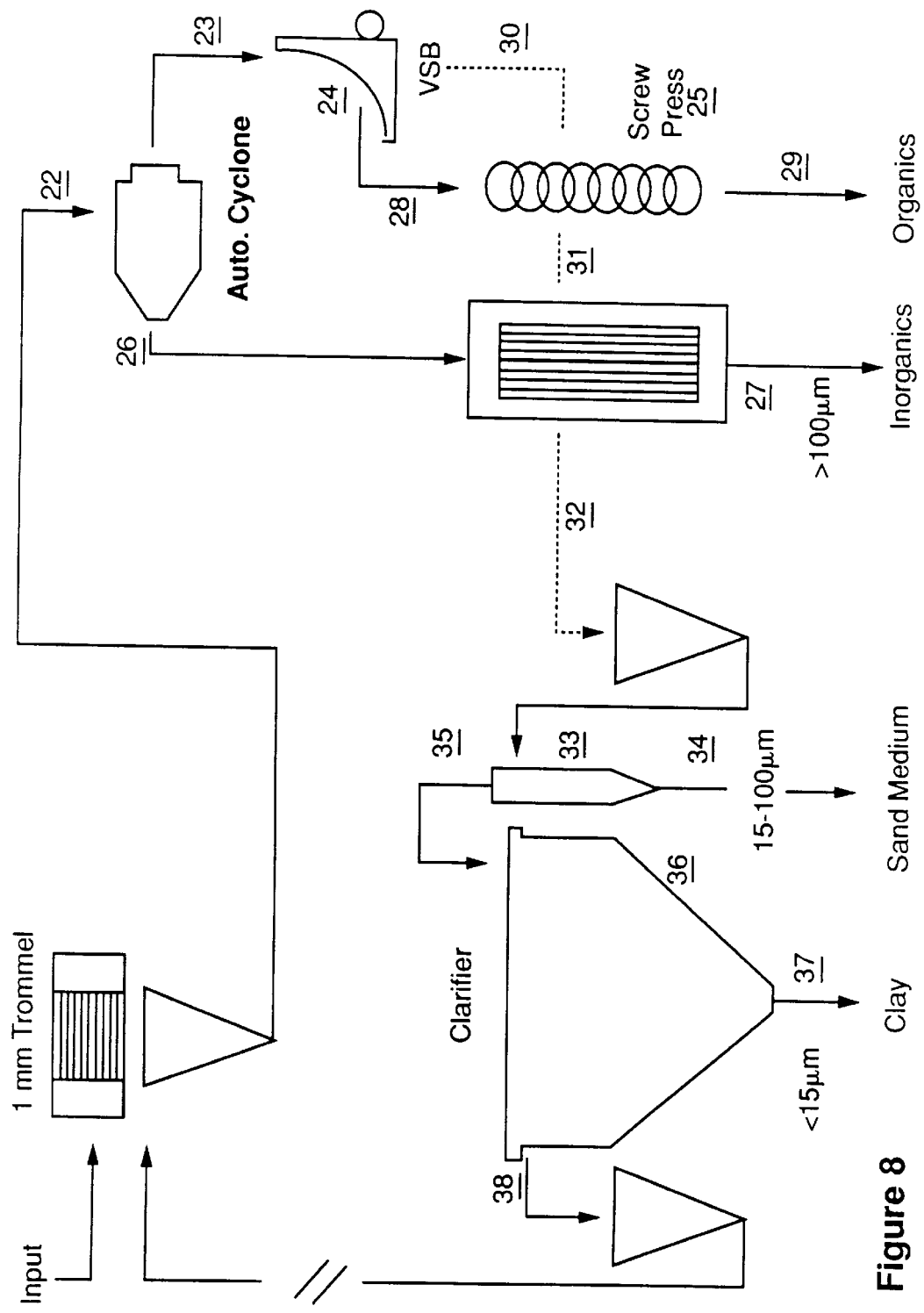
FIG. 8 is a flow diagram of one embodiment of a double cyclone system for recovery of waste-derived particulate separation media used in one embodiment of a process and system of the invention.

FIG. 8 diagrammatically illustrates the equipment and flow of a particularly preferred system, actually subsystem, of the invention, to extract waste-derived particulate suspension media from the heterogeneous mixture of particulate solids which are the feed to the overall process.

The initial input to the subsystem is a portion of the sinks particles separated and recovered from the 1.0 separator. Preferably, it is that portion of the inorganic solid particles entering said first separation vessel having an average particle size of less than 1 mm. The selected portion is fed from a 1.0 mm trommelscreen, as its underflow, and in turn to an autogenous medium cyclone 22 (preferably having a 35° cone angle). An autogenous medium cyclone is a cyclone that generates its own liquid medium for separation based on the suspension-creating fines which are naturally found within the material being fed to the cyclone, together with water. Through the action of its high-speed hammers, a hammermill, for example, creates an abundance of fines. Also, particulate materials in the appropriate size range are otherwise inherently present in the form of sand or equivalent materials in most solid wastes and waste streams, without being first subjected to a hammermill or other size reduction unit operation (Here is a first example of a device or process which finds within the waste that which assures the economical recycling of the waste.)

The overflow of the autogenous medium cyclone 23 is fed to a vibrating sieve bin ("VSB") 24. The underflow of that cyclone 26 is fed to a high free dewatering screen 27, which produces an inorganics particles fraction >100 microns 39.

The VSB device 24 has a vertical downward feed, into an outwardly curving, metal vibrated screen, which, due to its structure, will not block. The device is capable of handling substantial through-put, as the motor vibrators clear any particles tending to blind the screen aperture. Between the vibration, the curve of the screen, and gravity, there is forward and downward particle movement and separation.

The overflow of VSB 28 goes to screw press 25, producing an organics offstream 29. The underflow of the VSB 30 the screw press 31 and the dewatering screen 32, are all pumped to a classifying cyclone 33 (preferably having a 10° cone angle).

The underflow 34 of classifying cyclone 33 is a 15–100 micron "fines" product, which contains no organics, and no clay, such that it has substantially no, or a very low, viscosity when suspended in water. This product is a waste-derived particulate suspension medium, which, when combined in proper quantity with water, will create a liquid medium of specific gravity between more than about 1.0 to about 1.7. Since this "fines" powder functions quite effectively as a substitute for magnetite and/or ferrosilicon, it acquires a value within this process of more than US$ 100 t.

The inorganics in the classifying cyclone size separate: particles larger than 15 mm, inorganic, go to the underflow, as noted, while those smaller than 15 mm go to the overflow 35. The organics present do not size-separate, such that they all go into the overflow 35.

The overflow of classifying cyclone 35 goes then to clarifier 36. The underflow from clarifier 36 contains inorganics/clay 37, at size less than 15 micron. The froth or crust formed at the top of the clarifier contains organics, and forms due to addition of added flocculent, as is well known to one of ordinary skill in the art. The clarifier overflow 38 is clean water, which is recycled into the process.

Further Treatment of Porous Materials

The porous materials, separated and recovered from the system and process of the invention as float particles from the first separation stage, may be subjected to further processes in particularly preferred embodiments of the system and process of the invention.

Two principal options may be selected for further porous materials processing: (1) a thermolysis procedure, as described in this specification, or of any other type which is well-known to the act, or (2) a chemolysis procedure. The chemolysis procedure involves feeding the porous product streams which usually comprise mainly flexible foam materials, much of which is polyurethane or a urethane-type foamed material, into a reaction vessel together with water, one or more glycols, and/or one or more amine reactant materials. Depending upon the added reactants, the reaction instituted in the reaction vessel may comprise a hydrolysis, aminolysis or glycolysis. The reaction product(s) may then be subjected, in the same or an additional vessel, to a propoxylation reaction, in the presence of added propylene oxide, or a similar reaction in the presence of ethylene oxide or another alkyl oxide monomeric/reactive material. With a propoxylation reaction, the resulting reaction product will predominantly comprise polyol materials, which may be recovered and used as a reactant in producing additional polyurethanes and urethane-type products, including but not limited to flexible or rigid foam materials.

In certain embodiments, the heavy organics product from the system or process of the invention may be used as the feed for a further chemolysis process. Where the heavy organics are used, a further size reduction may be necessary for maximum reactivity and reaction efficiency. Particularly efficacious or this size reduction is a punching type mechanical size reduction device, such as that manufactured by Recycling Systems International, Chicago, Ill. Processing through several stages of this unit will reduce particles to an average size of less than 1 mm.

To insure an extremely clean porous materials stream, the porous product stream may be fed to another heavy liquid medium separation vessel containing a liquid medium having a specific gravity of about 1.0, which will subject the porous materials to a second 1.0 specific gravity separation. Alternatively, prior to the second 1.0 specific gravity separation, the porous material stream may be punch mechanically size-reduced as described above, to produce particles having an average size of one (1) inch or less. The punched, size-reduced porous material is then introduced to the second 1.0 specific gravity separation vessel. The floats particles stream from this separation vessel is very clean, metal (particularly copper)-free, and directly usable in cement manufacturing, without need for additional processing.

The 1.6 Separation Vessel

Because it is unusual to find heavy organic shredder residue such as rubber and plastic with specific gravity (relative density) greater than 1.60, and because magnesium, the least dense of the non-ferrous metals usually encountered in solid wastes and waste streams, has a specific gravity of about 1.74, waste-derived particulate separation media is all that is required to make a separation through use of a liquid media having water and a quantity of said separation media present as components, that quantity being adequate to attain the 1.6 specific gravity for the combined media (The specific gravity selected for the first true heavy liquid media separation should be below that of the least dense non-ferrous metal in the waste stream (e.g., magnesium, in ASR), and below that of the non-ferrous/non-metallic (e.g., glass, stone, porcelain, etc.).)

Testing and sampling relative to two full-scale 1.6 specific gravity heavy liquid medium separation vessels in Belgium and in France indicate that the separation is virtually clean/perfect, with no organic float fraction having a free-metal content greater than 0.1%. This in contrast to eddy current devices, which put 5% to 15% metals in the organics, and as much as 20% to 30% organics in the metals; an eddy current separation, is, in this context, a poor separator. A single, properly sized bidirectional heavy liquid medium separation vessel containing a 1.6 specific gravity liquid medium can treat all particle sizes from 1 mm to 145 mm and discharge up to 120 ton/h of organic floats, while evacuating at the same time as much as 40 ton/h of inorganic sinks. Since there is generally more fine sand between 15 μm and 100 μm entering the 1.6 separator than what is lost on the out-going floats and sinks, the medium is substantially self-sustaining, such that no waste-derived particulate suspension medium should need to be added except in the initial start-up.

Waste-derived particulate suspension media/fines can generate a perfectly Newtonian liquid, which can easily reach separating densities as high as 1.6 specific gravity. By using waste-derived particulate suspension media/fines, all of the accuracy of the most precise dense medium bath is attained, without having to purchase expensive density-creating materials such as magnetite or ferrosilicon. These waste-derived particulate suspension fines are present in abundance in every major solid waste and waste stream, and their use again illustrates that the solid waste or waste stream contains the key to the economics and efficiency of its own separation and recovery/recycling in the system and process of the invention.

The float particles from the 1.6 separator may be shredded or otherwise size reduced further before being processed in the 1.25 separator. The product floats stream from the 1.6 separator may be used directly in cement manufacturing as cement kiln fuel, or subjected to thermolysis, chemolysis or other additional processing. If direct use is made, dewatering and rinsing of the 1.6 separator product may be carried out by use of a rotary trommelscreen equipped with 1 mm slots. A special brush mounted on the outside of the trommel assures that the slots stay free of fluff, tar and insulated copper wires. The trommelscreen has a very high capacity: it can drain and rinse up to 120 ton/h of rubber, plastic and wood.

The 1.25 Separation Vessel

Another heavy liquid medium separation using waste-derived suspension fines is done at a 1.25 specific gravity. The specific gravity selected for the further separation of the organic floats particles from the 1.6 separator should be that at which the resulting float fraction contains less than about 1.5 wt % chlorine, preferably less than about 1 wt % chlorine. Alternatively, the specific gravity may be selected to drive the secondary organics separation by another product criteria, such as a different undesired component limitation besides chlorine. At a 1.25 specific gravity, organics of a high chlorine content are separated from organics of a low chlorine content The low chlorine content organics can be fed directly to cement kilns, where they provide the energy of the finest fossil fuels, the ash remaining in the cement. Also the combination of 1.6 and 1.25 separations brings the copper content of the low chlorine organics to far below the maximum norm of 1000 ppm, another requirement to the environmentally safe disposal of organics within cement kilns.

From the 1.25 separator, the sinks particles, which will have a high chlorine content, may be further treated by thermolysis or chemolysis, or may be used directly as an alternate fuel to a chemical or industrial process, including cement manufacture, if the % chlorine present is less than 6.0 wt %.

From the 1.25 separator, the floats particles, which will have a low chlorine content, below about 1.0 wt %, may be further treated by thermolysis or chemolysis, or may be used as a cement component or, if necessary, as an alternative fuel component in a cement kiln. The secondary, further separation of organics may if desired be repeated to tertiary, quaternary or higher levels, each with optional intermediate size reduction/shredding steps between separations, with specific gravity for the liquid medium being selected and adjusted to separate on the basis of desired product criteria The 3.2 & 2.2 Separation Vessels The sinks of the 1.6 separator in the preferred system and process are next routed to a bi-directional heavy liquid medium separation vessel operating at a specific gravity of 3.2. This vessel separates and recovers an assortment of heavier metals such as zamac (6.6 specific gravity), zinc (7.1 specific gravity), stainless steel (8.5 specific gravity), nickel (8.8 specific gravity), copper (8.9 specific gravity), lead (11.3 specific gravity) and so forth. The floats of this 3.2 separation vessel are further routed to another bi-directional heavy liquid medium separation vessel operating at a specific gravity of 2.2. This final separation vessel separates magnesium (1.7 specific gravity) from aluminum (2.7 specific gravity). Because the maximum amount of magnesium permitted in a final aluminum product stream is a strict 0.4%, this separation is particularly sensitive. Separation vessels located in France and Belgium effecting a 2.2 specific gravity separation have consistently produced no more than 0.10%–0.12% magnesium in the final aluminum product steam. This low figure, however, does not constitute a separation error: it merely represents either unliberated or alloyed magnesium which is in theory impossible to separate. Note that this small percentage of inherent magnesium does not affect in any way the commercial value of the aluminum product stream.

The sinks particle stream from the 3.2 separator are a mixture of about 10 heavy metals, when derived from a usual ASR. Further processing which may be effected includes a size classification, passage through a belt with extending nails, which removes any copper wire/wire fragments, and passage through a vibrating bed, to separate the heavy metals amongst themselves.

The sinks particles stream from the 2.2 separator comprise aluminum intermingled with stones and insulated copper wire. Passage through an eddy current separator will separate out the stones and copper wire for disposal, the other stream containing aluminum. To remove any entrained ferrous materials, the aluminum particles may be crushed and passed through a magnetic separator, to separate and recover ferrous particles, leaving aluminum product.

The floats particles stream from the 2.2 separator comprise magnesium intermingled with particles of aluminum laminated on magnesium. Passage through an eddy current separator followed by hand picking, will remove those laminated materials, leaving magnesium product.

Unlike the 1.6 and 1.25 separation vessels, the 3.2 and 2.2 separation vessels cannot take advantage of the waste-derived particulate separation medium. These two separation vessels must use an artificial density-creating material: a magnetite, ferrosilicon or mixture thereof in the case of the 2.2 separation vessel, and ferrosilicon in the case of the 3.2 separation vessel. Because both of these suspension agents are very expensive, it is very important to recover them from separated stream rinse water.

The Magnetic Recovery Cone System and Process

Throughout the mineral separation and recycling industries, magnetite and ferrosilicon are recovered principally by means of a magnetic recovery drum. This wet drum separator is an extremely robust machine, for under normal operating conditions, one can expect to find a very high percentage of magnetic recovery, always 99.7% or better. This performance will drop sharply, however, if the concentration of magnetics fed to the drum falls below 100 g/L or if it should exceed 240 g/L. The tendency within the recycling industry is to reduce the magnetic adhesion losses as much as possible by using very large quantities of rinse water. The rinse water fed to the magnetic separator therefore tends to be very dilute, far below the recommended 100 g/L.

Figure 17:
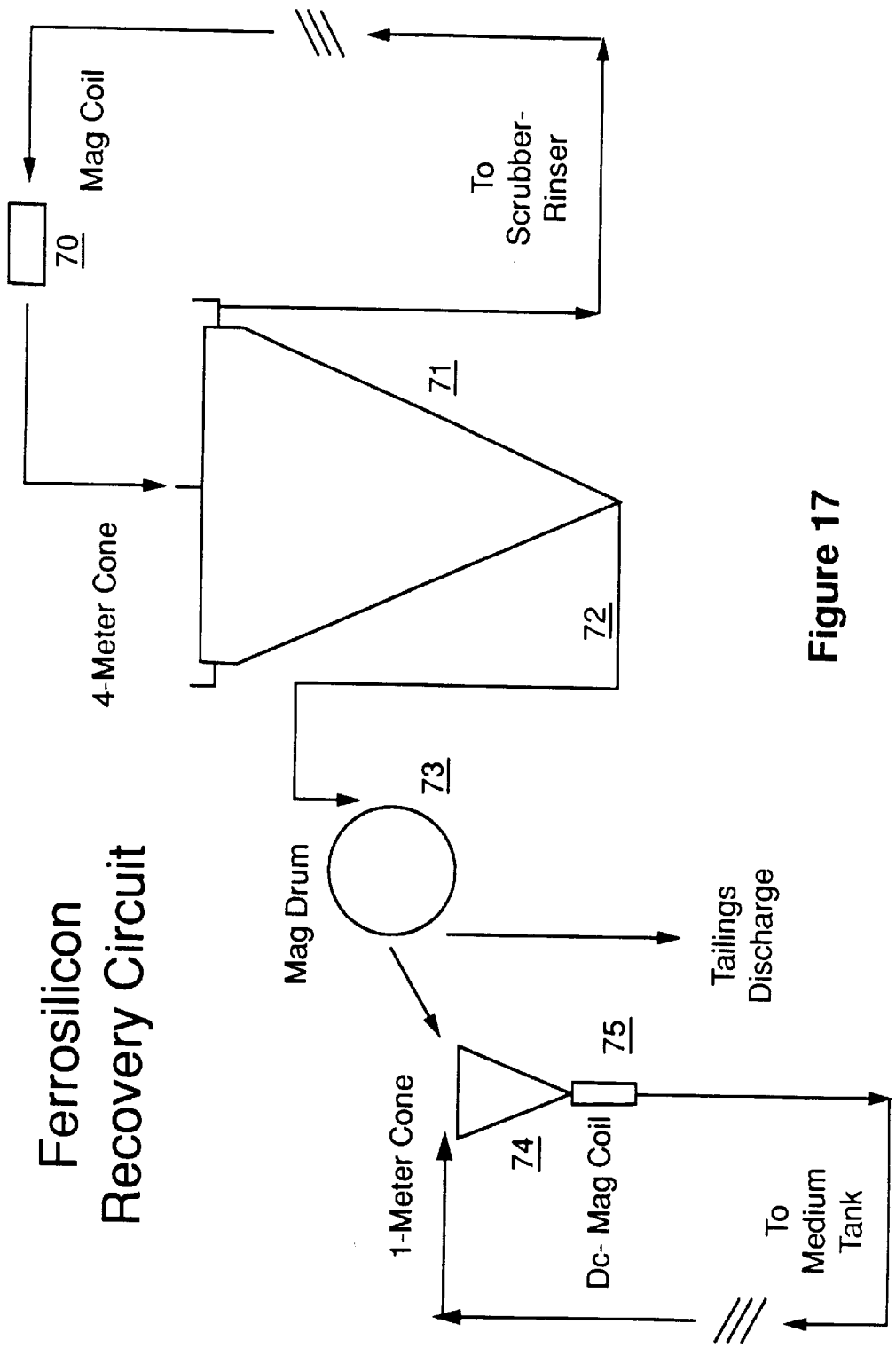
FIG. 17 is a flow diagram of one embodiment of a magnetic recovery system for recovery of ferrosilicon and/or magnetite used in one embodiment of a process and system of the invention.

The apparatus of the preferred embodiment depicted on FIG. 17 is used to recover and recycle magnetite and/or ferrosilicon from the 3.2 and 2.2 separation stages. It increases the concentration of magnetics to the magnetic drum without transferring medium into the rinse water circuit. The rinse water is pumped through a magnetizing coil 70 which causes the particles of magnetite or ferrosilicon to be attracted to one another. This magnetized ferrous material is then fed to a deep, 4 meter concentration cone 71 where it gains in mass through self attraction and rapidly settles out. The non-magnetic slimes remain in their original colloidal state and overflow the cone. A small paddle at the bottom of the cone keeps the magnetic pulp in a fluid state so as to assure its easy evacuation. The magnetics are then extracted from the bottom of the cone 72 at the desired concentration of 100–240 gm/l and routed to a magnetic drum 73 for separation. This effects a double magnetic attraction, raising the mag-drum efficiency to 99.9%, without the transfer of medium into the rinse water circuit. The underflow of the magnetic separator together with a small part of the medium is continuously fed to a 1-meter concentration cone 74; this continuously thickens the concentrate discharge, thickens the medium, and removes fluff and clay from the medium.

After separation, the magnetics pass through a de-magnetizing coil 75 before returning to the medium tank.

This magnetite/ferrosilicon recovery apparatus of the preferred embodiment (FIG. 17) offers four (4) distinct advantages:

1) The concentration of magnetics at the bottom of the cone 72 easily increases to levels exceeding 100 g/L, which helps to assure an efficient recovery of magnetite or ferrosilicon. Note that a magnetic drum may be very efficient in recovering magnetics, but if the quantity of magnetics it must process is increased though the transfer of raw medium into the rinse water circuit, the absolute loss of magnetics may still be very high.

2) When this magnetized ferrous pulp is fed to the magnetic drum, there is a double magnetic attraction. All testing to date situates the efficiency of the magnetic drum very close to 99.9%.

3) Since the pulp presented to the magnetic drum is for the most part free of clay, the viscosity of the pulp is reduced. This low viscosity enhances the sharpness of the magnetic separation.

4) Since the volume fed to the magnetic drum 73 is reduced by a factor of 50 or more, the size and cost of the magnetic drum is greatly reduced. In a non-ferrous metal recycling application, a small magnetic drum with a diameter of 380 mm and a length of 300 mm, preceded by a 4 m diameter cone, is sufficient to process as much as 150 m$^3$ of rinse water. The cone can reduce an initial 150 m$^3$ of rinse water, for example, to approximately 3 m$^3$ of concentrated magnetic pulp. Normally a large two-state magnetic drum with a diameter of 900 mm and a length of 2700 mm would be required to process the same 150 m$^3$ of rinse water.

Small amounts of magnetic fines have been detected in the overflow of the cone, and if this overflow were allowed to go to effluent, it would represent a significant loss. This problem may be overcome by means of a rinse water recycle circuit. The overflow of the cone is not allowed to go to effluent but is continually recycled and reused as rinse water in such a system and process. At a certain point, however, the feed to the cone must be stopped until the finest magnetic material within the cone has had the opportunity to settle out, or until the entire contents of the cone have been processed in dilute form by the magnetic drum. After all magnetic material has been processed, this "dirty" rinse water in the cone is replaced with clean water.

The Scrubber-Rinser

The preferred embodiment's use of the described system and process of magnetizing coil 70, 4 meter cone 71 magnetic drum 73, one meter cone 74 and demagnetizing coil 75 is sufficient to prevent any appreciable loss of the magnetite or ferrosilicon in the outgoing rinse water, but it does not cover the loss of magnetics on and within the outgoing separated streams of non-ferrous metals. These inhesion losses typically run as high as 2 kg to 3 kg of magnetite or ferrosilicon per ton of twisted metals. Similarly, the waste derived particulate separation media is lost on and within the particulates in each of the outgoing separated streams, both floats participates and sinks particulates. Twisted metals often have an interior; no external rinsing can release the magnetics trapped on the inside. The scrubber-rinser (see FIGS. 6A–C) effects one or more stages of violent underwater agitation to free all inhering solid particulate separation media.

Figure 6:
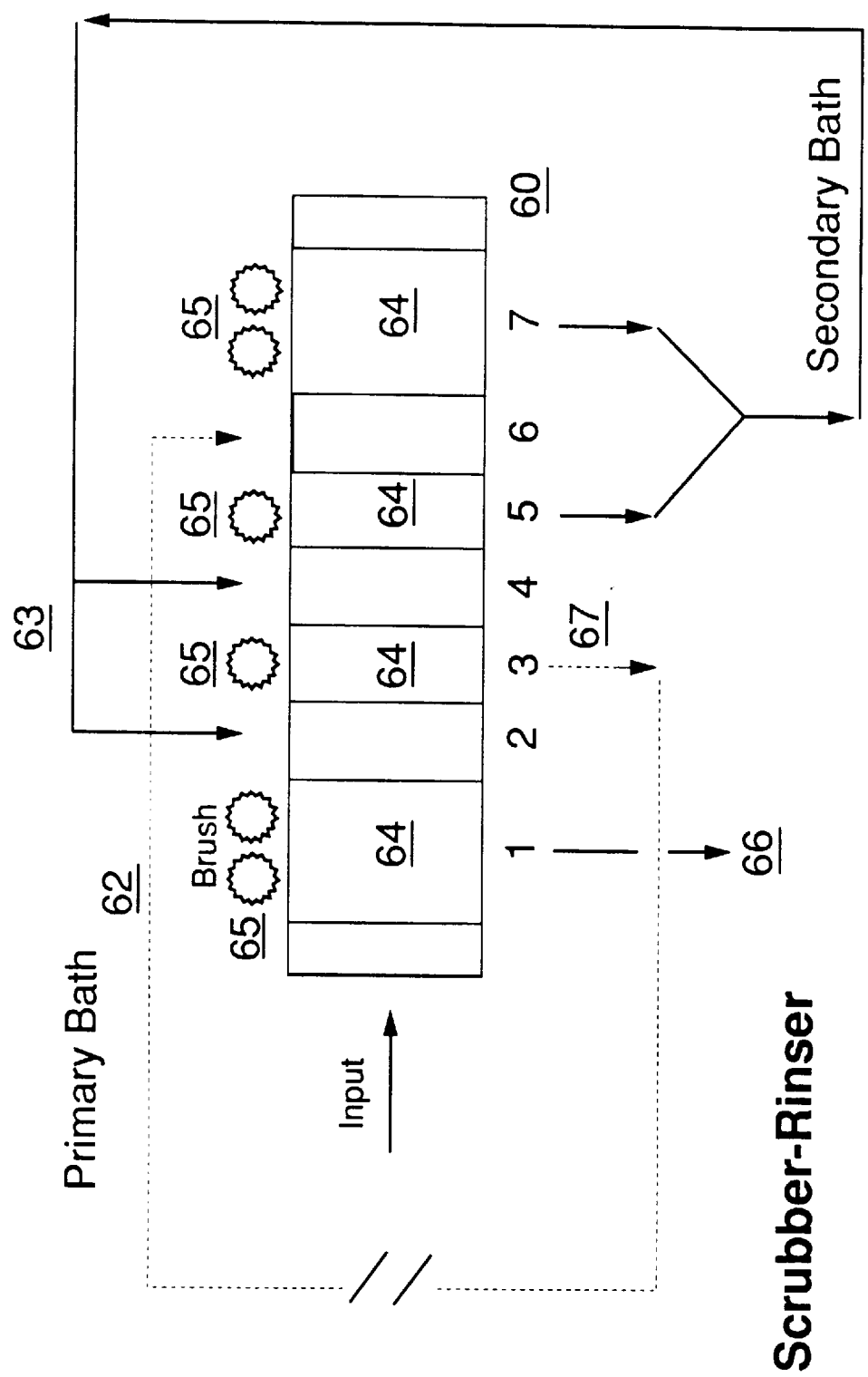
FIG. 6A is a partial end view of a scrubber-rinser used in one embodiment of a process and a system of the invention.
FIG. 6B is a cross sectional view, taken at Section lines A—A, as shown in FIG. 6A, of said scrubber-rinser.
FIG. 6C is a diagrammatic representation of input and wash water flow through said scrubber-rinser.
Figure 7:
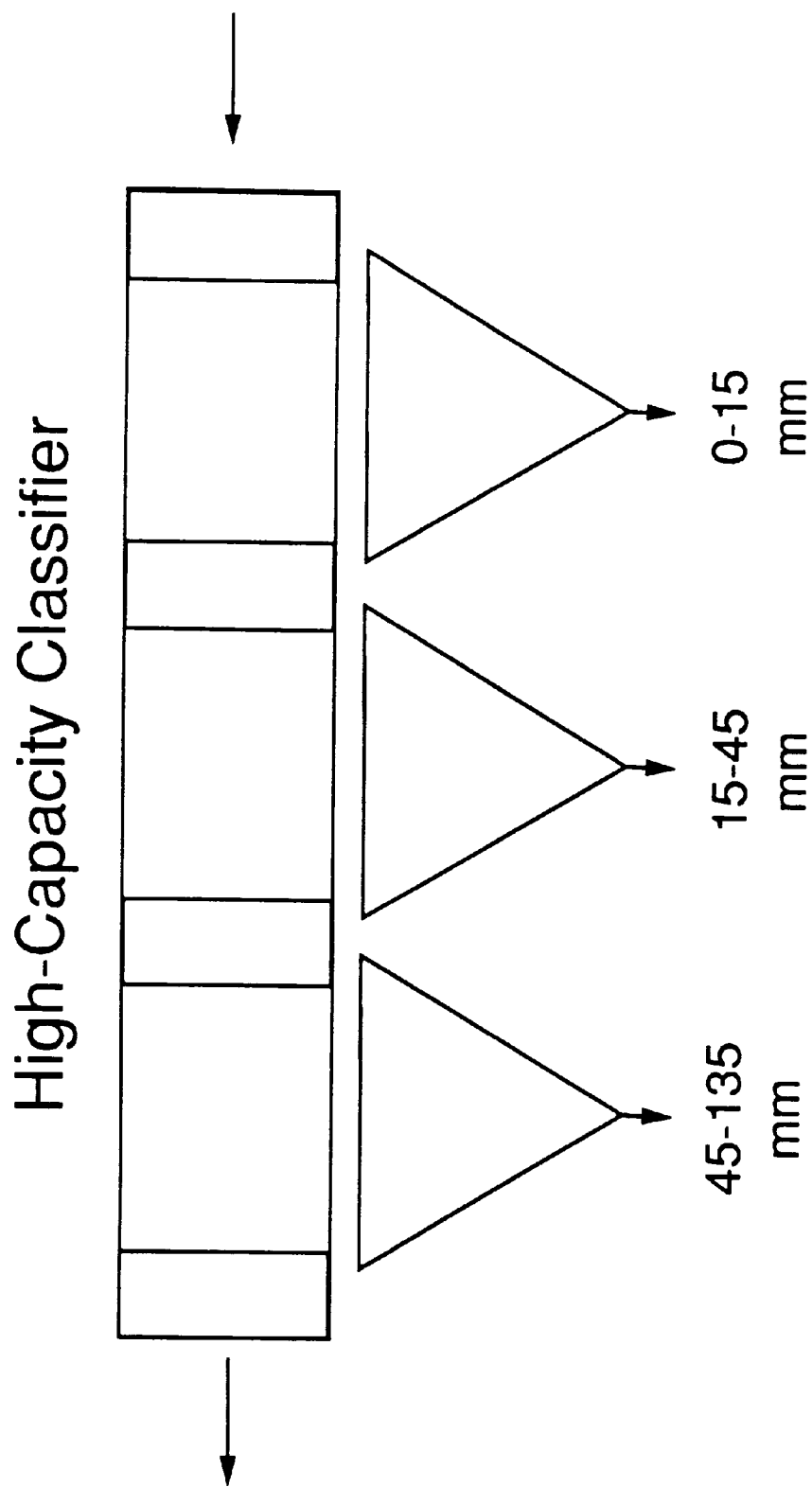
FIG. 7 is a diagrammatic representation of a high capacity classifier used in one embodiment of a process and system of the invention.

A scrubber-rinser device (FIG. 6C) is provided to solve the overall adhesion and inhesion problems of waste-derived and non waste-derived particulate separation media being carried out of the separation vessels with the separated floats particulates and sinks particulates. The preferred three stage scrubber-rinser of FIGS. 6A–6C provides a sequence of operations in one device: 1) drain, 2) scrub, 3) drain, 4) scrub, 5) drain, 6) scrub, 7) drain (see FIGS. 6B, 6C). These seven steps are carried out by means of a single rotating scrolled drum 60. The scrubbing which takes place at positions 2, 4 and 6 (FIGS. 6B, 6C) involves a forceful agitation of the metals while completely submerged in a rinse water bath. Special agitators, called "bossages" 61 (FIG. 6A), welded to the walls of the scrubber-rinser, tumble the metals over and over again, forcing them to release their inhering particulate separate media. Primary rinse water 62 is used in the last scrubbing at position 6, while secondary rinse water 63 is used in the first two scrubbings at positions 2 and 4. The draining which takes place at positions 1, 3, 5 and 7 is effected by means of stainless steel wedged wire panels 64 of a 1 mm aperture. A special brush 65 may be mounted on the outside of each of these panels to insure that the wedged wire slots do not blind up with copper wires, tar or fluff.

The scrubber-rinser shown in FIGS. 6B, 6C, thus has four drain sections, sections 1, 2, 3 and 4, and three scrub sections, sections 1, 2 and 3 (see FIG. 6B). The feeds and drains of these sections, in a preferred embodiment, is as follows:

Scrub Section 1: Fed with recycle rinse water 63.

Drain Section 1: Flows to primary medium tank 66.

Scrub Section 2: Fed with recycle rinse water 63.

Drain Section 2: Dirtiest water, flows to existing rinse water tank, 67.

Scrub Section 3: Fed with "fresh" rinse water 62, which is treated "dirty" rinse water 67, treated either in clarifier or 4 m cone to "clean up".

Drain Sections 3, 4: Flows to recycle rinse water 63.

These zoned feeds and drains maximize recovery of any type of solid particulate suspension media, including waste derived solid particulate suspension media The scrubber-rinser may also be provided with a trough structure to catch spray water, to keep it from going into the medium and altering the specific gravity. The scrubber-rinser has, as noted, internal scrolling forming a helical path that the metals tumble along as the drum is rotated around its longitudinal axis.

The scrubber-rinser dispenses water over a relatively long period of time, and it operates three-dimensionally: the entire particle is completely submerged for more than 20 seconds in a rinse water bath. Combined with the forceful agitation of the particles and the judicious use of both primary and secondary rinse water, this assures an enormous reduction in the quantity of water required to rinse the outgoing particles: instead of a typical 150 to 250 $m^3$ of rinse water needing to be clarified per hour, only 30 to 50 $m^3$ per hour must be treated. This results in a very significant reduction in the cost of effluent treatment.

The total loss of magnetics in the recycling of non-ferrous metals in the past has reached levels as high as 7 kg per ton of metals treated, approximately 4 kg as a result of the inefficiency of the magnetic drum and another 3 kg in adhesion and inhesion losses. The use in combination of the FIG. 17 subsystem and scrubber-rinsers in the particularly preferred embodiment of the system and process of the invention reduces those losses to insignificant levels, which has an important positive effect on the economics of the recycling process.

Use of scrubber-rinsers dispenses with the need for use of vibratory drain and rinse screens. This elimination of vibratory screens offers two further advantages: Firstly, it brings about a significant reduction in noise. Secondly, it brings about a significant reduction in capital expenditures for the equipment.

Scrubber-rinsers preferably are used on both the float and sink sides of each separation vessel present in the system and process embodiments of the invention, which use either waste-derived or non waste-derived particulate separation media Thermolysis Thermolysis (from the Greek: thermos=heat) involves the decomposition, distillation or cracking of complex organic molecules by means of heat in the complete absence of oxygen. It is a preferred method for further treatment and disposal of non-putrescent organic product material produced by the system and process of this invention The term thermoysis may on occasion be used in a very broad sense, encompassing all thermal conversion processes except pure combustion. Nonetheless a distinction should be made between those processes which are endothermic and use an external source of heat to drive the conversion reaction, and those processes which are exothermic and generate their own heat through the partial combustion of the organic material being processed. Since thermolysis takes place in the total absence of oxygen, it falls quite clearly into the former category of thermal conversion processes.

The general characteristics of the thermolysis process of the preferred system and process of this invention include:

the decomposition, distillation or cracking of complex organic molecules, by means of heat in the absence of oxygen oven temperature between 500–550° C.; time 20–45 minutes at temperature, with actual residence time over 5 hours two products: gas and activated carbon activated carbon serves as filter, absorbing heavy metals & other pollutants product carbon is immersed in water, shedding halogens and salts The system and process of the invention may isolate, in its various embodiments, as many as three organic fractions: the fine fluff from the cyclones, organic fractions from any air separators (category 2) and the heavy organic fraction from the 1.6 separation vessel (category 3). These three organic fractions are preferably blended and baled to prepare them for thermolysis. Blending of the organics provides:

a uniform bulk density
  a uniform moisture content
  a uniform caloric content
  a uniform gas content
  a uniform carbon content
  a uniform ash content
  an acceptable elasticity range (an important factor in baling)
  a neutralization of acids generated within the thermolysis reaction (with the possible addition of CaO).

Baling reduces significantly the volume of the organic material so that it can be handled and transported in a cost-effective manner, further allowing a carefully blended fuel bale which meets a variety of user specifications to be brought to the thermolysis system. Currently, two companies, one in Sweden and the other in Germany, offer a complete processing line making cylindrical, hermetically sealed bales of a 1.2 m (4 ft.) diameter and a 1.2 m (4 ft.) length.

This round-baling technique, used extensively in agriculture for several decades, compresses the organic waste materials to a fraction of their original volumes, and at the same time, removes much of the air from any uncompressed hollow spaces. The cylindrical bale is then tightly bound in a plastic film. Due to the exclusion of oxygen, there is no fermentation, mold development or other organic deterioration of the waste materials. Also due to the presence and activity of aerobic bacteria, the amount of oxygen within these air-tight fuel cylinders can be very low. No offensive odors are generated, and, because the plastic film also serves as a moisture barrier, the bales may be transported and stored quite easily and economically. Because these fuel bales can be transported by means of ordinary trailer transport, dedicated garbage trucks are not required. They can be stored in heat or cold, in sunshine or rain, without any degradation in their caloric content and without any negative effect on the environment

Thermolysis Oven Design

Thermolysis takes place in the complete absence of oxygen, and therefore the entrance to a thermolysis oven must remain tightly sealed at all times. A isolation chamber could be constructed right at the entrance to the thermolysis oven, but this would be both costly and ineffective. The solution adopted herein lies in using the baled fuel cylinder as a kind of seal or "cork" to the thermolysis oven entrance. Since the baled fuel cylinder functions as an integral part of the thermolysis oven, it is still another example of a device or process which utilizes the waste itself as the key to the economical recycling of the waste.

A typical thermolysis oven 80 for use in preferred system and process of the invention consists of one or more static steel oven tubes of a 1.2 m (4 ft.) diameter, of 14.6 m (43 ft.) length (see FIGS. 18, 24–26). (Alternatively, square tubes may be used, to increase heat flow into the fuel). The preferred thermolysis oven tubes of the invention (see FIGS. 24–26) each consist of three parts:

1. a reception or insertion chamber 81, 3.6 m in length (unheated);

2. a reaction chamber 84, 9 m in length (temperatures between 400–500° C.) heated by conduction heating devices, combustion or natural gas, or other means well-known to those skilled in the art;

3. an isolation or exit chamber 85, with quench tank 86 underneath, 2.4 m in length.

The first 3.6 meters of each oven tube consists of an unheated reception chamber 81 wherein the fuel cylinders 82 are inserted by means of a hydraulic ram 82. With a minimum of two thirds of the reception chamber 81 at all times packed tightly with fuel cylinders, no oxygen can enter into the reaction chamber of the thermolysis oven.

If desired, oil, grease and fuel from automobile depollution centers (6000 to 8500 kcal/kg), including crankcase oil, diesel engine oil and transmission, brake and power steering fluids, domestic cooking oils (7000 to 9000 kcal kg), as well as mineral oils (8500 to 10500 kcal/kg), may be injected directly into the reception chamber 81 of the thermolysis oven 80. Not only are these liquids of a high caloric value thermolysed, but they also serve to lubricate the fuel cylinders before there has been any significant reduction in volume.

A pipe 87 situated before the end of the reaction chamber evacuates the thermolysis gases from the oven. As the activated carbon 88 which the thermolysis process produces exits the isolation chamber portion of the oven, it falls into the quench tank 86, which not only brings down the temperature of the carbon 88 so as to prevent auto-combustion, but it also frees the carbon from halogens. The halogens are then removed from the water by means of ion exchange.

Alternate Thermolysis Oven Design

Figure 27A:
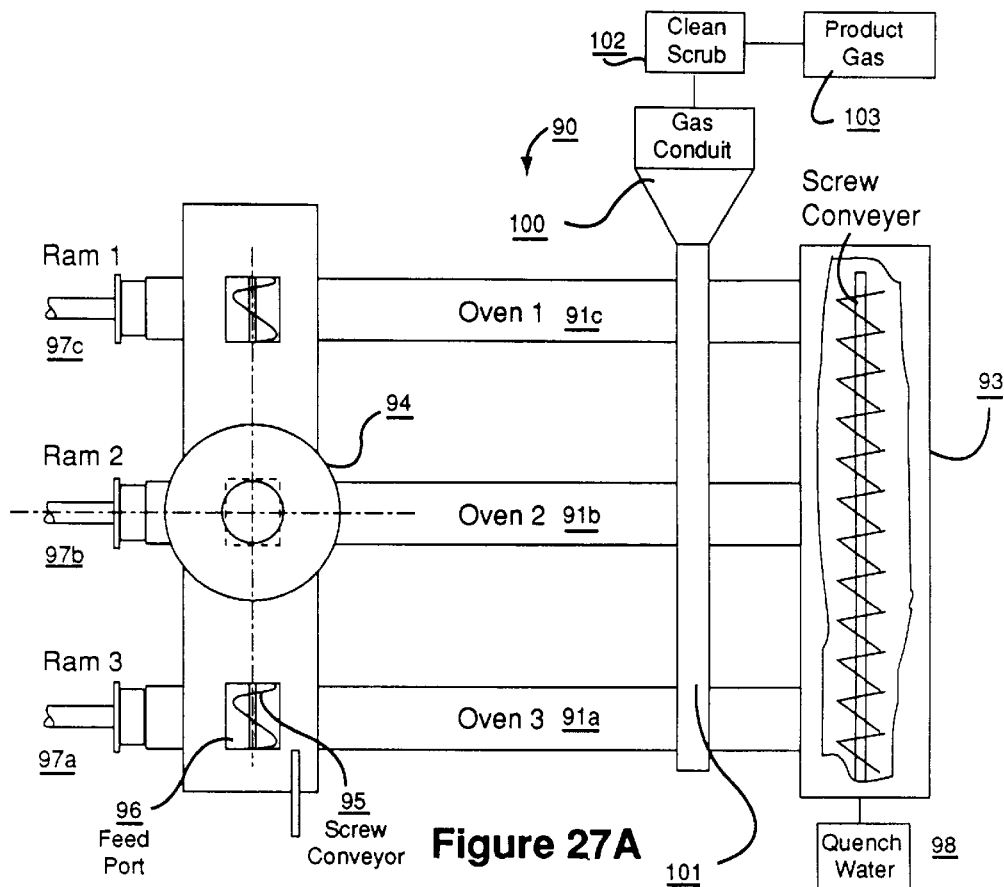
FIGS. 27A–B is a top and side diagrammatical view of a thermolysis oven of a second embodiment of a process and system of the invention.
Figure 27:
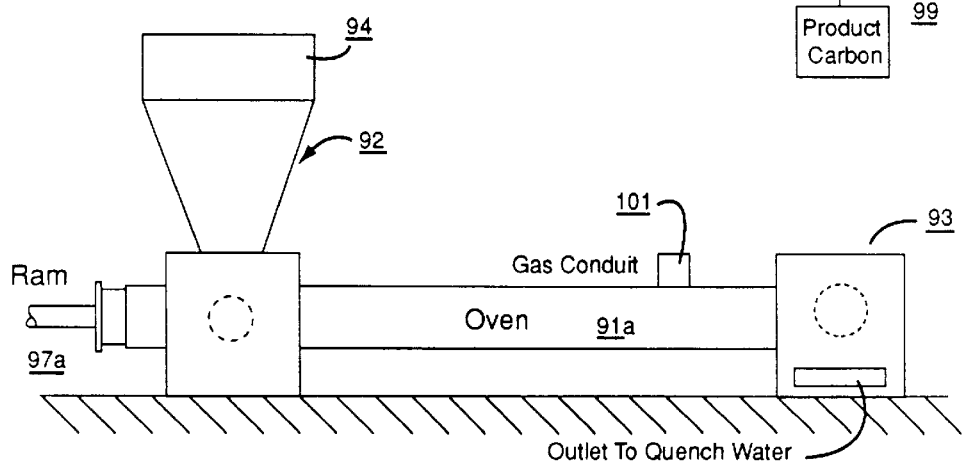
FIG. 27C is another side diagrammatic view of a thermolysis oven of said second embodiment depicting an alternative heating means.
Figure 27C:
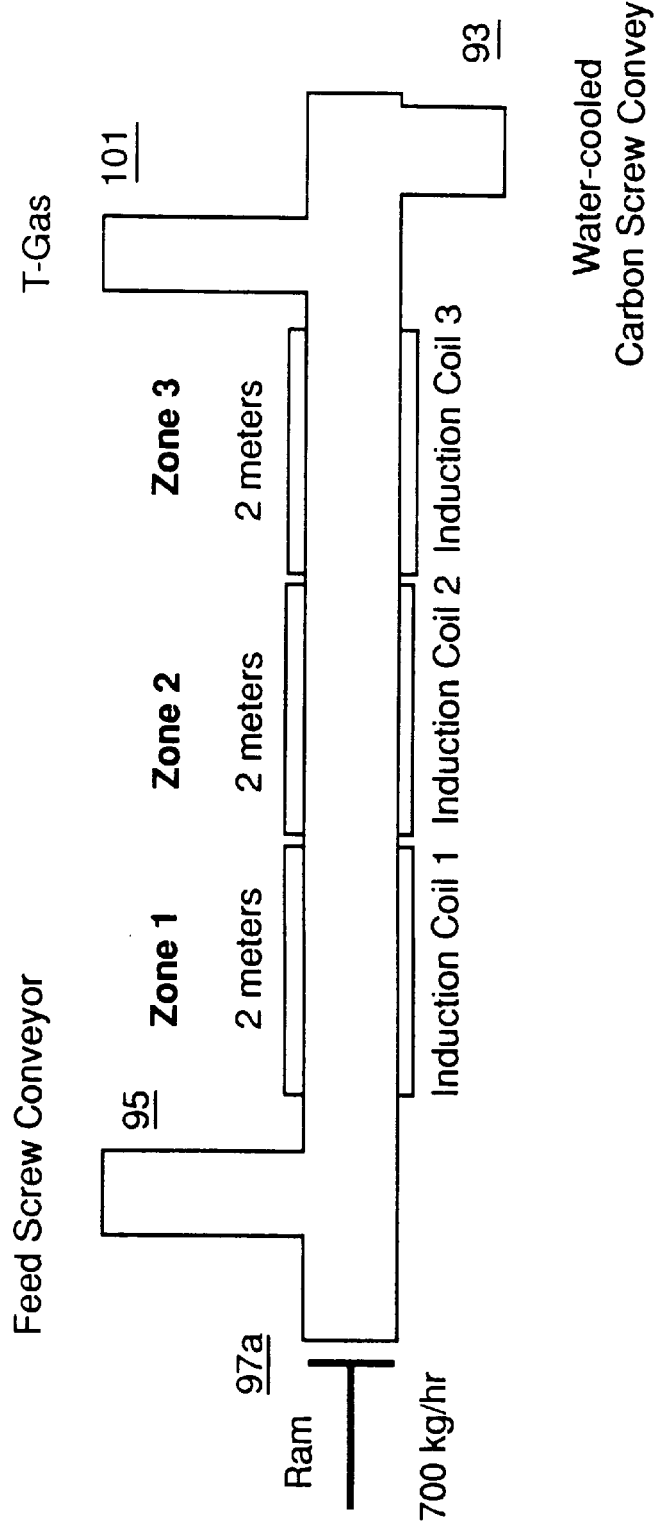

An alternative structure for a thermolysis oven 90 effective for the preferred process of the invention is shown diagrammatically in FIG. 27A–C. Instead of oven tubes of four (4) foot diameter, preferably assembled in banks of two (2) tubes per oven (see FIGS. 24–26), this oven embodiment uses oven tubes 91 of two (2) foot diameter, preferably assembled in banks/ovens of at least two (2) tubes (for sake of illustration, a three (3) tube oven is described). The use of smaller diameter tubes in this embodiment improves heat transfer through to the core of the material being treated. While baling feed material into two foot diameter bales may be selected to handle feed into this thermolysis oven embodiment, a single feed system 92 for simultaneous introduction of particulate material into the multiple oven tubes may be used. Tube lengths may be of any length effective to perform thermolysis, although tubes of 20 foot length are preferred.

Essentially, this thermolysis oven has a common feed 92 and a common carbon evacuation system 93, surrounding, at inlet and outlet, the multiplicity of oven/reaction tubes 91. The feed system 92 includes a hopper 94, arrayed vertically above a conveyor, which may be a screw conveyor 95. The screw conveyor is arrayed substantially perpendicularly to the longitudinal axis of the multiple oven tubes. (FIG. 27A). A feed port 96 is provided into each of the oven tubes 91a, 91b, and 91c, which allows necessary quantities of feed material to drop vertically downwardly into the inlet portion of each oven, as conveyed to each inlet by said screw conveyor. Particulate feed material may be subjected to punchsizing in the Recycling System International device described above, if desired, to provide a 30 mm (1¼ inch) average size feed particle. Rams 97a, 97b, and 97c, which may be independently activatable, or otherwise controlled for simultaneous movement in to and out of the inlet portions of each respective oven, are provided to compact the particulate feed material into an oxygen-barrier mass. Control means of the type well known to those of ordinary skill in the art may be provided to actuate independent or simultaneous ram movement.

In concert with the hopper/conveyer feeding particulate material into feed ports of each oven, the rams compress and pack the feed, in a compaction zone, moving it into the oven and progressing through the oven, while preventing entrance/insure lack of oxygen. A compaction zone of about 2.5 times the oven diameter is especially effective. The result is a plug flow virtually identical to that enabled by the use of the baled feed/ram combination of the embodiment shown in FIGS. 18, 25–27.

Figure 18:
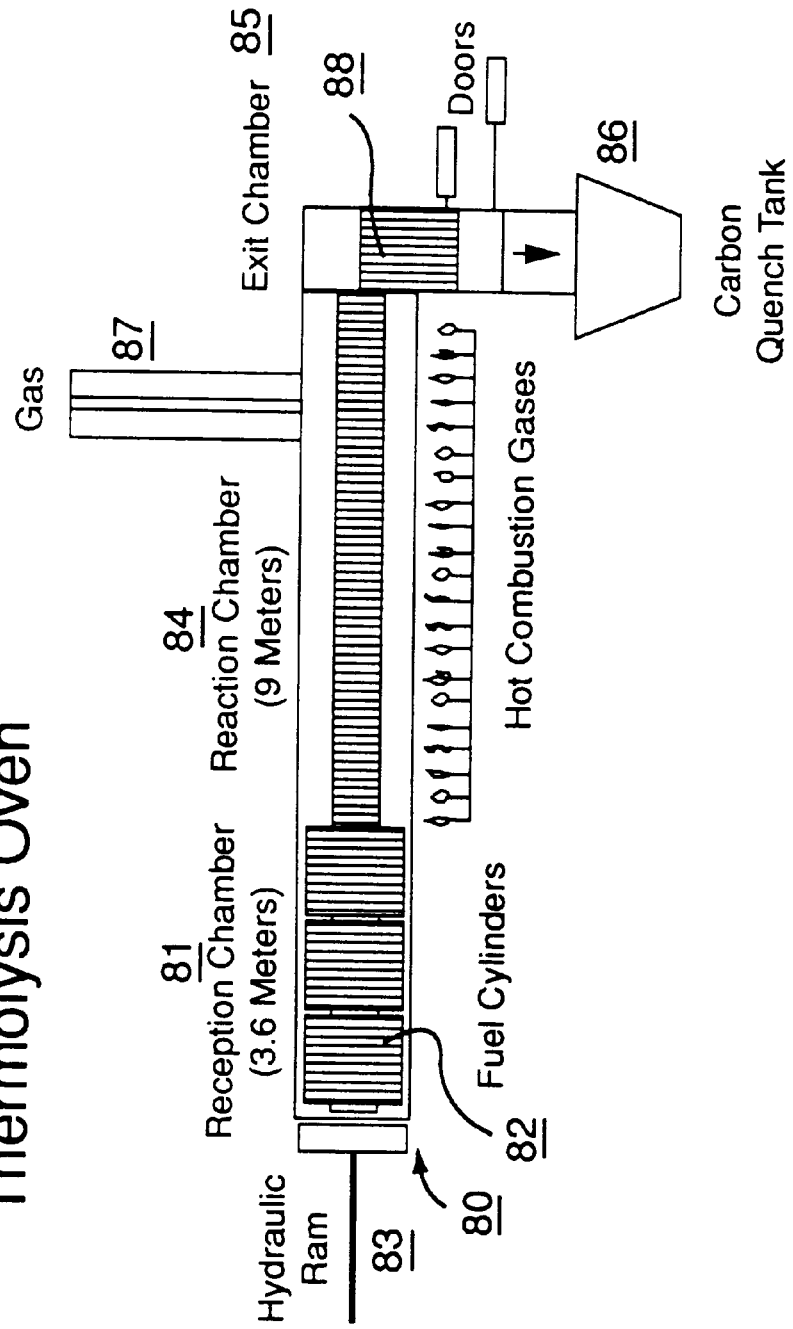
FIG. 18 is a diagrammatic side view cross section of a thermolysis oven of one embodiment of a process and system of the invention.

Operation of this embodiment is substantially the same as the embodiment illustrated in FIG. 18, described above. Use of zoned induction coil heating for the oven tubes is shown in FIG. 27C. At the outlet of the ovens, another conveyor, again preferably a screw conveyor 93, is provided, again arrayed in a substantially perpendicular direction to the longitudinal axes of the oven tubes. This conveyor 93 may, in another variation, be jacketed for flow of cooling water, to commence cooling of the product activated carbon. Activated carbon exits each oven tube, and is conveyed by the screw conveyor to a quench water vessel 98, to quench the carbon 99 as described above.

Figure 25:
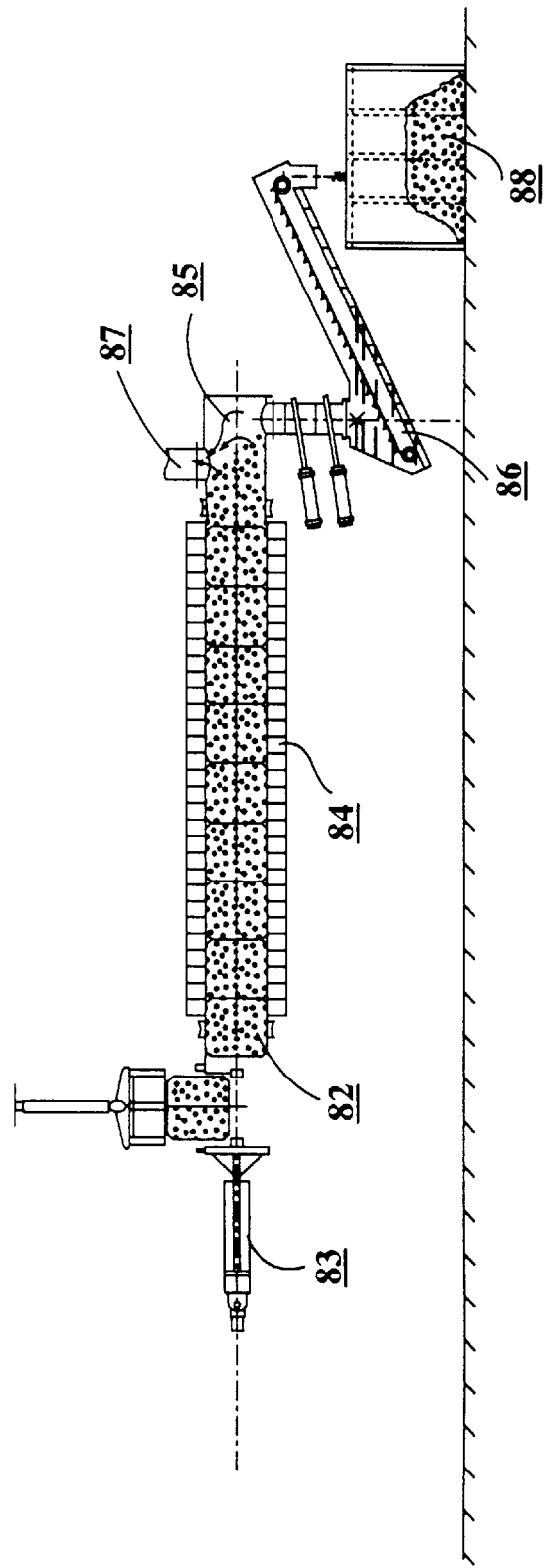
FIG. 25 is a side cross sectional view of one embodiment of the thermolysis oven diagrammatically illustrated in FIG. 18.

As another alternative thermolysis oven structure, the oven of FIG. 27A–C may be fitted with a gas collection structure 100. The structure consists of a conduit 101, arrayed vertically preferably above the horizontal plane of the oven tubes, connected for gas flow to each of the ovens. Gas from each oven tube flows out of the respective oven and into the conduit 101. A gas cleaning or scrubbing unit 102 may be provided, of the type well-known to those of ordinary skill in the art, to further purify or treat the thermolysis gas, to produce product gas 103. That product gas may be used directly, or subjected to further treatment, such as a reformation as described infra, a reformer unit 105 for which is shown in FIGS. 25, 27 as part of the first thermolysis unit embodiment itself.

Each tube of the FIGS. 27A–C embodiment is able to process about 700 kg/hour of particulate feed. If a six (6) tube oven is used, processing of about 4 tons/hour is attainable, or about 30,000 tons/year.

The Products of Thermolysis

The thermolysis reaction requires approximately 20 to 45 minutes at 500° C. to reduce the organic material to two fairly simple end-products: a solid and a gas. The gases exiting the thermolysis oven are composed mainly of hydrogen ($H_2$), methane ($CH_4$), water vapor ($H_2O$), carbon monoxide (CO), carbon dioxide ($CO_2$), ethylene ($C_2H_4$), ethane ($C_2H_6$) and a variety of more complex hydrocarbons (C+H+). The percentage of each gas will vary according to the composition of the original organic waste.

Due to the presence of phosphoric acid and moisture within the original waste material, the carbon within the oven becomes activated. This activated carbon is identical in almost every aspect to the activated carbon used in gas masks or in water filtration systems. Roughly 10% of the thermolysis carbon has a large internal surface area which varies from 1000 to 1500 $m^2/g$, while the remainder has an internal surface area which varies from 700 to 1000 $m^2g$. The thermolysis ovens of the invention are constructed in such a manner that as the gases are slowly released within the oven, they are forced to pass through this very dense and compact activated carbon filter inherently created by the internal mechanics of the oven itself. The resulting activated carbon filter within each oven has a diameter of about 1.32 meters and a length of about 3 to 4 meters. As only 100 mg of activated carbon would be required for the perfect filtration of one m³ of thermolysis gas (equivalent to about 1 kg of activated carbon for every 10 tons of gas), the fact that the oven at any given moment has about 2,500 times more activated carbon than what would be required for the filtration of the gas it liberates, which carbon filter within the oven is continually being replaced and renewed, explains why the gases exiting the thermolysis oven are free of pollutants. See J. C. Templier, "La Thermolyse, une technique de recyclage et de depollution." ISSeP, Liege, 24–25 March 1994, p. 5, Table 4.

It may in some circumstances be necessary to add calcium oxide (CaO) to the raw waste prior to thermolysis to neutralize any acids that might be released during the thermolysis reaction. For example:

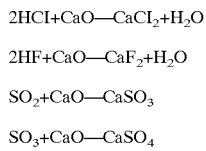

$2HCl+CaO \rightarrow CaCl_2+H_2O$ $2HF+CaO \rightarrow CaF_2+H_2O$ $SO_2+CaO \rightarrow CaSO_3$ $SO_3+CaO \rightarrow CaSO_4$ In thermolysis where mercury (Hg) and other heavy metals may be present, mercury vaporizes at 356° C., and since the carbon within the thermolysis oven reaches temperatures as high as 500° C., vaporized mercury is not readily adsorbed by the activated carbon like other heavy metals. Vaporized mercury is prevented from exiting with the thermolysis gases because it has a tendency, even in a gaseous state, to sink by gravity to the bottom of the porous bed of activated carbon within the oven due to its density. The activated carbon therefore serves as a kind of "sponge" wherein mercury, arsenic and other heavy metal vapors can be found.

Thus freed of heavy metals, halogens and any other pollutants, the thermolysis gas, when burned, releases into the environment nothing more than $CO_2$ and water vapor. No external gas scrubbing or environmental control system is required. This is particularly significant, since the cost of an environmental control system in some cases in prior art systems for producing combustible gas is equivalent to or even greater than the cost of the overall system itself. Here again is a device and product streams which find within the waste the key to the economic recycling of the waste.

The resulting thermolysis carbon tends to be very brittle. It is easily liberated by means of a drum pulverizer from any free-particle inorganics which may have been trapped on the inside of the original organic material. Once a 1 mm inorganic fraction has been isolated by the drum pulverizer, any ferrous fraction may be removed by means of magnets. Any liberated 1 mm inorganic material may be left in the thermolysis carbon, or it may be isolated by means well known to one of ordinary skill in the art. After pulverization and separation, the carbon powder may be dried both mechanically and thermally. The resultant material is separated from larger, free particle inorganics, is free of halogens, and contains less than 5 kg/ton of heavy metal; it is directly usable for advanced treatment of waste water.

Syngas Reformation from Thermolysis Gas

The thermolysis gas products may, in a particularly preferred embodiment, be subjected to a reformation process to produce a syngas material (see FIGS. 25, 27 and reformer unit 105). The thermolysis gas at 500° C., existing from the thermolysis ovens, is raised to about 800–850° C. for from about 2 to about 3 seconds. The heat to effect this temperature increase preferably is supplied by means of oxygen and methane burned in an oxyfuel burner which supplies heat to the reformer chamber. The condensable hydrocarbons—$H_2CO$, methane and/or those containing more than three (3) carbon molecules—are reformed into a more stable, non-condensable gas containing two carbon molecules or less.

The resulting reformed gas can be pipelined as a stable combustion fuel to any physically convenient point of usage. Also, it can be directly provided to an internal combustion engine such as a Colt-Pielstock Caterpillar or Jenbacker engine, or to a gas turbine such as a Heron or Kollina unit.

Vitrification of the Heavy Metal Containing Carbon

Free of large inorganics and free of halogens, the activated carbon powder may still contain from about 0.5 kg to 3 kg of heavy metals per ton of carbon. One of the best ways to dispose of this material is by means of a vitrification oven operating at temperatures between 1250° C. and 1400° C. At such high temperatures, the inorganic material melts and vitrifies, very effectively trapping pollutants in an extremely dense and vitreous matrix.

Due to the presence of heavy metals, the density of this vitrified ash is very high, generally greater than 4.0 specific gravity, and since the volume of the original ash is reduced by more than 50%, its porosity is quite low. The inorganic material is actually transformed into a high-density, low-porosity, quasi-impermeable stone of a relatively small surface area.

Most dioxins and furans generated within this vitrification process are easily destroyed at the high temperatures at which vitrification takes place. After treatment in an activated carbon filter, the flue gases of the vitrification oven contain very few dioxins and furans: less than 0.005 ng/m₃, or 20 times less than what the strictest norms would permit. Also, all carbon, either free or combined, is transformed into carbon dioxide. In the absence of free carbon, no polychlorinated hydrocarbons appear.

After a slow cooling-down which permits the cations and anions within the vitrified mass to bind themselves to one another in a homogeneous manner, a dark, black artificial stone of a remarkable and exceptional beauty is produced. This stone is hard and scratch-resistant; it can be easily cut without fracturing or cracking; and it can be polished to a brilliant natural shine without the use of polishing agents. In an unpolished state, it has a wholesale value which has been independently estimated to be approximately US$ 400/t.

Economics of Thermolysis and Vitrification

The standard 4 ton/h gas-fired thermolysis oven described as part of the preferred embodiments of this invention (see FIGS. 19, 25–27) costs approximately US$ 4,000,000. Three ovens at a total capital cost of US$ 12,000,0000 would be needed to thermolyse 100,000 ton/y over a 10 year period, at an interest rate of 8.5%, would come to US$ 1,700,000/y. The wages of five operators (continuous operation 24 h/day, 365 days/y) would come to US$ 250,000/y. An annual maintenance cost of 6% would come to US$ 720,000, and the cost electricity over an entire year would add a further US$ 600,000. This gives a total annual expenditure of US$ 3,270,000, and a thermolysis cost of approximately US$ 33 per ton.

Several thermolysis ovens would be needed to supply a single vitrification oven, and therefore in calculating the cost of vitrification, a starting point of the output of 50 thermolysis ovens of a 30,000 tpy capacity or 30 thermolysis ovens of a 50,000 tpy capacity has been used. This represents an input to vitrification of about 250,000 tpy of carbon and an output of artificial stone of about 100,000 tpy. With temperatures in the oven ranging from 1250° C. to 1400° C., vitrification would require a minimum of 1 kWh/kg to sustain the vitrification process. A small quantity of thermolysis gas must be fired along with the thermolysis carbon: 2 tons of gas for each 100 tons of carbon, or 5,000 tpy of gas for 250,000 tpy of carbon.

A vitrification site should include at least one thermolysis oven, which should be fed a fairly clean and uncontaminated carbonaceous material so as to produce a high-quality activated carbon. This activated carbon can be used for the filtration of the vitrification flue gases. Also in the design of a vitrification site, a small boiler together with a steam turbine and alternator should be included. Thus, the capital expenditure in US$ for a site capable of handling 250,000 tpy of carbon or approximately 100,000 tpy of vitrified stone would run as follows:

| | |
|---|---:|
| one thermolysis oven | $4,000,000 |
| three vitrification ovens (total stone capacity of 12 ton/h) | 8,000,000 |
| auxiliary equipment | 1,000,000 |
| boiler | 1,000,000 |
| gas treatment | 2,000,000 |
| alternator | 1,500,000 |
| civil works | 1,500,000 |
| engineering and royalties | 6,000,000 |
| | $23,000,000 |

The annual debt service payment on US$ 25,000,000, at 7% interest over 15 years would be US$ 2,500,000, and therefore the calculations continue:

| | |
|---|---:|
| annual debt service payment on US $25 MM | $2,500,000 |
| electricity chalk | 450,000 |
| maintenance | 1,250,000 |
| patent fees | 1,250,000 |
| make-up water | 100,000 |
| gas scrubbing | 200,000 |
| wastewater treatment | 200,000 |
| external process & safety monitoring | 100,000 |
| other process expenses | 400,000 |
| personnel (10 people) | 1,400,000 |
| insurance | 200,000 |
| other administrative expenses | 150,000 |
| contingency of US $3/ton | 750,000 |
| | $8,950,000 |

This annual expenditure of US$ 3,950,000 divided by 250,000 tpy comes to an average vitrification cost per ton of US$ 35.80. However, a complete economic analysis on the cost of vitrification should include the full market value of the thermolysis carbon to be vitrified as well as the full market value of the thermolysis gas (2% by weight of carbon) needed for the vitrification process. Generally this brings the cost of vitrification up as high as US$ 58/t. But taking into account money generated by sale of the artificial stone at only half of the price of natural granite (US$ 200/t), the economics of vitrification are still very attractive.

Since thermolysis carbon always has a very positive caloric content, no external source of energy is needed for its vitrification, other than the small amount of thermolysis gas mentioned above. But since purely inert material such as ceramics and stones contains no calories, one must blend in roughly one ton of coal for each ton of inert material. In calculating the amount of vitrified artificial stone produced from each ton of inert material, one should not forget the additional tonnage of vitrified stone generated from the inorganic matter or ash naturally present in the raw coal, which represents approximately 10% of the raw coal weight.

Spreadsheet 1 gives the revenues and expenditures which are used in the various illustrations herein (FIG. 19). The prices of the gas and carbon that appear in these spreadsheets are proportional to their caloric value (B2 & B3). For example, if natural gas of 9300 kcal/kg sells for US$ 150/t (see B3 & B4), then a thermolysis gas of 6200 kcal/kg would sell for US$ 100/t. If coal of 6,100 kcal/kg (see C4 & C5) sells for US$ 45/t, then thermolysis carbon of 2711 kcal/kg sells for US$ 20/t.

Economics of Automobile Recycling

Figure 20:
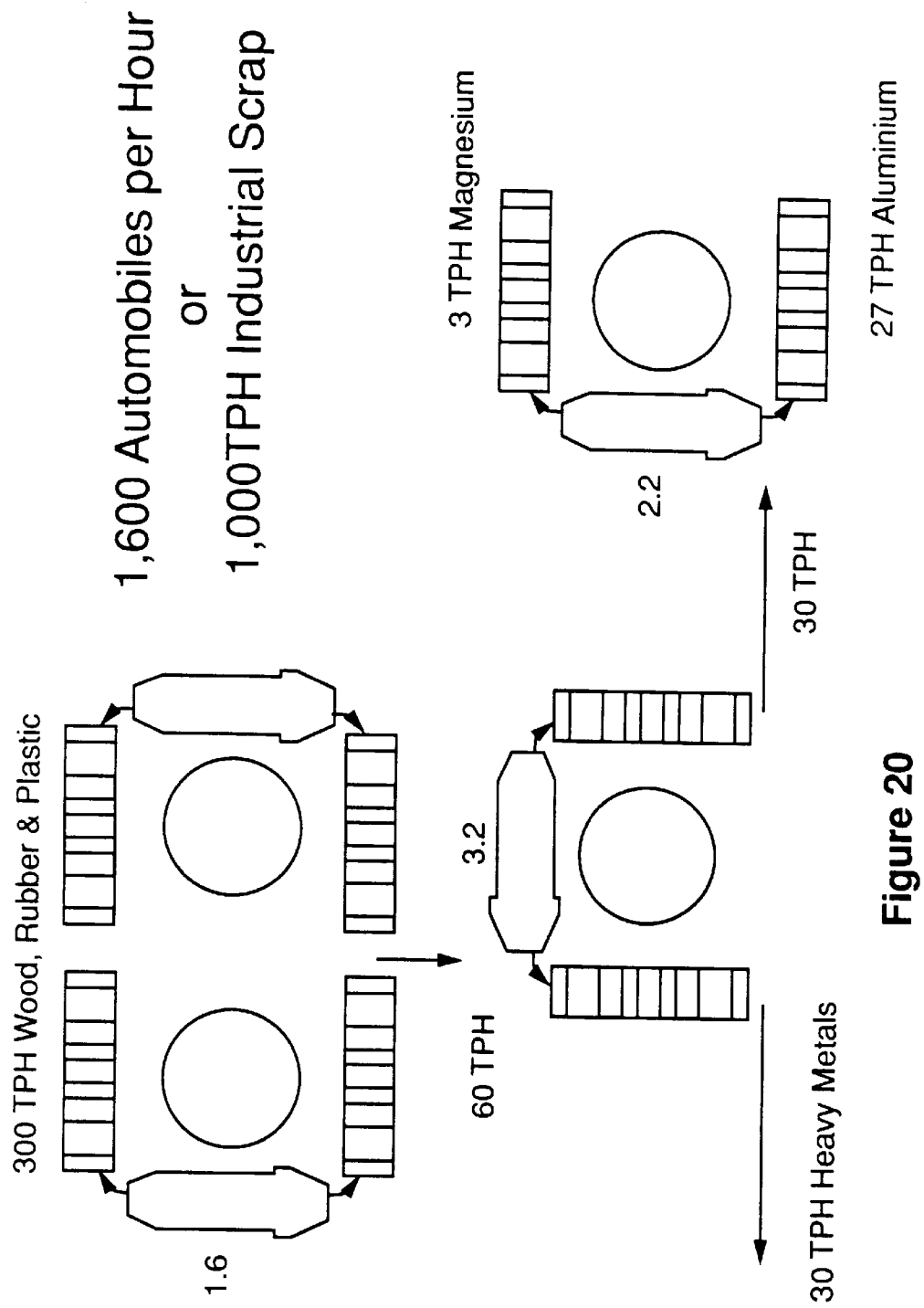
FIG. 20 is a flow diagram of separation vessels and accompanying rinsers used as a basis for illustration of the economics of recycling of automobiles, industrial scrap and municipal waste.
Figure 23:
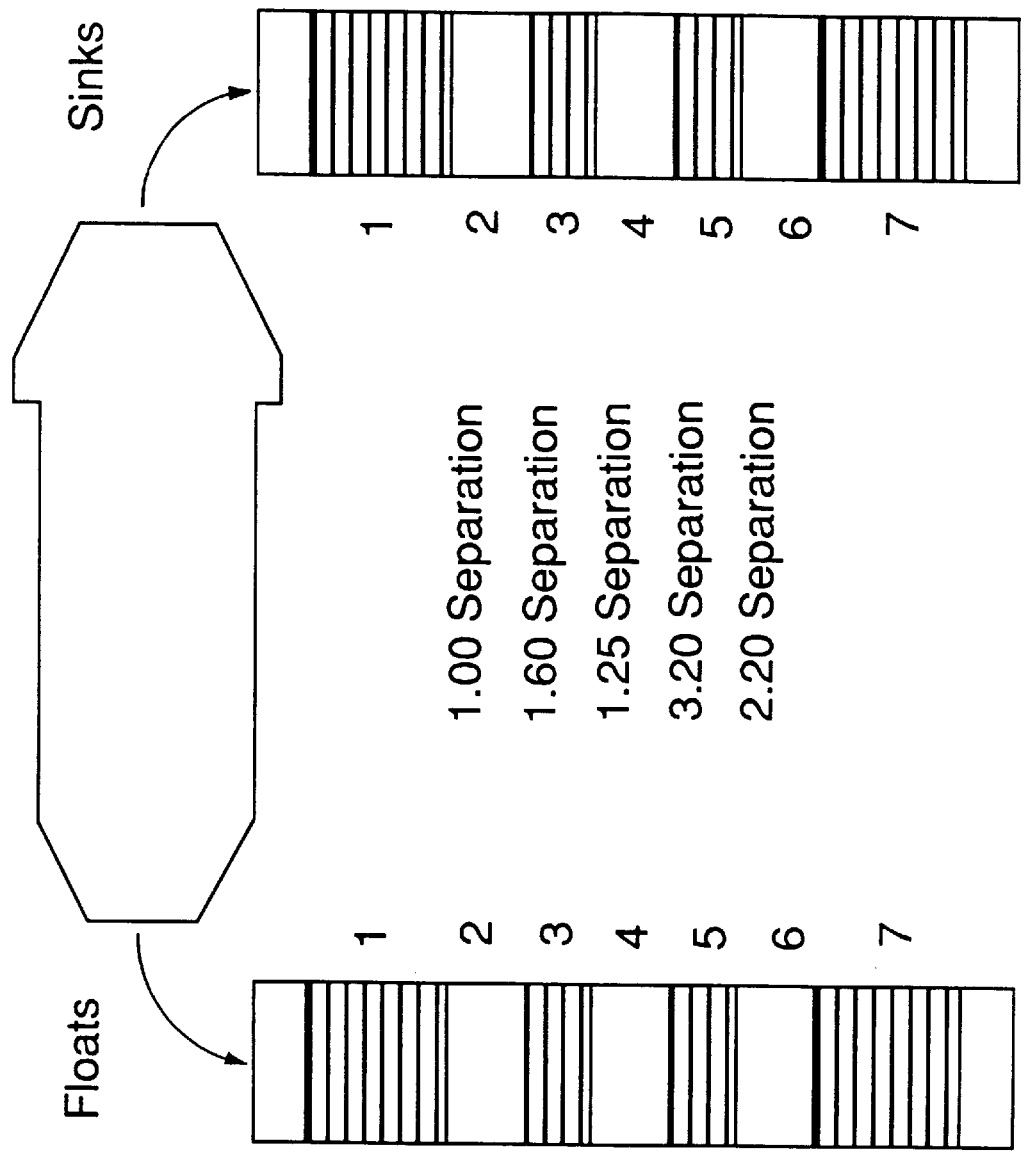
FIG. 23 is a diagrammatic/block diagram of a bidirectional heavy liquid medium separation vessel, arranged in a combination with a scrubber-rinser receiving floats particulates removed from the vessel and with a second scrubber-rinser receiving sinks particulates removed from the vessel, of one embodiment of a process and system of the invention.
Figure 24:
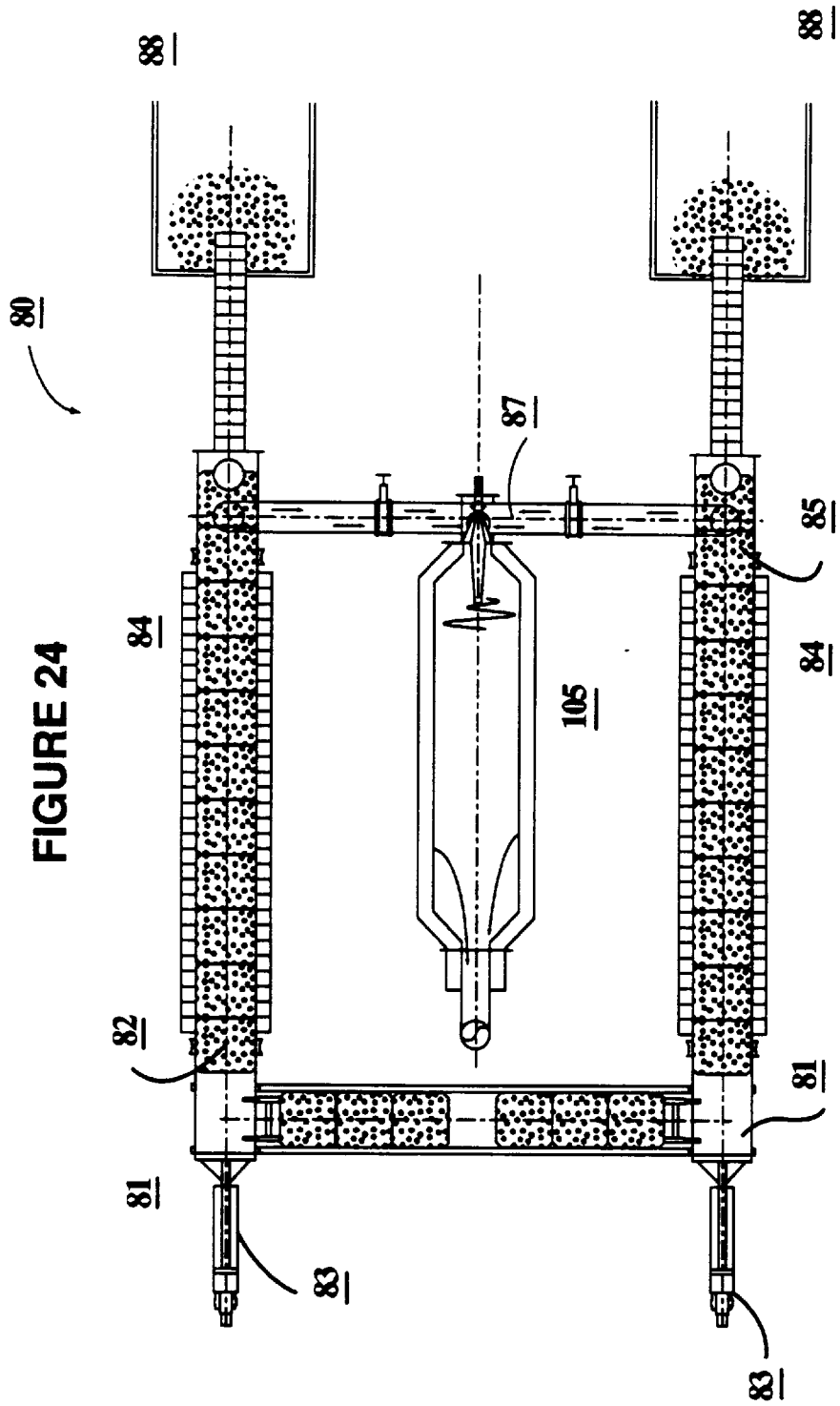
FIG. 24 is a top cross sectional view of one embodiment of the thermolysis oven diagrammatically illustrated in FIG. 18.

The economics of automobile recycling are outlined in Spreadsheet 2 (FIG. 21), generally directed to treatment of ASR, automotive shredder residue which is basically that portion of a recycled automobile remaining after the material useful as feed at a minimill steelmaking operation has been removed. This spreadsheet is based upon a group of heavy liquid medium separation vessels set up in series on a single site. It features two 1.6 separation vessels, one 3.2 separation vessel and one 2.2 separation vessel, arrayed with scrubber-rinsers on each floats and sinks off-stream. (see FIG. 20). Two 1.6 separation vessels are able to concentrate well over 60 ton/h of pure non-ferrous metals. This figure of 60 ton/h also corresponds to the capacity of a single 3.2 separation vessel fed at a fairly normal 1:1 ratio of floats to sinks. A single 2.2 separation vessel can easily handle the floats of a single 3.2 separation vessel.

The large tonnages used in this example are not meant to illustrate an economy of scale necessary for the profitable recycling of automobiles. The full separation cost per ton (E3) used in this spreadsheet have been calculated on the basis of only 130,000 tpy. The large tonnages of this spreadsheet merely illustrate the capacity of a single group of separation vessels of the invention operating at a normal feed capacity. This high capacity is not needed for the recycling of automobiles, since automobile shredder residue comprises less than 2% of the waste presently going to landfill. This figure of 60 ton/h into a single 3.2 separation vessel represents the non-ferrous metal fraction of approximately 1,600 European automobiles per hour or 8,500,000 European automobiles per year.

| Key to Spreadsheet Data | |
|---|---|
| Column B | = the material type |
| Column C | = the tonnage per year of each material type |
| Column D | = the tonnage of thermolysis gas produced per year |
| Column E | = the tonnage of thermolysis gas needed for the thermolysis reaction |
| Column F | = the tonnage of steam produced per year |
| Column G | = the tonnage of thermolysis carbon produced per year |
| Column H | = the tonnage of artificial granite produced per year |
| Column I | = the tonnage per year of all other materials |
| Column J–N | = the unit price in $US per ton |
| Column O–S | = the multiplication of tons per year and the unit price per ton |
| Column T | = the sum of N to R |
| Row 10 | = the total tonnages and revenues |
| C11 | = the tonnage of shredding |
| C12 | = the tonnage to air separation |

-continued

Key to Spreadsheet Data

| | | |
|---|---|---|
| C13 | = | the tonnage to full separation |
| C14 | = | the tonnage of thermolysis |
| C15 | = | the tonnage of gas required for thermolysis |
| C16 | = | the tonnage of gas recovered as steam |
| C17 | = | the tonnage of gas to boiler (the difference between D18 and C15) |
| C18 | = | the tonnage of carbon to vitrification |
| C19 | = | the tonnage of carbon to vitrification |
| C20 | = | the tonnage of gas required for the vitrification of the thermolysis carbon |
| C21 | = | the tonnage of inert material to vitrification (plus the same tonnage in coal) |
| C22 | = | the tonnage of coal needed for the vitrification of the inert material |
| C23 | = | the tonnage of gas needed for the vitrification of inert material |
| K11 | = | the shredding cost per ton |
| K12 | = | the air separation cost per ton |
| K13 | = | the full separation cost per ton |
| K14 | = | the thermolysis cost per ton |
| K15 | = | the cost of gas per ton |
| K16 | = | the boiler cost per ton |
| K17 | = | the cost of gas per ton |
| K18 | = | the cost per ton for vitrification |
| K19 | = | the cost of carbon per ton |
| K20 | = | the cost of gas per ton |
| K21 | = | the cost per ton for the vitrification of the inert material |
| K22 | = | the cost of coal per ton |
| K23 | = | the cost of gas per ton |

With a gross profit of more than US$120 ton (C28), recycling of automobiles is a highly profitable business. (It should also be apparent that no eco-tax must be levied for the recycling of end-of-life vehicles, and no massive redesign of the automobile undertaken.) No extensive and costly disassembly of the vehicle must take place: the battery should be removed, the fuel should be drained, and that is all. Diesel and other fluids may remain within the automobile.

Economics of Recycling of Municipal Solid Waste

Municipal solid waste has much in common with automobile, industrial and commercial waste. All of these waste sources contain ferrous metals (cat.1), light organics (cat. 2), heavy organics (cat. 3), aluminum (cat. 5), heavy metals (cat. 6) and non-metallic inorganics (cat. 7). But in spite of the similarity between municipal solid waste and these other forms of waste, there are noteworthy differences: Municipal (and commercial) solid wastes do not contain the significant quantities of magnesium (cat. 4) normally found in automobile and industrial waste, and automobiles and other forms of industrial waste do not contain any food and garden waste (cat. 8), as is ordinarily associated with residential waste collection. If food and garden waste were not allowed to enter into the domestic refuse bin, then municipal solid waste will recycle as efficiently as automobile and industrial waste, with the same basic configuration of separation equipment, in roughly the same large input tonnages, and all with limited manual intervention.

Food waste represents putrescent organic material of a high moisture content and a low caloric value. The simple disposal of this waste by means of thermolysis is not a viable option, but the large amounts of residual heat generated in the dual processes of thermolysis and vitrification could be utilized. Instead of letting this heat dissipate uselessly into the environment, it may be directed toward an integrated waste management system which would combine the disposal of food waste with the direct and immediate recycling of its valuable nutrients.

Spreadsheet 3 (FIG. 22) outlines the economics of the recycling of typical United States residential waste. This spreadsheet is based upon the percentage distribution of the total amount of residential MSW now generated, including the waste components that are now recycled and the food wastes that are ground up and discharged to a sewer. Spreadsheet 3 is structured in roughly the same manner as Spreadsheet 2 (FIG. 21). Note that garden waste is listed as generating income in four different ways: as a gas, as a carbon, as an artificial stone and as an activated carbon, and that food waste is sterilized and dehydrated.

A particularly efficacious process for the degradation and treatment of food wastes is that disclosed and claimed in U.S. application Ser. No. 08/697,314, filed Aug. 22, 1996, which is incorporated by reference herein, which utilizes fly larvae and produces several product streams and products.

The entire municipal waste stream of a large city in the United States could be processed with a single set of separation equipment of the invention, comprising one 1.6 separation vessel, one 3.2 separation vessel and one 2.2 separation vessel. With a net profit of more than US$ 30 per ton through use of the system and process of the invention, the recycling of municipal solid waste becomes a highly profitable venture.

Municipalities previously caught in the dual trap of dwindling landfill space and strong public opposition to classical incineration, could discharge their obligations by adoption of the system and process of this invention. No extensive hand-sorting after collection would be required. No costly programs of source reduction must be implemented. No original manufacturer would be obliged to introduce a radical re-design of his or her package or product in view of its recyclability. The responsibility for the disposal of waste goods and associated packaging would remain primarily with the solid waste recycled. And all of this can be achieved under the constraint that nothing goes to landfill.

A particularly preferred embodiment of the invention is shown in FIGS. 4A–F. To illustrate the relative through-puts possible with the system and process, an assumed feed of heterogenous material of about 160 tons per hour is set in the following description, and the various streams and component flows calculated on the basis of that feed rate. (These calculated flows are based on experimental and commercial trials and use of various individual components of the overall system and process outside of the United States, which uses have all been performed under confidentiality agreements mandating non-disclosure of systems and process used to anyone other than the inventor, and which does not constitute prior art to this application).

1. Feeding and Screening

ARS or non-ferrous shredder residue (160 TPH [Tons Per Hour"]) is loaded into a raw material feeder (200); and drops onto a split device (201) to distribute the material onto two accordion screen feed conveyors (202 & 203) and, in turn, to two accordion screens (204 & 205), which screen at a 10 mm aperture. From both screens, the fraction "<10 mm" (48 TPH) drops onto 10 mm collecting conveyor (206 & 206*a*) onto the bi-directional 10 mm transfer conveyor (207), and, in turn, onto the 10 mm radical stacker (208). This stockpile (<10 mm feed) 208*a* may be taken as a finished product from the system and process.

The fraction ">10 mm" from both accordion screens (204 & 205) (112 TPH) drops onto the "10 mm" collecting conveyor (209) and, in turn, drops onto the trommelscreen feed conveyor (210) The trommelscreen (211) fed by conveyor 210 screens at a 150 mm aperture.

The fraction "10/150 mm" (112 TPH) is collected by the 10/150 mm collecting conveyor (212), and fed onto the 1.0 feed conveyor (213) to the first separation vessel the 1.0 separator (214).

Above the 1.0 feed conveyor (213) there is a magnetic take off (214) which drops any ferrous material into a bin (ferrous 1.0 feed 214a). The fraction ">150 mm" (1 TPH) drops into a bin 215 (>150 mm feed). This fraction is later re-shredded and reintroduced to the process.

An alternate technique to assist in the creation of waste-derived particulate separation media is provided by the FIG. 4 system. One may effect a loading from the "<10 mm" fraction, into the raw material feeder (200). The bi-directional "10 mm" transfer conveyor (207) may be turned in another direction, to feed onto the fines feed conveyor (216), in turn onto the trommelscreen feed conveyor (210), then through the trommelscreen (211) and over the "10/150 mm" collecting conveyor (212) onto the 1.0 feed conveyor (213), finally to the first separation vessel, the 1.0 separator (214b).

This "<10 mm" fraction creates:
a lot of "1.7 medium" in the 1.7 medium tank (239);
some "1.0 floats" into the light organic press (222);
some "1.25 floats" and "1.25 sinks"; and
some "fluff" and "coarse sand."

2. The 1.0 Separator

As noted, the fraction "10/150 mm" (112 TPH) from the 1.0 feedconveyor (213) drops into the injector 214c of the 1.0 heavy liquid medium separation vessel (214b); which isolates the light organic material consisting mainly of foam rubber, wood and textiles, from the rest of the heterogeneous feed material.

In the 1.0 dense medium separator (214), medium is supplied from the 1.0 medium pump (217): approximately 100 m³/hr into the barrel on the floats side, the rest into the injector; and all water from the 1.0 sump pump (218).

The 1.0 separated floats, constituting a "light organic" stream (40 TPH), report into the 1.0 floats trommelscreen (219), which screens with a 0.5 mm. aperture, for an initial de-watering. On the outside of this trommelscreen, the 1.0 floats spray nozzles (220) prevent the wedge-wire panels from blinding up. This clean water serves as make-up water in the 1.0 separation [providing approx. 10 m³/hour make-up water to circuit].

From trommelscreen (219), the "light organic" floats drop into a Lindemann light organic press (222), for final de-watering. After this press the dry "light organic" fraction, included 15% (46 TPH wet), goes to the light organic conveyor (220), and onto the light organic radial stacker (221). This stockpile (light organic 221a) may be taken as a finished product from the system and process.

The "underflow" of the press (222) reports to the 1.0 sump pump (218). The 1.0 sump pump (218) pumps all of this rinse water into the injector 214a of the 1.0 separator (214).

The 1.0 separated sinks (72 TPH), report into the 1.0 sinks trommelscreen (223), which screens with a 1 mm aperture for de-watering. On the outside of this trommelscreen, the 1.0 sinks spray nozzles (224) prevent the wedge-wire panels from blinding up. [The screen is equipped with panels of 1 mm aperture, to screen out less than 1 mm fines (which drop into autogenous medium cyclone feed tank).

Also, the recycled rinse water from the 1.6 and 1.25 separators (see below) is pumped by the 1.25 sinks secondary rinse water pump (227) into the 1.0 sinks trommelscreen (223), to provide a better passage (sizing) of the <1 mm fines.

The fraction "10/150 mm" of the sinks (67 TPH) drops onto the 1.6 feed conveyor (225), for later processing in the 1.6 separator.

The 1.0 sinks medium tank (226) includes the "<1 mm sinks", and water from the 1.0 separator (214); a bleed from the 1.0 medium pump (217); the 1.0 sinks spray nozzles (224); and the 1.25 sinks secondary rinse water pump (227). It also includes water from 1.6 floats rinse tank (266), and sump pump (400), which in turn contains underflow 322a from the 3.2 magnetic separator (322), and underflow 354a from the 2.2 magnetic separator (354), the underflow of those separators containing waste-derived particulate suspension media.

The 200 mm cyclones feed pump (228) pumps part of this medium with the "<1 mm sinks" to the fines process (see below). The rest overflows with priority with the 1.0 floats medium tank (229), the rest into the Warman cyclones feed tank (230).

The 1.0 floats medium tank (229) includes water from the 1.0 separator (214); the 1.0 floats spray nozzles (220); and part of the overflow from the 1.0 sinks medium tank (226).

The 1.0 medium pump (217) pumps the biggest part of this medium into the 1.0 injector (214a) and, on the floats side, into the barrel (see above).

3. Fines Processing

The "<1 mm sinks" (5.4 TPH/120 m³/hr) are pumped by the autogenous (200 mm) cyclones feed pump (228) to two autogenous medium (200 mm) cyclones (232).

The (vortex) "overflow" of these cyclones flows by gravity onto a vibratory sieve bin (233) which isolate a relatively small quantity of fine organic material, or "fluff" (ITPH). This "fluff" fraction reports to the screw press (234) for further de-watering, which press discharges into a fluff storage bin (235).

The (spigot) "underflow" of these cyclones reports to a high-frequency dewatering screen (236), which isolates "coarse sand" at 25% moisture (1.5 TPH). The screen discharges into a coarse sand storage bin 237, which may be taken as a finished product from the system and process.

The underflow of the vibratory sieve bin (233), the screw press (234), the dewatering screen (236), and part of the overflow from the 1.0 sinks medium tank (226), all drop into the Warman cyclones feed tank (230). The Warman cyclones feed pump (237) pumps all of this rinse water to the Warman cyclones unit (238). The tank (230) has a level control (234), connected to the main clean water pipe, to maintain a constant flow to the cyclones. These cyclones are regulated, by techniques well known to one of ordinary skill in the art, that they give an "underflow" with a specific gravity of 1.6 to 1.7. This "underflow" reports into the 1.7 medium tank (239), holds enough medium to restart the 1.6 or 1.25 separator. The overflow from this 1.7 medium tank (239) runs to the belt press buffertank (240). The "overflow" of cyclones (238) drops onto the clarifier (241).

The clarifier (241) includes water from the "overflow" to the Warman cyclones unit (238), the underflow of the belt press (242), and "floc" from the floc unit (243).

The "overflow" of the clarifier (241) flows into the clean water tank (244) (see below). The "underflow" of the clarifier (241) is pumped by the clarifier extraction pump (245) into the belt press buffertank (240). The clarifier rake torque control (241a) gives an indicator for the operation of the clarifier extraction pump (245), which is on or off according the indicated amperage.

The belt press buffertank (240) includes slurry from the clarifer extraction pump (245) and the overflow from the 1.7 medium tank (239). The belt press buffertank (240) also contains a maximum (240*a*) and a minimum (240*b*) level detection. These level controls give an indication for the speed of the belt press feed pump (246); which is adjustable by frequency regulation.

The belt press feed pump (246) pumps the slurry to the belt press (242). In this pipe, there are a few "floc" injection points. The belt press underflow pump (247) pumps the "underflow" of the belt press back into the clarifier (241). The "filter cake" from the belt press drops onto the filter cake conveyor (248), then into a filter cake bin 249.

The floc unit (243) furnishes the "floc" for the clarifier (241) and the pipe between the belt press feed pump (246) and the belt press (242).

The clean water tank (244) includes water from the "overflow" of the clarifier (246), and fresh make-up water from outside the plant.

4. The 1.6 Separator

The fraction "10/150 mm" of the sinks (67 TPH) from the 1.0 separator (214), collected on the 1.6 feed conveyor (231), drops into the injector (250*a*) of the 1.6 heavy liquid medium separation vessel (250). The 1.6 separator isolates the heavy organic material, consisting mainly of rubber and plastic, from the rest of that part of the heterogenous feed material from the 1.0 separator fed to this vessel.

The 1.6 separator (250) includes medium from the 1.6 floats medium pump (251), with about 10 m$^3$/hr into the drum on the floats side, the rest into the injector (250*a*). The 1.6 sinks medium pump (252) pumps back into the injector and into the separator as "curtain" medium.

The specific gravity in the 1.6 separator (250) is controlled by the 1.6 density meter (253). The density-cylinder hangs in the 1.6 floats medium tank (254), and gives the actual value of the density in the 1.6 separator.

The separated and recovered 1.6 floats (30 TPH at 550 kg/m$^3$) report to the 1.6 floats scrubber-rinser (255), which has one dewatering section for the 1.6 medium, with a 0.5 mm aperture, and one de-watering section for the rinse water, with a 0.5 mm aperture.

On the outside of this scrubber-rinser, the 1.6 floats spray nozzles (255*a*) and (255*b*) prevent the wedge-wire panels from blinding up. The rinse water from the 1.6 floats spray nozzles medium (255*a*) is collected in a trough (255*c*) and transferred to the following scrubbing section of the scrubber-rinser. The rinse water from the 1.6 floats secondary rinse water pump (256) provides flow through the trough.

This "heavy organic" fraction 260 drops onto the heavy organic collecting conveyor (257), which will report onto the heavy organic radial stacker (258) if no further separation is to be done (heavy organic, wet: 35 TPH at 647 kg/m$^3$). The heavy organic fraction (260) normally drops into the 1.25 feeder (259).

The separated and recovered 1.6 inorganic sinks 260*a* (37 TPH at 900 kg/m$^3$) report into the 1.6 sinks scrubber-rinser (260*b*), which has one dewatering sections for the 1.6 medium, with a 1 mm aperture, and three scrubbing and de-watering sections for the rinse water, with a 1 mm aperture.

The 1.6 sinks drop onto the bi-directional 1.6 sinks collecting conveyor (261), which normally discharges into the 3.2 feeder (262). A magnetic take-off (263) separates some free "ferrous" from the 1.6 sinks and drop this "ferrous" into a ferrous 3.2 feed bin 264.

If the 3.2 feeder (262) is filled up or the material does not have to go into the 3.2 & 2.2 separators, then the bi-directional 1.6 sinks collecting conveyor (261) drops the 1.6 sinks into a sinks 1.6 storage bin 265.

If "fines" media are being created, the "<10 mm" sinks from this process also must drop into the sinks 1.6 storage bin.

The 1.6 floats medium tank (254) includes medium from the medium de-watering sections of the 1.6 floats scrubber-rinser (255), and from the 1.7 medium pump (263), as may be directed by the 1.6 density meter (253). There is always a small overflow from the 1.6 floats medium tank (254) into the 1.6 floats rinse tank (266), which is used to control the level in the 1.6 floats medium tank (254).

The 1.6 floats medium pump (251) pumps some medium into the 1.6 separator (250), and a bleed into the 1.6 sinks transfer injector.

The 1.6 sinks medium tank (267) contains, through the 1.6 sinks scrubber-rinser (260*b*), medium from the 1.6 separator (250), and a bleed from the 1.6 floats medium pump (251). The 1.6 sinks medium pump (252) pumps all of this medium into the 1.6 separator (250). No minimum level is maintained in the 1.6 sinks medium tank (267).

The 1.6 floats rinse tank (266) contains rinse water from the 1.6 floats scrubber-rinser (255), and medium overflow from the 1.6 floats medium tank (254). The 1.6 rinse water transfer pump (264) pumps all of this rinse water into the 1.25 sinks rinse tank (270). No minimum level is maintained in the 1.6 floats rinse tank (266).

The 1.6 sinks rinse tank n° 1 (271) contains rinse water from rinse water de-watering section n° 1 of the 1.6 sinks scrubber-rinser (260*b*), and the overflow from the 1.6 sinks rinse tank n° 2 (272). The 1.6 sinks rinse tank n° 1 (271) contains a minimum level control (271*a*), which adds clean water in the scrubbing section n° 3 of the 1.6 sinks scrubber-rinser (260*b*). The 1.6 floats secondary rinse water pump (256) pumps all of this rinse water, though the spray trough, into the scrubbing section n° 1 of the 1.6 floats scrubber-rinser (255).

The 1.6 sinks rinse tank n° 2 (272) contains rinse water from the rinse water de-watering section n° 2 of the 1.6 sinks scrubber-rinser (260*b*). The 1.6 sinks secondary rinse water pump (274) pumps the major part of this rinse water into the scrubbing section n° 1 & 2 of the 1.6 sinks scrubber-rinser (260*b*). The rest overflows into the 1.6 sinks rinse tank n° 1 (271) (see above).

5. The 1.25 Separator

The fraction "10/150 mm" of the floats (dry: 30 TPH at 550 kg/m$^3$) from the 1.6 separator is supplied to the 1.25 feeder (259), which drops onto the 1.25 feed conveyor (275), and in turn, drops into the injector (273) of the 1.25 heavy liquid medium separation vessel (276), which separates the high-chlorine organics from the low-chlorine organics.

The 1.25 separator (276) contains medium from the 1.25 floats medium pump (277), supplied at about 10 m$^3$/hr to the separator on the floats side, the rest into the injector (273), and the 1.25 sinks medium pump (278), which pumps back into the injector and into the drum as "curtain" medium.

The specific gravity in the 1.25 separator (276) is controlled by the 1.25 density meter (279). The density-cylinder hangs in the 1.25 floats medium tank (268), and gives the actual value of the density in the 1.25 separator.

The separated and recovered 1.25 floats 280 (21 TPH at 550 kg/m$^3$) report into the 1.25 floats scrubber-rinser (281), which has one de-watering section for the 1.25 medium, with a 0.5 mm aperture, and one de-watering section for the rinse water, with a 0.5 mm aperture.

On the outside of this scrubber-rinser, the 1.25 floats spray nozzles (282) and (283) prevent the wedge-wire panels from blinding up. The water from the 1.25 floats spray nozzles medium (282) is collected in a trough (284) and transferred to the following scrubbing section of the scrubber-rinser. A bleed from the main clean water pump provides flow through the trough.

This "low-chlorine organics" fraction drops into a floats 1.25 storage bin 285.

The separated and recovered 1.25 sinks 286 (9 TPH at 550 kg/m$^3$) report into the 1.25 sinks scrubber-rinser (287), which has one de-watering section for the 1.25 medium, with a 0.5 mm aperture, and one de-watering section for the rinse water, with a 0.5 mm aperture.

On the outside of this scrubber-rinser, the 1.25 sinks spray nozzles (288) and (289) prevent the wedge-wire panels from blinding up. The water from the 1.25 sinks spray nozzles medium (288) is collected in a trough 290 and transferred to the following scrubbing section in the scrubber-rinser. A bleed from the 1.25 rinse water transfer pump (292) provides flow through the trough.

This "high-chlorine organics" fraction drops into a sinks 1.25 storage bin 291.

The 1.25 floats medium tank (268) contains medium from medium de-watering section of the 1.25 floats scrubber-rinser (281), and from the "1.7 medium" pump (263), as called for by the 1.25 density meter (279).

There is always a small overflow from the 1.25 floats medium tank (268) into the 1.25 floats rinse tank (293), to control the level in the 1.25 floats medium tank (268). The 1.25 floats medium pump (277) pumps this medium into the 1.25 separator (276), and as a bleed into the 1.25 sinks transfer injector.

The 1.25 sinks medium tank (294) through the 1.25 sinks scrubber-rinser (287), includes medium from 1.25 separator (276), and a bleed from the 1.25 floats medium pump (277). The 1.25 sinks medium pump (278) pumps all of this medium into the 1.25 separator (276). There is no minimum level maintained in the 1.25 sinks medium tank (294).

The 1.25 floats rinse tank (293) includes rinse water from the 1.25 floats scrubber-rinser (281), and medium overflow from the 1.25 floats medium tank (279). The 1.25 rinse water transfer pump (292) pumps this rinse water partly through the spray-trough (290), into the scrubbing section of the 1.25 sinks scrubber-rinser (287), with the rest going into the 1.25 sinks rinse tank (270). There is no minimum level maintained in the 1.25 floats rinse tank (293). The 1.25 sinks rinse tank (270) includes rinse water from the de-watering section of the 1.25 sinks scrubber-rinser (287), from the 1.25 rinse water transfer pump (292), and from the 1.6 rinse water transfer pump (269). The 1.25 sinks secondary rinse water pump (227) pumps all of this rinse water into the 1.0 sinks trommelscreen (223).

Each of the 1.0 separator (214), 1.6 separator (250) and 1.25 separator (276) contain a spray bar (295), (276) and (297), respectively. These spray bars spray medium down onto the floats as they approach the floats exit, to dislodge any wire or other sink material that is on top of the floats particles, so that the wire sinks in the liquid medium and reports with the remaining sinks particles.

6. The 3.2 Separator

The separated and recovered sinks (37 TPH) from the 1.6 separator, coming from the 1.6 sinks conveyor drop into the 3.2 feeder (262), and then onto the 3.2 feedconveyor (301).

This conveyor drops into the injector (298) of the 3.2 heavy liquid medium separation vessel (302), which isolates the heavy metals. The density of the medium is controlled by the 3.2 density meter (303), which hangs in the primary 3.2 medium tank (304).

The separated and recovered floats 300 (27 TPH) report into the three-stage 3.2 floats scrubber-rinser (305) from where they are conveyed to the 2.2 separator (307).

The 3.2 primary medium tank (304) contains the 3.2 floats medium and the underflow of the 3.2 separator's 1 m concentration cone (323). The 3.2 primary medium pump unit (304) pumps into the 3.2 separator's injector (298), the 3.2 sinks scrubber-rinser injector (299), and the 3.2 separator's 1 m concentration cone (323).

The separated and recovered sinks "heavy metals" (314) (11 TPH) report into the three-stage 3.2 sinks scrubber-rinser (306) from where they move onto the 3.2 sinks collecting conveyor (308), and are conveyed to an accordian screen (see below).

The secondary 3.2 medium pump unit (311) pumps into 3.2 separator's injector (298).

The rinse water "sinks 1" is pumped by the 3.2 sinks primary rinse water pump unit (312) into the 3.2 floats primary rinse water tank (313). The following rinse waters flow into the 3.2 floats primary rinse water tank; the rinse water "sinks 1", the rinse water "floats 1", and the overflow of the 3.2 separator's 1 m concentration cone (323). All of this rinse water is pumped by the 3.2 floats primary rinse water pump unit (313*a*) into the 3.2 separator's 4 m concentration cone (310).

The rinse water "sinks 2" and "sinks 3" flows into the 3.2 sinks secondary rinse water tank (314). From there it is pumped by the 3.2 sinks secondary rinse water pump unit (315) into the 3.2 sinks scrubber-rinser (306 as rinse water "sinks 1" and "sinks 2".

The rinse water "floats 2" and "floats 3" flows into the 3.2 floats secondary rinse water tank (316). From there it's pumped by the 3.2 floats secondary rinse water pump unit (317) into the 3.2 floats scrubber-rinser (305) as rinse water "floats 1" and "floats 2".

The dirty rinse water is pumped by the 3.2 floats primary rinse water pump (313*a*), through the 3.2 rinse water magnetising coil (318), into the 3.2 separator's 4 m concentration cone (310). The overflow of the 3.2 separator's 4 m concentration cone (310) flows into the 3.2 secondary rinse water tank (319). The 3.2 secondary clean water pump unit (320) pumps this water back as "sinks 3" and "floats 3" to 3.2 floats scrubber rinser (305).

The concentrated magnetic pulp at the bottom of the 3.2 separator's 4 m concentration cone (310) is pumped by the 3.2 separator's 4 m cone extraction pump unit (321) into the 3.2 magnetic separator (322). The underflow of the 3.2 magnetic separator flows into the 3.2 & 2.2 rinse water collecting tank. The magnetic pulp of the separator drops into the 3.2 separator's 1 m concentration cone (323). Also the bleed from the 3.2 primary medium pump unit (309) flows through the 3.2 medium magnetising coil (324), into the 3.2 separator's 1 m concentration cone (323).

The overflow (325) of the 3.2 separator's concentration cone (323) flows into the 3.2 floats primary rinse water tank (313). The concentrated magnetic pulp at the bottom of the 3.2 separator's 1 m concentration cone (323) flows through the 3.2 demagnetising coil (326) back into the 3.2 primary medium tank (304).

The sinks from 3.2 sinks scrubber-rinser (306) then report to an accordion screen which delivers five sized products:

a. The >30 mm material falls into a first heavy metal storage bin, and may be removed from the system and process as a finished product.

b. The 30–12 mm material falls into a second heavy metals storage bin, and may be removed from the system and process as a finished product.

c. The 12–8 mm material falls into a third heavy metal-sstorage bin, and may be removed from the system and process as a finished product.

d. The 8–4 mm material falls into a fourth heavy metals storage bin, and may be removed from the system and process as a finished product.

e. The <4 mm material falls into a fifth heavy metals storage bin, and may be removed from the system and process as a finished product.

7. The 2.2 Separator

The separated and recovered floats (327) (27 TPH) from the 3.2 separator (304), coming from the 3.2 floats scrubber-rinser (305) drop onto the 2.2 feedconveyor (328). This conveyor in turn drops into the injector (332) of the 2.2 heavy liquid medium separation vessel (307) which separates magnesium from the aluminum. The density of the medium is controlled by the 2.2 density meter (329), which hangs in the 2.2 primary medium tank (330).

The separated and recovered floats "Magnesium concentrate" (331) (2 TPH) report into the three-stage 2.2 floats scrubber-rinser (332). This scrubber-rinser has a 30 mm trommelscreen extension (333). The <30 mm Mg-concentrate drops from the trommelscreen into a 1st 30 MG-concentrate storage bin (2.2 Mg<30, 334). The >30 mm MG-concentrate drops from the trommelscreen into a 2d 30 Mg-concentrate storage bin (2.2 Mg>30, 335).

The 2.2 primary medium tank (330) contains the 2.2 floats medium, and the underflow of the 2.2 separator's 1 m concentration cone (336). The 2.2 primary medium pump unit (337) pumps into the 2.2 separator injector (332), the 2.2 sinks scrubber-rinser (338)'s injector (338a), and the 2.2 separator's 1 m concentration cone (336).

The separated and recovered sinks "Al-concentrate" (339) (25 TPH) report into the three-stage 2.2 sinks scrubber-rinser (338), from where it drops into the Al-concentrate storage bin (2.2A1, 340).

The secondary 2.2 medium pump unit (341) pumps into 2.2 separator injector (332).

The rinse water "sinks 1" is pumped by the 2.2 sinks primary rinse water pump unit (342) into the floats primary rinse water tank (343). The following rinse waters flow into the 2.2 floats primary rinse water tank (343): the rinse water "sinks 1", the rinse water "floats 1", and the overflow of the 2.2 separator's 1 m concentration cone (336).

All of this rinse water is pumped by the 2.2 floats primary rinse pump unit (345) into the 2.2 separator's 4 m concentration cone (344).

The rinse water "sinks 2" and "sinks 3" flows into the 2.2 sinks secondary rinse water tank (346). From there it's pumped by the 2.2 sinks secondary rinse water pump unit (347) into the 2.2 sinks scrubber-rinser (332) as rinse water "sinks 1" and "sinks 2" The rinse water "floats 2" and "floats 3" flows into the 2.2 floats secondary rinse water tank (346). From there it's pumped by the 2.2 floats secondary rinse water pump unit (347) into the 2.2 floats scrubber-rinser (332) as rinse water "floats 1" and "floats 2"

The dirty rinse water is pumped by the 2.2 floats primary rinse water pump unit (345), through the 2.2 rinse water magnetising coil (350), into the 2.2 separator's 4 m concentration cone (344).

The overflow of the 2.2 separator's 4 m concentration cone (344) flows into the 2.2 secondary rinse water tank (351). The 2.2 secondary clean water pump unit (352) pumps this water back as "sinks 3" and "floats 3."

The concentrated magnetic pulp at the underflow of the 2.2 separator's 4 m concentration cone (344) is pumped by the 2.2 separator's 4 m cone extraction pump unit (353) into the 2.2 separator's magnetic separator (354). The underflow of the 2.2 magnetic separator flows into the 3.2 & 2.2 rinse water collecting tank.

The magnetic pulp drops into the 2.2 separator's 1 m concentration cone (336), while the bleed from the 2.2 primary medium pump (337) flows through the 2.2 medium magnetising coil (355), into the 2.2 separator's 1 m concentration cone (336). The overflow of the 2.2 separator's 1 m concentration cone (336) flows into the floats primary rinse water tank (343).

The concentrated magnetic pulp at the bottom of the 2.2 separator's 1 m concentration cone (336) flows through the 2.2 demagnetising coil (356) back into the 2.2 primary medium tank (330).

Clean water coming from the main clean water pump is pumped into the 2.2 separator's 4 m concentration cone (344).

The scrubber rinsers preferably include a trough means to prevent rinse water from diluting the liquid medium As shown in FIG. 4, scrubber rinsers (255), (281), (287), (305), (306), (338), and (332), each have the trough means (255c), (284), (290 ), (305a), (349), (348), and (338), respectively.

8. The Processing of the Magnesium Concentrate

The >30 mm magnesium concentrate from the 2.2 separator is loaded into a vibratory feeder, then reports to a picking table where hand-sorting takes place.

Any laminated aluminum from the picking table reports to an aluminum storage bin and is transported from the site as a finished product. The magnesium from the picking table reports to a magnesium storage bin and may be separated from the system and process as a finished product.

All remaining material contaminated with organics report to an organic storage bin; this material is later re-shredded and reintroduced to the process.

9. The Processing of the Aluminum Concentrate

The aluminum concentrate (340) from the 2.2 separator is loaded into vibratory feeder (358), then is conveyed to an accordion screen (359) making a particle size separation at 30 mm. The overflow of this accordion screen is conveyed directly to an eddy current separator (360), while the underflow of this accordion screen drops into a bi-directional conveyor belt (361). In the processing of the >30 mm concentrate, this conveyor belt discharges in the direction of an aluminum concentrate storage bin. The <30 mm concentrate is later reloaded into the vibratory feeder used to process stones and insulated copper wire (see below). In the off-line re-processing of the <30 mm concentrate, this conveyor belt discharges in the direction of the aluminum eddy current separator (see below), and thereby serves as a by-pass.

The separated aluminum from the eddy current separator is conveyed to a magnetic separator (362). The ferrous concentrate reports to a ferrous concentrate storage bin (357).

The aluminum fraction from the magnetic separator reports to a thermal dryer (363). The dry aluminum drops into an aluminum storage bin (364), and may be separated from the system and process as a finished product.

10. The Processing of Stones and Copper Wires

The reject of the eddy current separator (360), consisting of stones and insulated copper wires, is loaded into another vibratory feeder (365), and then is conveyed to a second eddy current separator (366).

The separated aluminum from this second eddy current separator (366) drops into a second aluminum storage bin (367).

The reject of this second-stage eddy current separator drops onto an inclined conveyor belt (368) which removes large stones. These large stones report to a storage bin (369) and are later transported from the site as a finished product.

The remainder of the feed then reports to a trommelscreen separating at 60 mm (370). The overflow of the trommelscreen reports a second storage bin (371), and may be separated from the system and process as a finished product. The underflow of the trommelscreen (372) reports to an impact crusher (373). The output of the impact crusher then reports to a two-stage accordion screen (374) making a particle size separation at 15 mm and 5 mm The >15 mm material from the accordion screen consists of copper wires which report to a copper wire storage bin (375). These insulated copper wires may be separated from the system and process as a finished product. The 5–15 mm material from the accordion screen consists of a middling material which reports to a middling storage bin (376). The <5 mm material consists of a coarse sand which reports to a third storage bin (377). This coarse sand may be separated from the system and process as a finished product.

While the invention has been described in connection with certain preferred and particularly preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

I claim:

1. A separation process for continuously separating a heterogeneous mixture of particulate solids, said solids having a plurality of different specific gravities, using a plurality of liquid media of different specific gravity, said heterogeneous mixture being separated into a plurality of fractions, each of different specific gravity, said process comprising:

(a) a first separation stage, further comprising introducing said heterogeneous mixture into a first separation vessel, containing a first liquid medium having a first specific gravity of about 1.0, such that said heterogeneous mixture contacts said first liquid medium, a first part of said mixture rising in the liquid medium as float particles, the remaining part settling in the liquid medium as sink particles, whereby porous materials present in said heterogeneous mixture having a specific gravity of less than about 1.0 are substantially separated as said float particles;

(b) removing said float particles from said first vessel, to recover a porous product material;

(c) removing said sink particles from said first vessel;

(d) classifying a portion of said sink particles to isolate a waste-derived solid particulate suspension media fraction comprising substantially no organic material or clay;

(e) a second separation stage, further comprising introducing the portion of said sink material removed from said first separation vessel and not classified, into a second separation vessel containing a second liquid medium having a second specific gravity, different from the specific gravity of said first liquid medium, said liquid medium including a waste-derived particulate suspension media component present in a quantity sufficient to attain said second specific gravity, such that said remaining sink particles contact said second liquid medium, a first part of said particles rising in the liquid to form float particles, the remaining part settling in the liquid medium as sink particles, whereby organic materials present in said remaining sink particles fraction from said first separation stage are substantially separated as float particles;

(f) removing said organic float particles from said second vessel as a substantially organic particulate mixture;

(g) removing said sink particles from said second vessel as a substantially inorganic particulate mixture;

(h) recovering and recycling said waste-derived particulate suspension media component into said second separation stage;

(i) performing at least one additional separation upon said substantially organic particulate mixture, comprising a third separation stage using a third separation vessel containing a third liquid medium having a third specific gravity, different from the specific gravity of each of said first and second liquid mediums, said liquid medium including a waste-derived particulate suspension media component present in a quantity sufficient to attain said third specific gravity, to obtain at least one organic product material; and (j) performing at least one additional separation upon said substantially inorganic particulate mixture, comprising a fourth separation stage using a fourth separation vessel containing a fourth liquid medium having a fourth specific gravity, different from the specific gravity of each of said first, second and third liquid mediums, said liquid medium including a non waste-derived particulate suspension media component present in a quantity sufficient to attain said fourth specific gravity, to obtain at least one inorganic product material.

2. The process of claim 1 wherein the second liquid medium has a specific gravity of about 1.6.

3. The process of claim 2 wherein the third liquid medium has a specific gravity of about 1.25.

4. The process of claim 3 wherein the fourth liquid medium has a specific gravity of about 3.2.

5. The process of claim 1 wherein said fourth separation stage includes contact of said substantially inorganic particulate mixture with said fourth liquid medium, a first part of said inorganic particulate mixture rising in the liquid to form float particles, the remaining part settling in the liquid medium as sink particles, whereby a first inorganic materials fraction present in said inorganic particulate mixture from said fourth separation stage is substantially separated as float particles from said particulate mixture, comprising the further steps of (k) removing said first inorganic materials fraction from said fourth vessel as a substantially inorganic particulate mixture;

(l) removing as a second inorganic materials fraction said sink particles from said fourth vessel, as a substantially inorganic particulate mixture;

(m) performing at least one additional separation upon said first inorganic materials particulate mixture fraction, comprising a fifth separation stage using a fifth separation vessel containing a fifth liquid medium having a fifth specific gravity, different from the specific gravity of each of said first, second, third and fourth liquid mediums, said liquid medium including a non waste-derived particulate suspension media component present in a quantity sufficient to attain said specific gravity, to obtain at least one further inorganic product material.

6. The process of claim 5 wherein the fifth liquid medium has a specific gravity of about 2.2.

7. The process of claim 1 wherein the waste-derived particulate suspension media component in said third liquid medium is recovered and recycled.

8. The process of claim 1 wherein the non waste-derived particulate suspension media component in said fourth liquid medium is recovered and recycled.

9. The process of claim 5 wherein the non waste-derived particulate suspension media component in said fifth liquid medium is recovered and recycled.

10. The process of claims 1, 5, 6, 7, 8, or 9 wherein the non waste-derived particulate suspension media component is selected from the group consisting of ferrosilicon, magnetite and mixtures thereof.

11. The process of claim 4 wherein the non-waste derived particulate suspension media component is ferrosilicon.

12. The process of claim 6 wherein the non-waste derived particulate suspension media component is ferrosilicon.

13. The process of claim 1 wherein said float particles from said first vessel are dewatered.

14. The process of claim 1 wherein said substantially organic particulate mixture from said second vessel is rinsed to recover said waste-derived particulate suspension media component, prior to performing said additional separation thereon.

15. The process of claim 1 wherein said substantially inorganic particulate mixture from said second vessel is rinsed to recover said waste-derived particulate suspension media component, prior to performing said additional separation thereon.

16. The process of claim 5 wherein said first inorganic materials particulate mixture fraction from said fourth vessel is rinsed to recover said non waste-derived particulate suspension media component, prior to performing said additional separation thereon.

17. The process of claim 5 wherein said further inorganic product material from said fifth vessel is rinsed to recover said non waste-derived particulate suspension media component.

18. The process of claims 14, 15, 16 or 17 wherein said rinsing is performed in a scrubber-rinser vessel.

19. The process of claim 1 wherein each of said first, second, third and fourth separation vessels are bi-directional heavy liquid medium separators.

20. The process of claim 5 wherein each of said first, second, third, fourth and fifth separation vessels are bi-directional heavy liquid medium separators.

21. A separation process for continuously separating a heterogeneous mixture of particulate solids, said solids having a plurality of different specific gravities, using a plurality of liquid media of different specific gravity, said heterogeneous mixture being separated into a plurality of fractions, each of different specific gravity, said process comprising:

(a) a first separation stage, further comprising introducing said heterogeneous mixture into a first separation vessel, containing a first liquid medium having a first specific gravity of about 1.0, such that said heterogeneous mixture contacts said first liquid medium, a first part of said mixture rising in the liquid medium as float particles, the remaining part settling in the liquid medium as sink particles, whereby porous materials present in said heterogeneous mixture having a specific gravity of less than about 1.0 are substantially separated as said float particles;

(b) removing said float particles from said first vessel, to recover a porous product material;

(c) removing said sink particles from said first vessel;

(d) classifying a portion of said sink particles to isolate a waste-derived solid particulate suspension media fraction comprising substantially no organic material or clay;

(e) a second separation stage, further comprising introducing the portion of said sink material removed from said first separation vessel and not classified, into a second separation vessel, containing a second liquid medium having a second specific gravity, different from the specific gravity of said first liquid medium, said liquid medium including a waste-derived particulate suspension media component present in a quantity sufficient to attain said second specific gravity, such that said remaining sink particles contact said second liquid medium, a first part of said particles rising in the liquid to form float particles, the remaining part settling in the liquid medium as sink particles, whereby organic materials present in said remaining sink particles fraction from said first separation stage are substantially separated as float particles;

(f) removing said organic float particles from said second vessel as a substantially organic particulate mixture; and (g) removing said sink particles from said second vessel as a substantially inorganic particulate mixture.

22. The process of claim 21 wherein the second liquid medium has a specific gravity of about 1.6.

23. The process of claim 21 wherein said waste-derived particulate suspension media component is recovered and recycled into said second separation stage.

24. The process of claims 1 or 5 wherein said heterogeneous mixture of particulate solids comprises a shredded or size reduced solid waste or waste stream.

25. The process of claims 1 or 5 wherein said heterogeneous mixture of particulate solids comprises automobile shredder residue.

26. The process of claims 1 or 5 wherein said heterogeneous mixture of particulate solids comprises compacted, shredded or size-reduced municipal waste.

27. The process of claims 1 or 5 wherein said heterogeneous mixture of particulate solids comprises compacted, shredded or size-reduced construction/demolition waste.

28. A separation process for continuously separating a heterogeneous mixture of particulate solids, said solids having a plurality of different specific gravities, using a plurality of liquid media of different specific gravity, said heterogeneous mixture being separated into a plurality of fractions, each of different specific gravity, said process comprising:

(a) a first separation stage, further comprising introducing said heterogeneous mixture into a first separation vessel, containing a first liquid medium having a first specific gravity of about 1.0, such that said heterogeneous mixture contacts said first liquid medium, a first part of said mixture rising in the liquid medium as float particles, the remaining part settling in the liquid medium as sink particles, whereby porous materials present in said heterogeneous mixture having a specific gravity of less than about 1.0 are substantially separated as said float particles;

(b) removing said float particles from said first vessel, to recover a porous product material;

(c) removing said sink particles from said first vessel;

(d) a second separation stage, further comprising introducing said sink particles from said first separation vessel into a second separation vessel, containing a second liquid medium having a second specific gravity, different from the specific gravity of said first liquid medium, said liquid medium including a waste-derived particulate suspension media component present in a quantity sufficient to attain said second specific gravity, such that said sink particles contact said second liquid medium, a first part of said particles rising in the liquid to form float particles, the remaining part settling in the liquid medium as sink particles, whereby organic materials present in said sink particles from said first separation stage are substantially separated as float particles;

(e) removing said organic float particles from said second vessel as a substantially organic particulate mixture; and (f) removing said sink particles from said second vessel as a substantially inorganic particulate mixture.

29. The process of claim 28 wherein the second liquid medium has a specific gravity of about 1.6.

30. The process of claim 28 wherein said waste-derived particulate suspension media component is recovered and recycled into said second separation stage.

31. A separation process for continuously separating a heterogeneous mixture of particulate solids, said solids having a plurality of different specific gravities, using a plurality of liquid media of different specific gravity, said heterogeneous mixture being separated into a plurality of fractions, each of different specific gravity, said process comprising:

(a) a first separation stage, further comprising introducing said heterogeneous mixture into a first separation vessel, containing a first liquid medium having a first specific gravity of about 1.0, such that said heterogeneous mixture contacts said first liquid medium, a first part of said mixture rising in the liquid medium as float particles, the remaining part settling in the liquid medium as sink particles, whereby porous materials present in said heterogeneous mixture having a specific gravity of less than about 1.0 are substantially separated as said float particles;

(b) removing said float particles from said first vessel, to recover a porous product material;

(c) removing said sink particles from said first vessel;

(d) a second separation stage, further comprising introducing said sink particles from said first separation vessel into a second separation vessel, containing a second liquid medium having a second specific gravity, different from the specific gravity of said first liquid medium, said liquid medium including a waste-derived particulate suspension media component present in a quantity sufficient to attain said second specific gravity, such that said sink particles contact said second liquid medium, a first part of said particles rising in the liquid to form float particles, the remaining part settling in the liquid medium as sink particles, whereby organic materials present in said sink particles from said first separation stage are substantially separated as float particles;

(e) removing said organic float particles from said second vessel as a substantially organic particulate mixture;

(f) removing said sink particles from said second vessel as a substantially inorganic particulate mixture;

(g) recovering and recycling said waste-derived particulate suspension media component into said second separation stage;

(h) performing at least one additional separation upon said substantially organic particulate mixture, comprising a third separation stage using a third separation vessel containing a third liquid medium having a third specific gravity, different from the specific gravity of each of said first and second liquid mediums, said liquid medium including a waste-derived particulate suspension media component present in a quantity sufficient to attain said third specific gravity, to obtain at least one organic product material; and (i) performing at least one additional separation upon said substantially inorganic particulate mixture, comprising a fourth separation stage using a fourth separation vessel containing a fourth liquid medium having a fourth specific gravity, different from the specific gravity of each of said first, second and third liquid mediums, said liquid medium including a non waste-derived particulate suspension media component present in a quantity sufficient to attain said fourth specific gravity, to obtain at least one inorganic product material.

32. The process of claim 31 wherein the second liquid medium has a specific gravity of about 1.6.

33. The process of claim 32 wherein the third liquid medium has a specific gravity of about 1.25.

34. The process of claim 32 wherein the fourth liquid medium has a specific gravity of about 3.2.

35. The process of claim 31 wherein said fourth separation stage includes contact of said substantially inorganic particulate mixture with said fourth liquid medium, a first part of said inorganic particulate mixture rising in the liquid to form float particles, the remaining part settling in the liquid medium as sink particles, whereby a first inorganic materials fraction present in said inorganic particulate mixture from said fourth separation stage is substantially separated as float particles from said particulate mixture, comprising the further steps of (j) removing said first inorganic materials fraction from said fourth vessel as a substantially inorganic particulate mixture;

(k) removing as a second inorganic materials fraction said sink particles from said fourth vessel, as a substantially inorganic particulate mixture;

(l) performing at least one additional separation upon said first inorganic materials particulate mixture fraction, comprising a fifth separation stage using a fifth separation vessel containing a fifth liquid medium having a fifth specific gravity, different from the specific gravity of each of said first, second, third and fourth liquid mediums, said liquid medium including a non waste-derived particulate suspension media component present in a quantity sufficient to attain said specific gravity, to obtain at least one further inorganic product material.

36. The process of claim 35 wherein the fifth liquid medium has a specific gravity of about 2.2.

37. The process of claim 31 wherein the waste-derived particulate suspension media component in said third liquid medium is recovered and recycled.

38. The process of claim 31 wherein the non waste-derived particulate suspension media component in said fourth liquid medium is recovered and recycled.

39. The process of claim 35 wherein the non waste-derived particulate suspension media component in said fifth liquid medium is recovered and recycled.

40. The process of claims 31, 35, 36, 37, 38, or 39 wherein the non waste-derived particulate suspension media component is selected from the group consisting of ferrosilicon, magnetite and mixtures thereof.

41. The process of claim 34 wherein the non-waste derived particulate suspension media component is ferrosilicon.

42. The process of claim 36 wherein the non-waste derived particulate suspension media component is ferrosilicon.

43. The process of claim 31 wherein said float particles from said first vessel are dewatered.

44. The process of claim 31 wherein said substantially organic particulate mixture from said second vessel is rinsed to recover said waste-derived particulate suspension media component, prior to performing said additional separation thereon.

45. The process of claim 32 wherein said substantially inorganic particulate mixture from said second vessel is rinsed to recover said waste-derived particulate suspension media component, prior to performing said additional separation thereon.

46. The process of claim 35 wherein said first inorganic materials particulate mixture fraction from said fourth vessel is rinsed to recover said non waste-derived particulate suspension media component, prior to performing said additional separation thereon.

47. The process of claim 35 wherein said further inorganic product material from said fifth vessel is rinsed to recover said non waste-derived particulate suspension media component.

48. The process of claims 44, 45, 46 or 47 wherein said rinsing is performed in a scrubber-rinser vessel.

49. The process of claim 31 wherein each of said first, second, third and fourth separation vessels are bi-directional heavy liquid medium separators.

50. The process of claim 35 wherein each of said first, second, third, fourth and fifth separation vessels are bi-directional heavy liquid medium separators.

51. The process of claims 28, 31 or 35 wherein said heterogeneous mixture of particulate solids comprises a shredded or size reduced solid waste or waste stream.

52. The process of claims 28, 31 or 35 wherein said heterogeneous mixture of particulate solids comprises automobile shredder residue.

53. The process of claims 28, 31 or 35 wherein said heterogeneous mixture of particulate solids comprises compacted, shredded or size-reduced municipal waste.

54. The process of claims 28, 31 or 35 wherein said heterogeneous mixture of particulate solids comprises compacted, shredded or size-reduced construction/demolition waste.

55. A system for continuously separating a heterogeneous mixture of particulate solids having a plurality of different specific gravities, into a plurality of fractions, each of a different specific gravity, using a plurality of liquid media of different specific gravity, comprising:

a first separation vessel for receiving said heterogeneous mixture, containing a first liquid medium having a first specific gravity of about 1.0, which medium contacts said heterogeneous mixture, for causing a first part of said mixture to rise in the liquid medium as float particles, and the remaining part to settle in the liquid medium as sink particles, said vessel including means to remove said separated float particles without intermixture with said sink particles and means to remove said separated sink particles without intermixture with said float particles;

a classifier for separation of waste-derived particulate suspension media from a portion of the sink particles removed from said first separation vessel, said media comprising substantially no organic material or clay, and a second separation vessel for receiving the portion of said sink material removed from said first separation vessel and not processed through said classifier, containing a second liquid medium having a second specific gravity different from the specific gravity of said first liquid medium, said second liquid medium including a waste-derived particulate suspension media component present in a quantity sufficient to attain said second specific gravity, which second medium contacts said residue sink material, for causing a first part of said material to rise in the liquid medium as float particles, and the remaining part to settle in the liquid medium as sink particles, said vessel including means to remove said separated float particles without intermixture with said sink particles, as a substantially organic particulate mixture, and means to remove said separated sink particles without intermixture with said float particles, as a substantially inorganic particulate mixture.

56. The system of claim 55 further comprising a first rinser for removing and recovering said waste-derived particulate suspension media component from the substantially organic particulate mixture from the second separation vessel; and a second rinser for removing and recovering said waste-derived particulate suspension media component from the substantially inorganic particle mixture from the second separation vessel.

57. The system of claims 55 or 56 further comprising means for recycling said recovered waste-derived particulate suspension media component into said second separation vessel.

58. The system of claims 55 or 56 further comprising a third separation vessel for receiving said substantially organic particulate mixture from said second separation vessel containing a third liquid medium having a specific gravity different from the specific gravity of each of said first and second liquid mediums, said third liquid medium including a waste-derived particulate suspension media component present in a quantity sufficient to attain said third specific gravity, which third medium contacts said substantially organic particulate mixture, for causing a first part of said mixture to rise in the liquid medium as float particles, and the remaining part to settle in the liquid medium as sink particles, said vessel including means to remove said separated float particles without intermixture with said sink particles, as first organic materials, and means to remove said separated sink particles without intermixture with said float particles, as second organic materials, and a fourth separation vessel for receiving said substantially inorganic particulate mixture from said second separation vessel, containing a fourth liquid medium having a specific gravity different from the specific gravity of each of said first, second and third liquid mediums, said fourth liquid medium including a non waste-derived particulate suspension media component present in a quantity sufficient to attain said fourth specific gravity, which fourth medium contacts said substantially inorganic particulate mixture, for causing a first part of said mixture to rise in the liquid medium as float particles, and the remaining part to settle in the liquid medium as sink particles, said vessel including means to remove said separated float particles without intermixture with said sink particles, as first inorganic materials, and means to remove said separated sink particles without intermixture with said float particles, as second inorganic materials.

59. The system of claim 58 further comprising
a first and third rinser for removing and recovering said waste-derived particulate suspension media component from each of the separated substantially organic particulate mixture from the second separation vessel, and from the separated float particles from said third separation vessel, respectively;
a second rinser for removing and recovering said waste-derived particulate suspension media component from the separated substantially inorganic particulate mixture from the second separation vessel;
a fourth rinser for removing and recovering said waste-derived particulate suspension media from the separated sink particles from said third separation vessel; and
a fifth and sixth rinser for removing and recovering said non waste-derived particulate suspension media from each of the first inorganic materials and the second inorganic materials from said fourth separation vessel, respectively.

60. The system of claim 58 further comprising
a fifth separation vessel for receiving said first inorganic materials from said second additional separation vessel, containing a fifth liquid medium having a specific gravity different from the specific gravity of each of the first, second, third and fourth mediums, said fifth liquid medium including a non waste-derived particulate suspension media component present in a quantity sufficient to attain said fifth specific gravity, which fifth medium contacts said first inorganic materials from said second additional vessel, for causing a first part of said materials to rise in the liquid medium as float particles, and the remaining part to settle in the liquid medium as sink particles,
said vessel including means to remove said separated float particles without intermixture with said sink particles, as a third inorganic materials, and means to remove said separated sink particles without intermixture with said float particles, as a fourth inorganic materials.

61. The system of claim 56 wherein each of said rinsers are scrubber-rinser vessels.

62. The system of claim 59 wherein each of said rinsers are scrubber-rinser vessels.

63. The system of claims 55 or 56 wherein each of said separation vessels further include curtain means for preventing float particles from becoming internally intermixed with sink particles, said curtain means being located outside the separation zone in each of said vessels.

64. The system of claim 58 wherein each of said separation vessels further include curtain means for preventing float particles from becoming internally intermixed with sink particles, said curtain means being located outside the separation zone in each of said vessels.

65. The system of claim 59 wherein each of said separation vessels further include curtain means for preventing float particles from becoming internally intermixed with sink particles, said curtain means being located outside the separation zone in each of said vessels.

66. The system of claims 60 or 61 wherein each of said separation vessels farther include curtain means for preventing float particles from becoming internally intermixed with sink particles, said curtain means being located outside the separation zone in each of said vessels.

67. The system of claim 62 wherein each of said separation vessels further include curtain means for preventing float particles from becoming internally intermixed with sink particles, said curtain means being located outside the separation zone in each of said vessels.

68. A system for continuously separating a heterogeneous mixture of particulate solids having a plurality of different specific gravities, into a plurality of fractions, each of a different specific gravity, using a plurality of liquid media of different specific gravity, comprising:
a first separation vessel for receiving said heterogeneous mixture, containing a first liquid medium having a first specific gravity of about 1.0, which medium contacts said heterogeneous mixture, for causing a first part of said mixture to rise in the liquid medium as float particles, and the remaining part to settle in the liquid medium as sink particles,
said vessel including means to remove said separated float particles without intermixture with said sink particles and means to remove said separated sink particles without intermixture with said float particles; and
a second separation vessel for receiving said sink particles from said first separation vessel containing a second liquid medium having a second specific gravity different from the specific gravity of said first liquid medium, said second liquid medium including a waste-derived particulate suspension media component present in a quantity sufficient to attain said second specific gravity, which second medium contacts said residue sink material, for causing a first part of said material to rise in the liquid medium as float particles, and the remaining part to settle in the liquid medium as sink particles,
said vessel including means to remove said separated float particles without intermixture with said sink particles, as a substantially organic particulate mixture, and means to remove said separated sink particles without intermixture with said float particles, as a substantially inorganic particulate mixture.

69. The system of claim 68 further comprising
a first rinser for removing and recovering said waste-derived particulate suspension media component from the substantially organic particulate mixture from the second separation vessel; and
a second rinser for removing and recovering said waste-derived particulate suspension media component from the substantially inorganic particle mixture from the second separation vessel.

70. The system of claims 68 or 69 further comprising means for recycling said recovered waste-derived particulate suspension media component into said second separation vessel.

71. The system of claims 68 or 69 further comprising
a third separation vessel for receiving said substantially organic particulate mixture from said second separation vessel containing a third liquid medium having a specific gravity different from the specific gravity of each of said first and second liquid mediums, said third liquid medium including a waste-derived particulate suspension media component present in a quantity sufficient to attain said third specific gravity, which third medium contacts said substantially organic particulate mixture, for causing a first part of said mixture to rise in the liquid medium as float particles, and the remaining part to settle in the liquid medium as sink particles,
said vessel including means to remove said separated float particles without intermixture with said sink particles, as first organic materials, and means to remove said separated sink particles without intermixture with said float particles, as second organic materials, and a fourth separation vessel for receiving said substantially inorganic particulate mixture from said second separation vessel, containing a fourth liquid medium having a specific gravity different from the specific gravity of each of said first, second and third liquid mediums, said fourth liquid medium including a non waste-derived particulate suspension media component present in a quantity sufficient to attain said fourth specific gravity, which fourth medium contacts said substantially inorganic particulate mixture, for causing a first part of said mixture to rise in the liquid medium as float particles, and the remaining part to settle in the liquid medium as sink particles, said vessel including means to remove said separated float particles without intermixture with said sink particles, as first inorganic materials, and means to remove said separated sink particles without intermixture with said float particles, as second inorganic materials.

72. The system of claim 71 further comprising a first and third rinser for removing and recovering said waste-derived particulate suspension media component from each of the separated substantially organic particulate mixture from the second separation vessel, and from the separated float particles from said third separation vessel, respectively;

a second rinser for removing and recovering said waste-derived particulate suspension media component from the separated substantially inorganic particulate mixture from the second separation vessel;

a fourth rinser for removing and recovering said waste-derived particulate suspension media from the separated sink particles from said third separation vessel; and a fifth and sixth rinser for removing and recovering said non waste-derived particulate suspension media from each of the first inorganic materials and the second inorganic materials from said fourth separation vessel, respectively.

73. The system of claim 71 further comprising a fifth separation vessel for receiving said first inorganic materials from said second additional separation vessel, containing a fifth liquid medium having a specific gravity different from the specific gravity of each of the first, second, third and fourth mediums, said fifth liquid medium including a non waste-derived particulate suspension media component present in a quantity sufficient to attain said fifth specific gravity, which fifth medium contacts said first inorganic materials from said second additional vessel, for causing a first part of said materials to rise in the liquid medium as float particles, and the remaining part to settle in the liquid medium as sink particles, said vessel including means to remove said separated float particles without intermixture with said sink particles, as a third inorganic materials, and means to remove said separated sink particles without intermixture with said float particles, as a fourth inorganic materials.

74. The system of claim 69 wherein each of said rinsers are scrubber-rinser vessels.

75. The system of claim 72 wherein each of said rinsers are scrubber-rinser vessels.

76. The system of claims 68 or 69 wherein each of said separation vessels further include curtain means for preventing float particles from becoming internally intermixed with sink particles, said curtain means being located outside the separation zone in each of said vessels.

77. The system of claim 71 wherein each of said separation vessels further include curtain means for preventing float particles from becoming internally intermixed with sink particles, said curtain means being located outside the separation zone in each of said vessels.

78. The system of claim 72 wherein each of said separation vessels further include curtain means for preventing float particles from becoming internally intermixed with sink particles, said curtain means being located outside the separation zone in each of said vessels.

79. The system of claims 73 or 74 wherein each of said separation vessels further include curtain means for preventing float particles from becoming internally intermixed with sink particles, said curtain means being located outside the separation zone in each of said vessels.

80. The system of claim 75 wherein each of said separation vessels further include curtain means for preventing float particles from becoming internally intermixed with sink particles, said curtain means being located outside the separation zone in each of said vessels.

81. The system of claims 55 or 68 wherein each of said separation vessels is a bi-directional heavy liquid medium separator.

82. The system of claim 58 wherein each of said separation vessels is a bi-directional heavy liquid medium separator.

83. The system of claim 59 wherein each of said separation vessels is a bi-directional heavy liquid medium separator.

84. The system of claim 60 wherein each of said separation vessels is a bi-directional heavy liquid medium separator.

85. The system of claim 71 wherein each of said separation vessels is a bi-directional heavy liquid medium separator.

86. The system of claim 72 wherein each of said separation vessels is a bi-directional heavy liquid medium separator.

87. The system of claim 73 wherein each of said separation vessels is a bi-directional heavy liquid medium separator.

88. The system of claims 55 or 56 wherein said classifier comprises two cyclones, a first autogenous medium cyclone for receiving said portion of the sink particles removed from said first separator vessel, and a second classifying cyclone, for receiving the overflow of said autogenous medium cyclone, the underflow of said classifying cyclone comprising said waste-derived particulate suspension media.

89. The system of claim 58 wherein said classifier comprises two cyclones, a first autogenous medium cyclone for receiving said portion of the sink particles removed from said first separator vessel and a second classifying cyclone, for receiving the overflow of said autogenous medium cyclone, the underflow of said classifying cyclone comprising said waste-derived particulate suspension media.

90. The system of claim 59 wherein said classifier comprises two cyclones, a first autogenous medium cyclone for receiving said portion of the sink particles removed from said first separator vessel, and a second classifying cyclone, for receiving the overflow of said autogenous medium cyclone, the underflow of said classifying cyclone comprising said waste-derived particulate suspension media.

91. The system of claim 60 wherein said classifier comprises two cyclones, a first autogenous medium cyclone for receiving said portion of the sink particles removed from said first separator vessel, and a second classifying cyclone, for receiving the overflow of said autogenous medium cyclone, the underflow of said classifying cyclone comprising said waste-derived particulate suspension media.

92. A low copper content, low chlorine content, cement or cement-making organic component, product of the process of claim 33, recovered from said third separation stage therein.

93. A low copper content, low chlorine content, cement or cement-making organic component, product of the process of claim 33, recovered from said third separation stage therein.

* * * * *